US012217216B2

(12) United States Patent
Currin et al.

(10) Patent No.: US 12,217,216 B2
(45) Date of Patent: *Feb. 4, 2025

(54) ADVANCED INFRASTRUCTURE MANAGEMENT

(71) Applicant: t4 Spatial, LLC, Santa Clara, CA (US)

(72) Inventors: David Brett Currin, Santa Barbara, CA (US); Edmund Bennett Richards, II, Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/136,268

(22) Filed: Apr. 18, 2023

(65) Prior Publication Data
US 2024/0119415 A1    Apr. 11, 2024

Related U.S. Application Data

(63) Continuation of application No. 16/148,934, filed on Oct. 1, 2018, now Pat. No. 11,663,554, which is a
(Continued)

(51) Int. Cl.
*G06Q 10/10*         (2023.01)
*G06F 16/9035*       (2019.01)
(Continued)

(52) U.S. Cl.
CPC ....... *G06Q 10/103* (2013.01); *G06F 16/9035* (2019.01); *G06F 16/904* (2019.01); *G06F 16/909* (2019.01); *G06F 16/9537* (2019.01); *G06Q 10/06* (2013.01); *G06Q 10/06313* (2013.01); *G06Q 50/06* (2013.01); *G06Q 50/10* (2013.01)

(58) Field of Classification Search
CPC .. G06F 16/909; G06F 16/904; G06F 16/9035; G06F 16/9537; G06Q 10/06; G06Q 10/103; G06Q 10/06313; G06Q 50/06; G06Q 50/10
See application file for complete search history.

(56) References Cited

U.S. PATENT DOCUMENTS 8,738,414 B1    5/2014   Nagar et al.
2011/0041088 A1  2/2011   Ralph et al.
(Continued)

FOREIGN PATENT DOCUMENTS

JP    2005-308841 A    11/2005
WO   2014142929 A1     9/2014

*Primary Examiner* — Brendan S O'Shea
(74) *Attorney, Agent, or Firm* — Procopio, Cory, Hargreaves & Savitch LLP

(57) ABSTRACT

Advanced infrastructure management. In an embodiment, infrastructure domain(s) are imported. Each domain comprises representations of infrastructure asset type(s), activity type(s) related to the asset type(s), and standards and compliance parameters related to the asset type(s). A plurality of representations of infrastructure assets of the asset type(s) are stored. Each of the representations of infrastructure assets comprises location information representing a geolocation of the asset, and updated location information is continually received for infrastructure asset(s), such that the location information for those infrastructure asset(s) is continually updated. In addition, at least one rating is generated for each of the infrastructure assets based on the standards and compliance parameters, and workplan(s) comprising activity(ies) to be performed on infrastructure asset(s) may be generated.

20 Claims, 49 Drawing Sheets

Related U.S. Application Data continuation of application No. PCT/US2016/024782, filed on Mar. 29, 2016.

(51) Int. Cl.
| | |
|---|---|
| *G06F 16/904* | (2019.01) |
| *G06F 16/909* | (2019.01) |
| *G06F 16/9537* | (2019.01) |
| *G06Q 10/06* | (2023.01) |
| *G06Q 10/0631* | (2023.01) |
| *G06Q 50/06* | (2024.01) |
| *G06Q 50/10* | (2012.01) |

(56) References Cited

U.S. PATENT DOCUMENTS

| | | |
|---|---|---|
| 2013/0211797 A1 | 8/2013 | Scolnicov et al. |
| 2013/0321131 A1 | 12/2013 | Tucker |
| 2014/0026089 A1 | 1/2014 | Linton et al. |
| 2014/0122143 A1 | 5/2014 | Fletcher et al. |
| 2014/0282257 A1 | 9/2014 | Nixon |
| 2015/0112647 A1 | 4/2015 | Currin et al. |

| City of Santa Barbara | Map | Asset Data | Activities | Workplans | Admin | @ | ☁ | ⊗ Jonathan Cheng ▾ | fix cracks CIPP: High Priority Pipeline CIPP Lining / incomplete  710

740

22 Mainline Pipes
Sep 19th, 2015 - Dec 15th, 2015

Equipment
720 truck 101

Personnel
CJB

▨▨▨▨▨ 10 Complete ▨▨▨▨▨▨▨▨▨▨ 12 Remaining ▨▨▨▨▨

[map of Santa Barbara with pin markers]

| Actions ▾ | | | Search by identifier, street or status... | | Apply |

| ☐ | Completed | Identifier | Street | City | Zipcode | Status | Actions |
|---|---|---|---|---|---|---|---|
| ☐ | | H6-94 | Rubio Rd | Santa Barbara | 93103 | [planned] | ⊛ |
| ☐ | | H7-76 | E Carrillo Rd | Santa Barbara | 93103 | [planned] | ⊛ |
| ☐ | | H7-77 | N Milpas St | Santa Barbara | 93103 | [planned] | ⊛ |

| City of Santa Barbara | Map | Asset Data | Activities | Workplans | Admin | @ | ⌂ | ⊗ Jonathan Cheng ▾ | fix cracks CIPP: High Priority Pipeline CIPP Lining / incomplete  710          745
                                                                                   740

22 Mainline Pipes          Equipment              Personnel        Edit Workplan
Sep 19th, 2015 -Dec 15th, 2015  720 truck 101          CJB              Report View
///////10 Complete/////////////////////////12 Remaining\\\              Delete Workplan

[map of Santa Barbara with pins]

| Actions ▾ | | | Search by identifier, street or status... | Apply |

| ☐ | Completed | Identifier | Street | City | Zipcode | Status | Actions |
|---|---|---|---|---|---|---|---|
| ☐ | | H6-94 | Rubio Rd | Santa Barbara | 93103 | planned | ⊛ |
| ☐ | | H7-76 | E Carrillo Rd | Santa Barbara | 93103 | planned | ⊛ |
| ☐ | | H7-77 | N Milpas St | Santa Barbara | 93103 | planned | ⊛ |

| Name | Activity Type | Priority | Scheduled | Progress | Status | Actions |
|---|---|---|---|---|---|---|
| fix cracks CIPP 22 Mainline Pipes | Pipeline CIPP Lining | High Priority | Sep 19th, 2015 - Dec 15th, 2015 | 45% | incomplete | ⚙ |
| Cracks Line Pipes 11 Mainline Pipes | Pipeline CIPP Lining | High Priority | Sep 27th, 2015 - Oct 27th, 2015 | 73% | incomplete | ⚙ |
| Test Plan: FIX 20 Mainline Pipes | Visual Inspection | Routine | Oct 1st, 2015 - Oct 15th, 2015 | 15% | incomplete | ⚙ |
| de root 23 pipes 23 Mainline Pipes | Root Removal | Emergency | Oct 6th, 2015 - Oct 20th, 2015 | 26% | incomplete | ⚙ |
| Re Root 23 Mainline Pipes | Root Removal | High Priority | Oct 6th, 2015 - Oct 20th, 2015 | 17% | incomplete | ⚙ |
| Cracks 8 Mainline Pipes | Visual Inspection | Routine | Oct 13th, 2015 - Oct 27th, 2015 | 25% | incomplete | ⚙ |
| Fix Cracks 8 Mainline Pipes | Pipeline CIPP Lining | High Priority | Oct 13th, 2015 - Nov 30th, 2015 | 50% | incomplete | ⚙ |
| 23 roots 23 Mainline Pipes | Root Removal | Routine | Oct 14th, 2015 - Oct 28th, 2015 | 39% | incomplete | ⚙ |
| De Root 20 Mainline Pipes | Root Removal | High Priority | Oct 18th, 2015 - Nov 1st, 2015 | 15% | incomplete | ⚙ |
| nado roots 24 Mainline Pipes | Visual Inspection | Routine | Oct 20th, 2015 - Nov 4th, 2015 | 17% | incomplete | ⚙ |
| de root 23 Mainline Pipes | Root Removal | High Priority | Oct 20th, 2015 - Nov 4th, 2015 | 4% | incomplete | ⚙ |
| test workplane pacp 26 Mainline Pipes | PACP Inspection | Routine | Jan 5th, 2016 - Jan 19th, 2016 | 4% | active | ⚙ |

| City of Santa Barbara | Map | Asset Data | Activities | Workplans | Admin | @ | ☁ | ⊗ Jonathan Cheng ▾ |

Routine PACP — 910
Inspection
Mainline Pipe | H7-122

| Videos | [1] |
| Details | |
| PACP Conditions | [21] |
| PACP Ratings | |
| Pipe Diagram | |
| Files | [0] |
| Notes | [0] |

VIDEOS — 920    [Upload]

H07-071       TO        H07-070
09/10/2009              08:16

Manhole
6.0 FT

▷ 00:38 / 21:58                                1x  🔊 ▭

| Name | Size | Uploaded At | Uploaded By |
|---|---|---|---|
| ▷ H07-071_H07-070-910200... | 456.798MB | Jul 23rd, 2015 16:17 | Unknown |

PACP INSPECTION DETAILS — 930      [Edit]

Completed At: 09/10/2009 07:14     Direction: downstream
Creator: Unknown                   Length Surveyed: 172.8
Cost: $0                           Certificate ...
Personnel: Dale Escobar            Number:
Equipment: ...                     Pre Cleaning: ...
                                   Reference: unmapped

| City of Santa Barbara | Map | Asset Data | Activities | Workplans | Admin | @ | ☁ | ⊗ Jonathan Cheng ▾ |

940

Routine PACP — 910
Inspection
Mainline Pipe | H7-122

| Videos | 1 |
| Details | |
| PACP Conditions | 21 |
| PACP Ratings | |
| Pipe Diagram | |
| Files | 0 |
| Notes | 0 |

MAINLINE PIPE

Material: Vitrified Clay Pipe
Shape: .....
Width: .....
Height: 6

Segment Reference: H7-122
Downstream Manhole: MH-H07-070
Upsteam Manhole: MH-H07-071

PACP CONDITIONS — 950

| Distance (feet) | Code | | | Value | | | Location | | |
| | Abbreviation | Family | Continuous | Inches 1st | 2nd | % | Joint | From | To | Grade |
| --- | --- | --- | --- | --- | --- | --- | --- | --- | --- | --- |
| 0 | AMH | Construction | | 0 | 0 | 0 | | 0 | 0 | 0 |
| 0 | MWL | Other | | 0 | 0 | 5 | | 0 | 0 | 0 |
| 8.2 | TBA | ConstructionFeatures | | 4 | 0 | 0 | | 9 | 0 | 0 |
| 34.3 | TFC | ConstructionFeatures | | 4 | 0 | 0 | | 3 | 0 | 0 |
| 40.4 | TBA | ConstructionFeatures | | 4 | 0 | 0 | | 3 | 0 | 0 |
| 62.9 | TBA | ConstructionFeatures | | 4 | 0 | 0 | | 3 | 0 | 0 |
| 67.4 | TFC | ConstructionFeatures | | 4 | 0 | 0 | | 9 | 0 | 0 |
| 89.6 | TFC | ConstructionFeatures | | 4 | 0 | 0 | | 3 | 0 | 0 |
| 98.3 | TBA | ConstructionFeatures | | 4 | 0 | 0 | | 3 | 0 | 0 |
| 119.1 | TBA | ConstructionFeatures | | 4 | 0 | 0 | | 9 | 0 | 0 |
| 129.5 | RFJ | O&M | | 0 | 0 | 0 | ✓ | 7 | 8 | 1 |
| 133.8 | MGP | Other | | 0 | 0 | 0 | | 0 | 0 | 0 |
| 134.9 | TFC | ConstructionFeatures | | 4 | 0 | 0 | | 9 | 0 | 0 |

| City of Santa Barbara | Map | Asset Data | Activities | Workplans | Admin | @ | 🔗 | ⊗ Jonathan Cheng ▾ |

Routine PACP Inspection — 950
Mainline Pipe | H7-122

| | |
|---|---|
| Videos | [1] |
| Details | |
| PACP Conditions | [21] |
| PACP Ratings | |
| Pipe Diagram | |
| Files | [0] |
| Notes | [0] |

| | | | | | | | | | |
|---|---|---|---|---|---|---|---|---|---|
| 119.1 | TBA | ConstructionFeatures | | 4 | 0 | 0 | | 9 | 0 | 0 |
| 129.5 | RFJ | O&M | | 0 | 0 | 0 | ✓ | 7 | 8 | 1 |
| 133.8 | MGP | Other | | 0 | 0 | 0 | | 0 | 0 | 0 |
| 134.9 | TFC | ConstructionFeatures | | 4 | 0 | 0 | | 9 | 0 | 0 |
| 136 | MGP | Other | | 0 | 0 | 0 | | 0 | 0 | 0 |
| 136.5 | TFC | ConstructionFeatures | | 4 | 0 | 0 | | 3 | 0 | 0 |
| 136.9 | MGP | Other | | 0 | 0 | 0 | | 0 | 0 | 0 |
| 137.8 | RFJ | O&M | | 0 | 0 | 0 | ✓ | 11 | 3 | 1 |
| 139.7 | RFJ | O&M | | 0 | 0 | 0 | ✓ | 7 | 3 | 1 |
| 144 | RFJ | O&M | | 0 | 0 | 0 | ✓ | 8 | 0 | 1 |
| 156.2 | RFJ | O&M | | 0 | 0 | 0 | ✓ | 8 | 9 | 1 |
| 172.8 | AMH | Construction | | 0 | 0 | 0 | | 0 | 0 | 0 |

960 — PACP RATINGS

| STRUCTURAL | | O&M | | OVERALL | |
|---|---|---|---|---|---|
| Rating | [ ⋯ ] | Rating | [5] | Rating | [5] |
| Quick | 0000 | Quick | 1500 | Quick | 150B |
| Index | [ ⋯ ] | Index | [1] | Index | [1] |

FIG. 9C

ADVANCED INFRASTRUCTURE MANAGEMENT

CROSS-REFERENCE TO RELATED APPLICATIONS

The present application is a continuation of U.S. application Ser. No. 16/148,934, filed on Oct. 1, 2018, which is a continuation of PCT Application No. PCT/US2016/024782 filed on Mar. 29, 2016, which are both incorporated herein by reference in their entireties.

The present application is related to U.S. Pat. No. 14,793,652, filed Jul. 7, 2015, which is a continuation of U.S. patent application Ser. No. 14/360,605, filed on May 23, 2014 and issued as U.S. Pat. No. 9,081,917 on Jul. 14, 2015, which is a national stage entry of International Patent App. No. PCT/US2013/031724, filed on Mar. 14, 2014, the entireties of all of which are hereby incorporated herein by reference.

BACKGROUND

Field of the Invention

The invention is generally directed to infrastructure management, and, more particularly, to management of municipality infrastructures and utility infrastructures, such as waste water, potable water, natural gas, oil and gas pipelines, electrical distribution, telephone/utility poles/lines, sidewalks, street lamps, trees and planters, roads, bridges, buildings, property boundaries, easements, environmental attributes, etc.

Description of the Related Art

Good infrastructure management is critical for municipalities all over the world—not only for quality-of-life reasons, but also for public health and safety reasons. However, conventional infrastructure management techniques are hampered by disparate data siloes that utilize different protocols, file structures, and the like. What is needed is a unified, extensible infrastructure management system that provides for the visualization, operation, and collaborative management of infrastructure assets across any infrastructure asset domain, including multiple infrastructure asset domains.

SUMMARY

Accordingly, systems, methods, and media are disclosed for advanced infrastructure management.

In an embodiment, a system is disclosed. The system comprises: at least one hardware processor; a memory; and one or more software modules that, when executed by the at least one hardware processor, import one or more infrastructure domains, wherein each of the one or more infrastructure domains comprises representations of one or more infrastructure asset types, one or more activity types related to the one or more infrastructure asset types, and standards and compliance parameters related to the one or more infrastructure asset types, store a plurality of representations of infrastructure assets of one or more of the one or more asset types in the memory, wherein each of the plurality of representations of infrastructure assets comprises location information representing a geolocation of the represented infrastructure asset, continually receive updated location information for one or more infrastructure assets and, based on the received updated location information, update the location information of one or more of the plurality of representations of infrastructure assets, corresponding to the one or more infrastructure assets, generate at least one rating for each of the plurality of representations of infrastructure assets based on the standards and compliance parameters, and generate one or more workplans comprising one or more activities, of the one or more activity types, to be performed on one or more infrastructure assets.

In an additional embodiment, a method is disclosed. The method comprises using at least one hardware processor to: import one or more infrastructure domains, wherein each of the one or more infrastructure domains comprises representations of one or more infrastructure asset types, one or more activity types related to the one or more infrastructure asset types, and standards and compliance parameters related to the one or more infrastructure asset types; store a plurality of representations of infrastructure assets of one or more of the one or more asset types, wherein each of the plurality of representations of infrastructure assets comprises location information representing a geolocation of the represented infrastructure asset; continually receive updated location information for one or more infrastructure assets and, based on the received updated location information, update the location information of one or more of the plurality of representations of infrastructure assets, corresponding to the one or more infrastructure assets; generate at least one rating for one or more of the plurality of representations of infrastructure assets based on the standards and compliance parameters; and generate one or more workplans comprising one or more activities, of the one or more activity types, to be performed on one or more infrastructure assets.

In an additional embodiment, a non-transitory computer-readable medium is disclosed. The medium has instructions stored thereon, which, when executed by a processor, cause the processor to: import one or more infrastructure domains, wherein each of the one or more infrastructure domains comprises representations of one or more infrastructure asset types, one or more activity types related to the one or more infrastructure asset types, and standards and compliance parameters related to the one or more infrastructure asset types; store a plurality of representations of infrastructure assets of one or more of the one or more asset types, wherein each of the plurality of representations of infrastructure assets comprises location information representing a geolocation of the represented infrastructure asset; continually receive updated location information for one or more infrastructure assets and, based on the received updated location information, update the location information of one or more of the plurality of representations of infrastructure assets, corresponding to the one or more infrastructure assets; generate at least one rating for one or more of the plurality of representations of infrastructure assets based on the standards and compliance parameters; and generate one or more workplans comprising one or more activities, of the one or more activity types, to be performed on one or more infrastructure assets.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 4A-12B illustrate example user interfaces for advanced infrastructure management, according to embodiments.

DETAILED DESCRIPTION

In order to solve these problems with conventional technology, embodiments are disclosed for advanced infrastructure management. For example, disclosed embodiments use four dimensions of infrastructure data (e.g., latitude, longitude, elevation, and time) to provide online automation and integration of previously isolated and disparate data silos. Disclosed embodiments may act as a "Rosetta Stone," leveraging a geospatial paradigm for the first time in order to bring all the disparate and isolated information together in a synchronous whole with the purpose of efficiently automating workflows associated with infrastructure management. Embodiments may also use the highly visual nature of the geospatial paradigm to manage all the parts and life-cycles of infrastructure management, realizing multiple synergistic benefits that are not available under current management practices. As a result, asset owners, engineers, and contractors can not only save significant time in accessing the full information necessary to do their jobs, and but also do their jobs to a degree of efficacy not otherwise possible. For instance, the geospatial work engine enabled by the disclosed embodiments can facilitate real-time distributed decision-making by such parties.

1. Market Overview

In an example embodiment, the disclosed extensible infrastructure management system enables the management of infrastructure assets that support the transmission, distribution, collection, storage, and protection of resources relating to waste water, potable water, natural gas, oil and gas pipelines, electrical distribution, telephone/utility poles/lines, sidewalks, street lamps, trees and planters, roads, bridges, buildings, property boundaries, easements, and/or the like. In addition, the system may enable multiple users to access (e.g., via widely distributed mobile devices) and work with a visualization of a multiplicity of existing and/or future inspection media, used to measure geospatially-referenced infrastructure assets across any infrastructure asset domain, including multiple infrastructure asset domains, as of a precise moment in time. Such access and work, which itself is sequentially measured as-of, is a priori collaborative, and engenders improved operations and management of infrastructure assets.

By using embodiments of the disclosed processes, collaborators may establish and use a work engine to continuously repurpose as-measured, as-of (i.e., four-dimensional) information to create work product that both supports and benefits from the multi-party exertions of distributed decision-making. The measurable efficacy of these embodiments is to be found in the economic benefits of improved network capacity and reliability, including the extension of the remaining useful life of the assets necessary to such networks.

2. System Overview 2.1. Example Infrastructure

Figure 1:
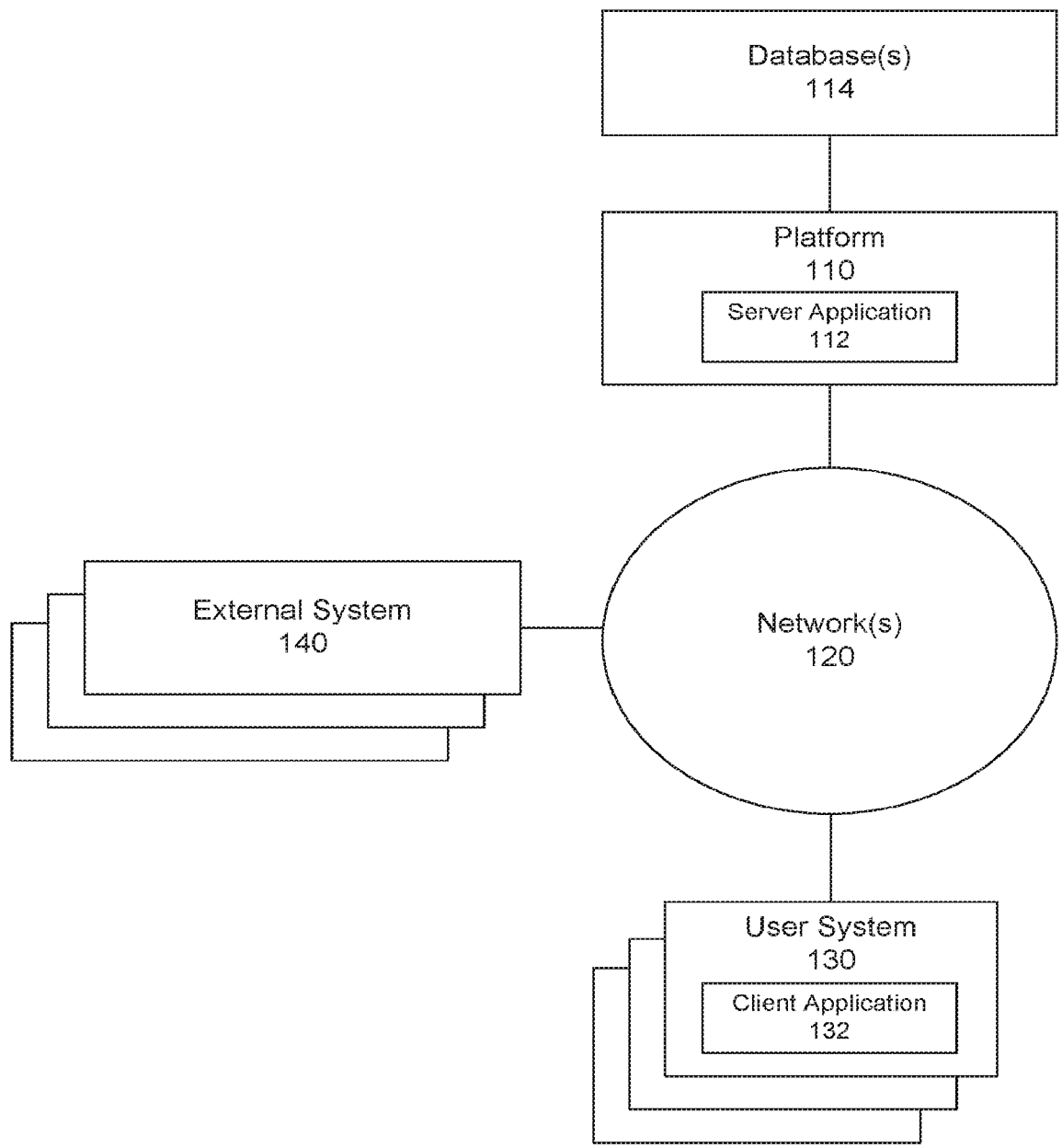
FIG. 1 illustrates an infrastructure in which a system for advanced infrastructure management may operate, according to an embodiment.

FIG. 1 illustrates an infrastructure in which a system for advanced sewer infrastructure management may operate, according to an embodiment. The system may comprise a platform 110 comprising one or more servers which host and/or execute server application 112, which may implement one or more of the various functions, processes, and/or software modules described herein. In addition, platform 110 is communicatively connected to one or more user systems 130 and/or external systems 140 (e.g., third-party systems) via one or more network(s) 120. Network(s) 120 may comprise the Internet, and platform 110 may communicate with user system(s) 130 through the Internet using standard transmission protocols, such as HyperText Transfer Protocol (HTTP), Secure HTTP (HTTPS), File Transfer Protocol (FTP), FTP Secure (FTPS), SSH File Transfer Protocol (SFTP), and the like, as well as proprietary protocols. It should be understood that network(s) 120 may include different or additional networks, such as a cellular network, Wi-Fi™ network, and/or the like. In an embodiment, server(s) 110 may not be dedicated servers, and may instead be cloud instances, which utilize shared resources of one or more servers. Furthermore, while platform 110 may be illustrated as being connected to various systems through a single set of network(s) 120, it should be understood that platform 110 may be connected to the various systems via different sets of one or more networks. For example, platform may be connected to a subset of user systems 130 or external systems 140 via the Internet, but may be connected to one or more other user systems 130 or external systems 140 via an intranet. It should also be understood that user system(s) 130 and third-party system(s) 140 may comprise any type or types of computing devices capable of wired and/or wireless network communication, including without limitation, desktop computers, laptop computers, tablet computers, smart phones or other mobile phones, servers, game consoles, televisions, set-top boxes, electronic kiosks, Automated Teller Machines, CCTV inspection software or equipment (e.g., installed in a contractor's inspection vehicle), and the like. In addition, while only a few user systems 130 and a few external systems 140 are illustrated, it should be understood that the infrastructure may comprise any number of user systems and external systems, including, for instance, no external systems 140. Furthermore, the illustrated infrastructure, including platform 110, user systems 130, and external systems 140 may comprise more components than illustrated in FIG. 1. For instance, user system 130 may comprise or be interfaced with components, such as a Global Positioning System (GPS) receiver, image acquisition device (e.g., camera for capturing photographs and/or audiovisual and audio recordings), etc.

Platform 110 may comprise web servers (e.g., within or as server application 112) which host one or more websites or web services. In embodiments in which a website is provided, the website may comprise one or more user interfaces, including, for example, web pages generated in HyperText Markup Language (HTML) or other language. Platform 110 transmits or serves these user interfaces in response to requests from user system(s) 130. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to platform 110 and the responses from platform 110, including the user interfaces, may both be communicated through network(s) 120, which may include the Internet, using standard communication protocols (e.g., HTTP, HTTPS, FTP, FTPS, SFTP). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (not shown) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases. A user system 130, external system 140, or server application 112 may submit data (e.g., user data, form data, etc.) to be stored in database(s) 114, and/or request access to data stored in database(s) 114. Any suitable database may be utilized, including without limitation MySQL, Oracle, IBM, Microsoft SQL, Sybase, Access, and the like, including cloud-based database instances. Data may be sent to platform 110, for instance, using the well-known POST request supported by HTTP, via FTP, etc. This data, as well as other requests, may be handled, for example, by server-side web technology, such as a servlet or other software module, executed within or as server application 112.

In embodiments in which a web service is provided, platform 110 may receive requests from user system(s) 130 and/or external system(s) 140, and provide responses in eXtensible Markup Language (XML) and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140, which may themselves be servers, can define their own user interfaces, and rely on the web service to implement the backend processes, functionality, storage, etc., described herein. For example, in such an embodiment, a client application 132 executing on one or more user system(s) 130 may interact with server application 112 executing on platform 110 to execute one or more or a portion of one or more of the various functions, processes, and/or software modules described herein. Client application 132 may be "thin," in which case processing is primarily carried out server-side by server application 112. A simple example of a thin client application is a browser application, which simply requests, receives, and renders web pages at user system(s) 130, while server application 112 is responsible for generating the web pages and managing database functions. Alternatively, client application 132 may be "thick," in which case processing is primarily carried out client-side by user system(s) 130. It should be understood that client application 132 may perform an amount of processing, relative to server application 112, at any point along this spectrum between "thin" and "thick," depending on the design goals of the particular implementation. In any case, it should be understood that an application embodying the disclosed functions, processes, and/or software modules may wholly reside on either platform 110 (e.g., as server application 112) or user system(s) 130 (e.g., as client application 132) or be distributed between platform 110 and user system(s) 130 (e.g., a portion executed within server application 112 and a portion executed within client application 132).

In an embodiment, server application 112 executing on platform 110 may import or retrieve data from multiple sources, such as one or more of external systems 140. In some instances, server application 112 may use the imported or retrieved data to generate a mash-up. A "mash-up" in this context refers to a user interface that uses and/or combines data, presentations, and/or functionality from two or more sources to create a new amalgamation of data, presentations, and/or functionality. For example, server application 112 may comprise a web application that generates web pages based on data imported or retrieved from each of a plurality of external systems 140. In an embodiment, a mash-up can be used with analytics to refine human intelligence into artificial intelligence, for example, by using human interactions (e.g., reactions to events, etc., collected by server application 112 and/or client application 132) to train (and possibly continuously update) an artificial neural network that can then be used to automate work flow.

2.2. Example Modules

Figure 2:
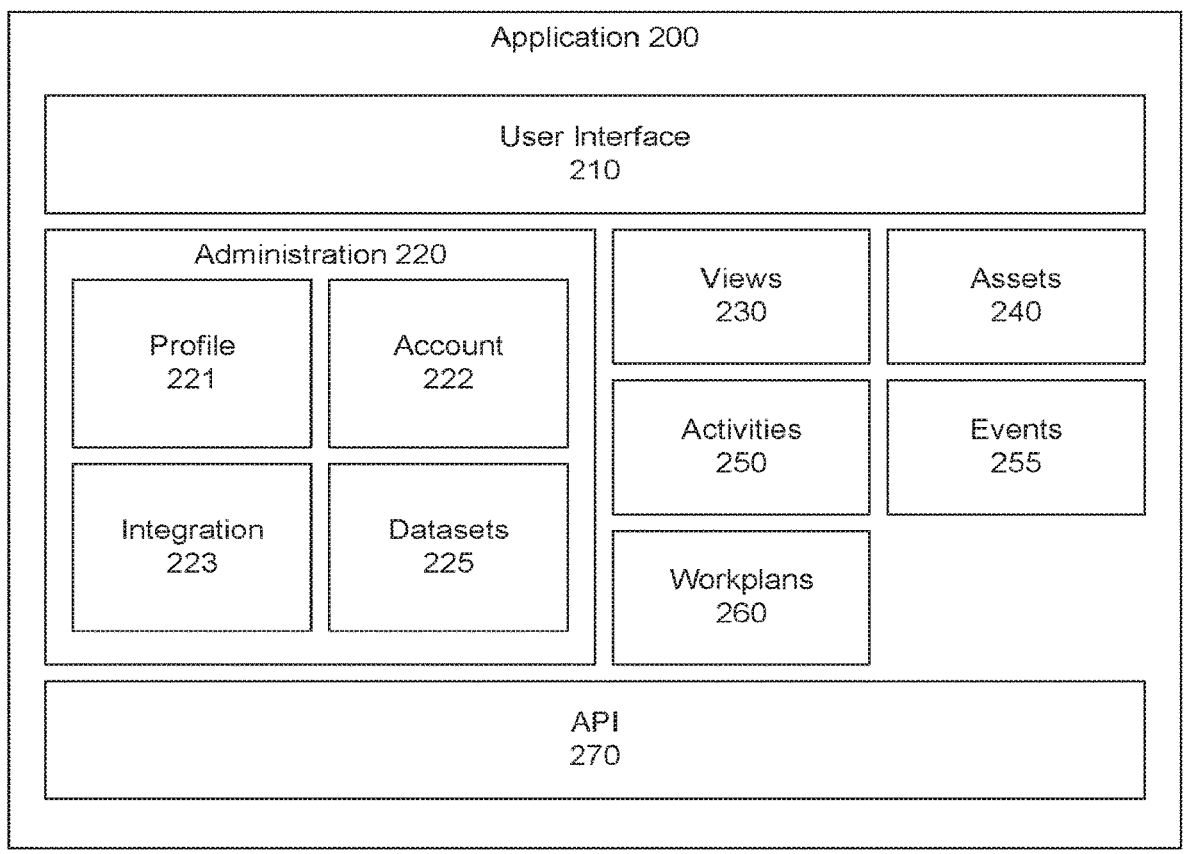
FIG. 2 illustrates example software modules that may be implemented by an application, according to an embodiment.

FIG. 2 illustrates some example software modules that may be implemented by an application 200, according to an embodiment. Application 200 may be implemented as server application 112, client application 132, or one or more software modules distributed between server application 112 and client application 132.

Application 200 may comprise a user interface 210. In an embodiment, user interface 210 may comprise one or more webpages (e.g., written in HTML5) generated by server application 112. These webpages may be transmitted over network(s) 120 to user system(s) 130, and rendered by client application 132, which may be a web browser application. In this manner, application 200 may be implemented according to a cloud-based Software as a Service (SaaS) model for use, for example, on any device and across any type of network connection (e.g., Wi-Fi, cellular, etc.). Alternatively or additionally, user interface 210 may comprise one or more screens that are generated by client application 132 based on data received from server application 112 and/or stored locally on user system 130. In either case, user interface 210 of application 200 may have the same look and feel to a user (e.g., in terms of navigation, webpages, available operations, etc.), regardless of the device used. For example, a user at a municipality's office can create a workplan via user interface 210, and a worker in the field can recommend alternatives, communicate with other stakeholders, and/or otherwise collaboratively complete the workplan via the same user interface 210.

In the illustrated embodiment, application 200 also comprises at least an administration module 220, a views module 230, an assets module 240, an activities module 250, an events module 255, and a workplans module 260, as well as an API 270. In addition, administration module 220 may comprise a profile module 221, an account module 222, an integration module 223, and a datasets module 225. Each of these modules will be described in further detail elsewhere herein. However, it should be understood that application 200 may implement more, fewer, and/or different sets, combinations, or nesting of software modules than those illustrated in FIG. 2.

2.3. Example Processing Device

Figure 3:
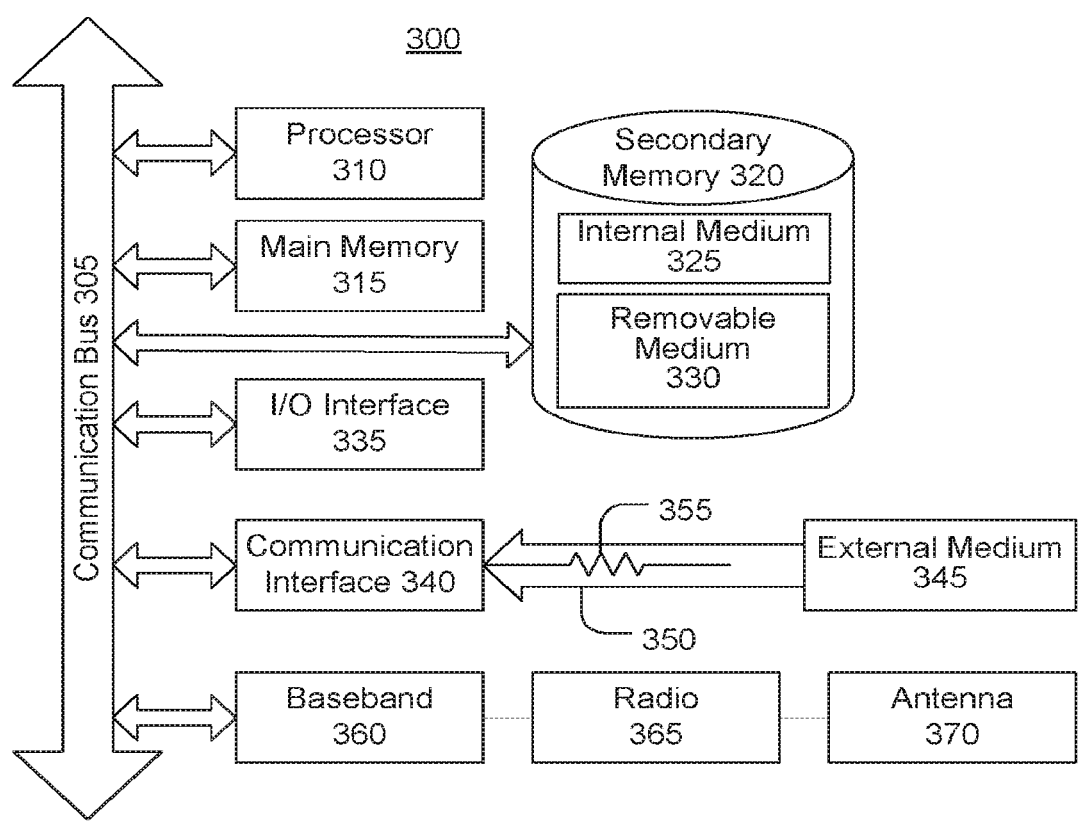
FIG. 3 illustrates a processing system on which one or more of the processes described herein may be executed, according to an embodiment.

FIG. 3 is a block diagram illustrating an example wired or wireless system 300 that may be used in connection with various embodiments described herein. For example, system 300 may represent components of platform 110, user system(s) 130, external system(s) 140, and/or any other devices described herein. System 300 can be a server, any conventional personal computer or mobile device, or any other processor-enabled device that is capable of wired or wireless data communication. Other computer systems and/or architectures may be also used, as will be clear to those skilled in the art.

System 300 preferably includes one or more processors, such as processor 310. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with processor 310. Examples of processors which may be used with system 300 include, without limitation, the Pentium® processor, Core i7® processor, and Xeon® processor, all of which are available from Intel Corporation of Santa Clara, California.

Processor 310 is preferably connected to a communication bus 305. Communication bus 305 may include a data channel for facilitating information transfer between storage and other peripheral components of system 300. In addition, communication bus 305 may provide a set of signals used for communication with processor 310, including a data bus, address bus, and control bus. Communication bus 305 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 300 preferably includes a main memory 315 and may also include a secondary memory 320. Main memory 315 provides storage of instructions and data for programs executing on processor 310, such as one or more of the software modules discussed herein (e.g., illustrated in FIG. 2). It should be understood that software modules stored in the memory and executed by processor 310 may be written and/or compiled according to any suitable language, including without limitation C/C++, Java, JavaScript, Perl, Visual Basic, .NET, and the like. Main memory 315 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 320 may optionally include an internal memory 325 and/or a removable medium 330, for example a floppy disk drive, a magnetic tape drive, a compact disc (CD) drive, a digital versatile disc (DVD) drive, other optical drive, a flash memory drive, etc. Removable medium 330 is read from and/or written to in a well-known manner. Removable storage medium 330 may be, for example, a floppy disk, magnetic tape, CD, DVD, SD card, etc.

Removable storage medium 330 is a non-transitory computer-readable medium having stored thereon computer-executable code (i.e., software) and/or data. The computer software or data stored on removable storage medium 330 is read into system 300 for execution by processor 310.

In alternative embodiments, secondary memory 320 may include other similar means for allowing computer programs or other data or instructions to be loaded into system 300. Such means may include, for example, an external storage medium 345 and an interface 340. Examples of external storage medium 345 may include an external hard disk drive, an external optical drive, or an external magneto-optical drive.

Other examples of secondary memory 320 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 330 and a communication interface 340, which allow software and data to be transferred from an external medium 345 to system 300.

Communication interface 340 allows software and data to be transferred between system 300 and external devices (e.g. printers), networks, or information sources. For example, computer software or executable code may be transferred to system 300 from a network server via communication interface 340. Examples of communication interface 340 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 300 with a network or another computing device.

Communication interface 340 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 340 are generally in the form of electrical communication signals 355. These signals 355 are preferably provided to communication interface 340 via a communication channel 350. In one embodiment, communication channel 350 may be a wired or wireless network, or any variety of other communication links. Communication channel 350 carries signals 355 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., the disclosed software modules) is stored in main memory 315 and/or secondary memory 320. Computer programs can also be received via communication interface 340 and stored in main memory 315 and/or secondary memory 320. Such computer programs, when executed, enable system 300 to perform the various disclosed functions and processes.

In this description, the term "computer-readable medium" is used to refer to any non-transitory computer readable storage media used to provide computer-executable code (e.g., the disclosed software modules) to system 300. Examples of these media include main memory 315, secondary memory 320 (including internal memory 325, removable medium 330, and external storage medium 345), and any peripheral device communicatively coupled with communication interface 340 (including a network information server or other network device). These non-transitory computer-readable mediums are means for providing executable code, programming instructions, and software to system 300.

In an embodiment that is implemented using software, the software may be stored on a computer-readable medium and loaded into system 300 by way of removable medium 330, I/O interface 335, or communication interface 340. In such an embodiment, the software is loaded into system 300 in the form of electrical communication signals 355. The software, when executed by processor 310, preferably causes processor 310 to perform the disclosed functions and processes.

In an embodiment, I/O interface 335 provides an interface between one or more components of system 300 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 300 also includes optional wireless communication components that facilitate wireless communication over a voice and over a data network. The wireless communication components comprise an antenna system 370, a radio system 365 and a baseband system 360. In system 300, radio frequency (RF) signals are transmitted and received over the air by antenna system 370 under the management of radio system 365.

In one embodiment, antenna system 370 may comprise one or more antennae and one or more multiplexors that perform a switching function to provide antenna system 370 with transmit and receive signal paths. In the receive path, received RF signals can be coupled from a multiplexor to a low noise amplifier that amplifies the received RF signal and sends the amplified signal to radio system 365.

In alternative embodiments, radio system 365 may comprise one or more radios that are configured to communicate over various frequencies. In one embodiment, radio system 365 may combine a demodulator and modulator in one integrated circuit (IC). The demodulator and modulator can also be separate components. In the incoming path, the demodulator strips away the RF carrier signal leaving a baseband receive audio signal, which is sent from radio system 365 to baseband system 360.

If the received signal contains audio information, then baseband system 360 decodes the signal and converts it to an analog signal. Then the signal is amplified and sent to a speaker. Baseband system 360 may also receive analog audio signals from a microphone. These analog audio signals are converted to digital signals and encoded by baseband system 360. Baseband system 360 also codes the digital signals for transmission and generates a baseband transmit audio signal that is routed to the modulator portion of radio system 365. The modulator mixes the baseband transmit audio signal with an RF carrier signal generating an RF transmit signal that is routed to antenna system 370 and may pass through a power amplifier. The power amplifier amplifies the RF transmit signal and routes it to antenna system 370 where the signal is switched to the antenna port for transmission.

Baseband system 360 is also communicatively coupled with processor 310. Central processing unit 310 has access to data storage areas 315 and 320. Central processing unit 310 is preferably configured to execute instructions (e.g., the disclosed software modules) that can be stored in memory 315 or secondary memory 320. Computer programs can also be received from baseband processor 360 and stored in data storage area 315 or in secondary memory 320, or executed upon receipt. Such computer programs, when executed, enable system 300 to perform the disclosed functions and processes. For example, data storage areas 315 may store the disclosed software modules and data structures.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular implementation, but such implementation decisions should not be interpreted as causing a departure from the scope of the present application. In addition, the grouping of functions within a module, block, circuit, or step is for ease of description. Specific functions or steps can be moved from one module, block, or circuit to another without departing from the scope of the application.

Any of the software modules described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

3. Process Overview

Embodiments of process(es) for advanced infrastructure management will now be described in detail. It should be understood that the described process(es) may be embodied in one or more software modules (e.g., within server application 112 and/or client application 132) that are executed by one or more hardware processors, which may be executed wholly by processor(s) of platform 110, wholly by processor(s) of user system(s) 130, or may be distributed across platform 110 and user system(s) 130 such that some portions or modules are executed by platform 110 and other portions or modules are executed by user system(s) 130. The described process may implemented as instructions represented in source code, object code, and/or machine code. These instructions may be executed directly by the hardware processor(s), or alternatively, may be executed by a virtual machine operating between the object code and the hardware processors. In addition, the disclosed server application 112 and/or client application 132 may be built upon or interfaced with one or more existing systems (e.g., external system(s) 140).

3.1. Geospatial Accuracy

In an embodiment, seamless and efficient collaboration is achieved by directly supporting the process of efficiently transforming a municipality's infrastructure maps and other relevant infrastructure data into a single geospatially-aligned framework, and storing the transformed infrastructure data. In an embodiment, the single geospatially aligned framework that is used across all clients or municipalities comprises the single standard reference geographic coordinate system, known as the World Geodetic System or "WGS 84." This is the framework which is used by the Global Positioning System (GPS). WGS 84 supplies a latitude, longitude, and elevation on the Earth's surface for any identified point in the agreed datum that most closely matches the shape of the Earth. GPS relies on a global network of satellites to provide precise positioning. In 2000, military restrictions on the use of GPS were relaxed, and civilian-use accuracy was allowed to go from one hundred meters to twenty meters. Since then, the accuracy of GPS has continued to improve.

Notably, WGS 84 is periodically updated to reflect tectonic plate movement from earthquakes and continental drift, keeping the positioning accurate in conformance with International Terrestrial Reference Frame (ITRF) updates. The current version is WGS 84 (G1674). In reading this disclosure, it should be understood that references to WGS 84 refer to the last-implemented frame update. However, the embodiments disclosed herein are not so limited, and may be used with any past or future versions as well. All geospatial data and coordinates stored in the database may be automatically adjusted to match the frame update currently in effect. GPS readings from the field can also be received in the frame update currently in effect.

The widespread use of the emerging standard WGS 84 geographic coordinate system would allow, if the coordinates of the WGS 84 layers representing infrastructure asset placement matched ground truth, all of a municipality's infrastructure information to be brought into geospatial alignment (e.g., in a cloud-based platform) and presented seamlessly (e.g., via a web browser) to an engineer's, contractor's, or other user's system (e.g., laptop, tablet, desktop, mobile phone, etc.). What the engineer would observe at a certain measured GPS location would match what the engineer's device (e.g., laptop, tablet, etc.) would present as being at that same location. This geospatial alignment allows for huge efficiency gains, but is not easily possible with conventional technology because cities, utilities, and contractors utilize multiple disparate coordinate systems and projections for infrastructure. The resulting maps do not visually or spatially align, even for the exact same area. Across just the United States, cities, utilities, and contractors use more than one-hundred-twenty different state plane coordinate systems, some local county plane coordinate systems, and even a few national plane coordinate systems to track their infrastructure. Single coordinate systems may have further variation across time. In an embodiment, the disclosed platform 110 implements a cloud-based, fully-digital model in usable geospatial alignment, based on all infrastructure locations being adjusted continuously and systematically towards more precise placement in the WGS 84 reference frame through a process of leveraging actual ground-truth measurements.

One reason that this is important is that very few municipal infrastructure systems exist in isolation anymore. Increasingly, there are multiple parties who work across geopolitical jurisdictional lines and need the ability to access information in a standardized format. For example, many gas companies are constructing new natural gas pipelines to replace aging infrastructure, relocating existing gas infrastructure, or installing new gas infrastructure to support new development. Frequently, this pipeline construction requires that new gas mains and services be installed in areas that already have substantial residential and commercial development, complete with existing landscaping, driveways, and pavement. Installing new gas mains and services in previously landscaped and/or paved surroundings can be a significant challenge. To avoid excessive restoration and the associated costs and disruption to the involved neighborhoods, gas pipeline contractors often install the gas main or service by "drilling" or "boring" the pipe directly through the ground horizontally, rather than digging up a new trench to go down the street. However, underground pipeline construction using horizontal drilling or boring can leave other utilities susceptible to damage.

According to many gas companies, based on historical experience, sewer systems remain the most susceptible to damage. From their viewpoint, owners and operators of sewer systems typically have poor records, which make it difficult to locate sewer facilities in the field. Not knowing the accurate location of sewer laterals can lead to pipeline contractors drilling or boring thru sewer mains and laterals by mistake. The operator of a drilling or boring machine cannot always identify whether the installation has caused a gas main or service to penetrate a sewer lateral. Therefore, it is possible that what is known as a "cross bore" goes unnoticed initially and un-repaired. An un-repaired sewer lateral with a gas main or service obstruction can cause sewage backup to homes or businesses. Typically, a plumber gets called in. The plumber, not realizing that a gas main has been bored through the sewer lateral, may snake a rotating blade ("cutter") through the sewer lateral to clear the suspected debris. If the cutter were to come into contact with a plastic gas main or service, it would likely cut right through the line and introduce gas into the sewer. The gas could migrate into a home or business, resulting in a potentially catastrophic explosion. As a result, many gas companies engaged in these kinds of construction projects would like to get much more accurate information about sewer infrastructure, both pre- and post-construction.

As another example, many cities band together to share a waste water treatment plant. For example, the Milwaukee Metropolitan Sewage District is made up of twenty-eight different municipalities. These municipalities, although all under the same governing body, have different data and formats for their sewer infrastructure data. In addition, each municipality may or may not use the same inspection firms, cleaning firms, and/or repair firms. Under these circumstances, when the District is under mandate to dramatically cut down on the infiltration and inflow which caused raw sewage to recently flood the basements of hundreds of houses, the challenges of coordinating and collaborating in a cost-effective manner are extreme. The costs of trying to do the coordinating and the collaboration manually are also very high.

Thus, in an embodiment, as a first step, the disclosed process is focused on efficiently and cost effectively bringing all of the disparate data silos which suffer from different coordinate systems and different data formats into an initial, single geospatially-aligned view within platform 110, which may be a cloud-based platform. This singular view enables all involved parties to view and work with the data easily and cost effectively, using nothing other than a web browser. It should be noted that after this first step, the aggregated and standardized data supporting the initial view may still be relatively imprecise.

In an embodiment, the process receives computer-aided design (CAD) files, shapefiles, or other source data representing infrastructure data for one or more municipalities.

This source data may be received from a state, city, community, utility, contractor, etc., and may comprise, without limitation, the assumed location of sewer manholes, pipes, property boundaries, road boundaries, utility lines, soil type, and the like. The process may also automatically examine metadata associated with the source data. Based on the data, metadata, and/or other data, server application 112 may determine the plane coordinate system or projection system in which the sewer and/or other data of the source data is currently mapped.

Once the coordinate system or projection system has been determined, the CAD or shapefile data is converted or recast into WGS 84 format. In an embodiment, the data is recast in a newly created layer that will become the ground-truth layer for that particular data set. There may be multiple layers created, with one such layer for each set of initial data. Thus, each layer may comprise complete or partial data for one type of infrastructure (e.g., sewer, potable water, roads, gas, etc.). However, it should be understood that, in other instances or embodiments, a layer may comprise complete or partial data for multiple types of infrastructure.

The recasting of a source's data into a layer may be performed using one or more of several well-known or proprietary techniques, saving significant amounts of time that would otherwise be spent manually analyzing the data. It may not be possible to accomplish this level of automation for every source's data, but it may be performed for at least a large percentage of the source data. Advantageously, this step brings infrastructure location data, previously in multiple disparate projection formats, into an initial single, geospatially-aligned view, which may still be relatively imprecise. The automation also cuts the costs to municipalities for bringing their disparate data silos into a first stage of rudimentary geospatial alignment. Some infrastructure layers that are already in geospatial format (e.g., of unknown frame, epoch, and/or accuracy) may also be loaded as layers, each with a corresponding new ground-truth layer created. At this point, infrastructure assets, property lines, aerial imagery, other environmental attributes, etc. should all be in rough alignment with actual physical reality.

In an embodiment, the initial process of re-projection of CAD or shapefiles from a plane coordinate system or other projection system into a geospatial format (e.g., WGS 84) is only a first step. While the initial geospatial information may help workers initially locate the infrastructure assets (e.g., sewer pipe segments, manholes, gas line segments, etc.), it may still be rough in terms of accuracy. For example, this initial information may result in geospatial accuracy of only within meters. However, for the accuracy and effectiveness required for certain advanced infrastructure management applications, it may be important to achieve geospatial placement of assets in very close alignment with actual physical ground truth, that is accurate on the order of several inches or centimeters. That level of accuracy may be referred to herein as "highly accurate GPS."

Geospatial inaccuracy is a problem from which the whole industry currently suffers. There are at least three possible sources for this geospatial inaccuracy. First, the infrastructure that was actually built or that has been modified over time may simply not match the as-built drawings that the municipality thought represented the actual placement of infrastructure assets. Second, depending on the quality of the original CAD as-built drawings or shapefiles, re-projection may not be able to sufficiently correct for the jump between the Cartesian x-y coordinate system of the CAD drawings or shapefiles and the WGS 84 geospatial spherical x-y-z coordinate system. In these cases, re-projection may expose gaps between the edges of the re-projected tiles (e.g., gaps between connected infrastructure assets), overlaps between adjoining tiles (e.g., an infrastructure asset on one tile getting covered up by an adjacent tile), and/or distortions in tiles (e.g., one quadrant of the tile is satisfactory, but infrastructure assets in another quadrant of the tile—e.g., where there is a valley—are twenty meters off). A third possible source of error is that the aerial imagery or the base maps used as the context for the visualization of infrastructure assets may be off in terms of their alignment between their images and the corresponding embedded GPS points. For the most part, current industry practice is that engineers and contractors simply live with these geospatial errors, including all of the limitations and extra work imposed by these errors. Some municipalities and/or contractors will try to fix these errors, over time, by a process of periodically making manual adjustments to the geospatial placement of the infrastructure assets or to the aerial tiles to try and make them more representative of actual physical reality. However, such efforts tend to be hit or miss and not systematic.

The biggest source of error for most municipalities is likely to be in the re-projected CAD tiles or shapefiles themselves. As mentioned above, this is due to the inherent differences between Cartesian coordinate systems and a spherical coordinate system and the limitations of transforming from one reference frame to another. In an embodiment, a client application (e.g., client application 132 executing on a user system 130) comprising a measurement module can be provided to contractors or other workers in the field. This measurement module may be installed and executed on or communicatively coupled to a handheld device (e.g., user system 130) with an integral or connected high-accuracy GPS receiver (e.g., capable of consistent accuracy within the ten to twenty centimeter range or better). As these workers visit individual infrastructure assets (e.g., a manhole) to do inspections or repairs, they can use the measurement module (e.g., of a client application 132 installed on a handheld user system 130) to measure the actual physical or ground-truth position of the assets (e.g., center of the manhole) at that point in time. In a "measure" mode of the handheld application comprising the measurement module, touching an icon (e.g., on a virtual map) representing the manhole or other asset will link the as-measured latitude, longitude, and elevation from an integral or connected high-accuracy GPS receiver device to the asset (e.g., via an asset identifier), along with the time at which the measurement was collected. Notably, each set of as-measured GPS coordinates may be associated with a timestamp, representing the time at which those coordinates were measured, to facilitate viewing of asset location adjustments over time. This association of an asset identifier and as-measured, as-of coordinates may be transmitted over at least one network to server application 112 executing on platform 110. For instance, the measurement module may be installed and executed as client application 132 on user system 130, and the association of an asset identifier and as-measured coordinates collected by the measurement module may be transmitted over network(s) 120 to server application 112 on platform 110 either automatically or in response to a user interaction. Server application 112 which receives the associations of assets with coordinates may use the collected data to adjust the location of the infrastructure asset on the base tile, as derived from the original CAD or shapefile import, to a more accurate WGS 84 ground-truth location. In an embodiment, technicians may be able to see the adjustment take place instantly on the screen of their handheld or other mobile device (e.g., on a virtual map interface of client application 132 executing on user system 130). In the case of some infrastructure assets (e.g., connected infrastructure assets), server application 112 may reposition more than just the identified asset. For example, as a manhole location get repositioned to match reality, the pipe segments extending from the manhole may also be automatically adjusted by one or more algorithms executed by server application 112 to fit the new, more accurate, manhole location. As another example, when the location of the end of a gas line segment is repositioned to match reality, adjacent gas line segments may also be automatically adjusted by one or more algorithms executed by server application 112 to fit the new, more accurate, location.

There is a current industry practice, known as rubber-sheeting, in which a few control points (e.g., a curb, fire hydrant, tree, etc.) with known latitude and longitude coordinates are manually dragged to the correct location on an aerial image or map. Such changes cannot be undone with any accuracy. In an embodiment, one or more modules executing on platform 110 (e.g., within server application 112) or on a user system 130 (e.g., within client application 132) automatically perform a similar process on the fly. However, these modules use artificial intelligence to automatically readjust the infrastructure points in a more accurate, and possibly non-uniform, fashion to determine positions for them that match physical reality, as measured by GPS. This results in automatic, continual improvements of stored infrastructure asset positions. The accurate positioning of as few as two infrastructure assets on a base tile may be used to adjust all of the other infrastructure assets on that tile to more closely match their real-world positions. As more and more of a municipality's infrastructure assets get measured across time in the normal process of inspection and maintenance, the whole virtual infrastructure network for that municipality will become increasingly accurately positioned. What is notable here is that the collection of a small percentage of highly accurate locations of specific infrastructure points associated with what were previously inaccurate historical CAD tiles or as-built drawings of shapefiles will be sufficient, under this method, to automatically adjust all remaining points on that tile or utility print to a high level of accuracy. Each additional point collected will be used, along with all previously-collected and anchored ground-truth points, in the next iteration of the adjustment process, to simply keep refining the locations of all remaining previously-unlocated infrastructure points on a particular tile or shapefile. Cities, regions, or utilities will be quickly able to create highly accurate four-dimensional matrices of all of their infrastructure assets. Such matrices, comprising x, y, and z coordinates plus time, are a foundation for more efficient and effective advanced asset management practices and techniques. What is shown on virtual maps (e.g., provided by platform 110) may eventually match reality to within a few centimeters for any given infrastructure asset. This process of realignment may be considered "non-uniform," because, for example, a loaded CAD tile may need to be adjusted in certain areas (e.g., stretched to reflect a valley), but not in other areas (e.g., in which the terrain is flat). Because of the associated time dimension, tile-wide adjustments that are based on any collected point later found to be invalid can be rolled back. There may be a whole history of adjustments available, not only in table form, but also available via visual representation on a virtual map provided by server application 112.

A second source of possible error in geospatial accuracy is that the base maps and aerial imagery (e.g., which may be from Google Maps™, Microsoft Bing™, or other source) used by platform 110 may themselves contain geospatial inaccuracies. Digital imagery used in geospatial application software is a computer-compatible version of an aerial photograph, satellite photograph, or other map image. Photography is taken from a high-altitude aircraft that flies over a particular geographic region. These photographs are then scanned into or transferred to a computer as digital photographs (raster images), making them available for use in a geographic information system (GIS). However, in order to be useful in a GIS application, digital imagery must be further processed to correct for scale distortions that occur when imaging the earth from the air, and to associate GPS points with every pixel in the imagery. This correction is called orthogonal rectification or ortho-rectification. These are terms used to describe aerial photography in digital format that has been digitally processed and transformed from image coordinates to real-world coordinates. Orthogonal rectification makes corrections within a photograph so that the scale is uniform throughout the resulting image and so that touching the photograph at any point returns what should be the real-world GPS points (in latitude and longitude) associated with that point. In this way, the digital ortho-photographs combine the image characteristics of a photograph with the geometric qualities of a map. Distances and locations should be able to be accurately measured from these images.

However, sometimes the orthogonal rectification process is of poor quality, due to problems with airplane flight alignment or camera inaccuracies in the collection of the images. In such a case, a user may see an infrastructure asset (e.g., manhole cover) in an aerial image, but, when he or she touches the infrastructure asset in the aerial image, it returns coordinates that do not in fact match the physical reality as recorded by someone in the field who is using GPS equipment to get a set of coordinates that is accurate to within a few inches. Thus, in an embodiment, workers in the field, after they have measured where a particular infrastructure asset is in the real world with highly accurate GPS equipment, and made the adjustment of the icon representing the asset itself, as discussed above, may then note a discrepancy between the as-measured latitude, longitude, and elevation of the infrastructure asset, and the latitude, longitude, and elevation associated with that asset in the aerial imagery tiles (e.g., as-measured coordinates of the manhole do not in fact match the coordinates of the manhole image in the aerial image itself). Using functionality embodied in the measurement module of client application 132, the technician may, using a field device (e.g., handheld device as user system 130) to, upon noticing the discrepancy in alignment between the real world reality and the image, simply touch the corresponding image point, representing an infrastructure asset, in the aerial imagery within client application 132. That point of the aerial image will be adjusted according to the accurate GPS coordinates at platform 110. This process of non-uniform adjustment can take place, under user control, whenever more than one point in any aerial imagery tile has been readjusted to real world-coordinates.

Thus, disclosed embodiments deal with the lack of geospatial accuracy and alignment that is systemic in the infrastructure management mapping space today via a systematic process of automatic, continual improvement. Specifically, they enable continual, systematic improvement of geospatial alignment and accuracy via a process of non-uniform geospatial corrective adjustments of either infrastructure data sets, aerial imagery data sets, and/or environmental attributes. In an embodiment, these adjustments are managed and implemented by cloud-based software (e.g., server application 112) based on the movement of one or more known control points to new locations which match collected, highly accurate geospatial coordinates. Correcting several control points per aerial image tile can much more closely align all points of the aerial image tile with more accurate real-world GPS points. As noted earlier, a manual process, known as rubber-sheeting, has been used previously in geospatial applications to manually adjust control points one by one in one map layer to match the corresponding points in another map layer. A unique aspect of disclosed embodiments are their ability, using artificial intelligence, to, in the very process of the field work inspection and repair itself, when workers are connected to platform 110 (e.g., which may comprise cloud-based services), carry out a process of continual improvement in real time which adjusts asset, aerial, and base map layers to create an unprecedented level of geospatial alignment and accuracy between all mapping levels and the actual physical world. Each new collected ground-truth point can then be used, in combination with all previously collected ground-truth points, to adjust all other related infrastructure points on that particular layer and tile that have not yet been anchored by collected ground-truth points.

The database structure managed by platform 110 may be designed to facilitate and leverage this process of continually improving geospatial alignment between infrastructure assets, aerial imagery, and physical reality. In an embodiment, this design comprises at least four primary dimensions for tracking infrastructure assets, as well as dimensions for all associated asset attributes such as valuation, asset condition (deterioration), work orders, predictive modeling, money spent on upkeep, etc. The four primary dimensions are the x, y, and z dimensions for all physically collected measurements, and a time dimension for when each measurement was taken. Every measurement of an infrastructure point position is thus an "as measured, as of" attribute of the associated infrastructure asset. Thus, it becomes possible to have queries that ask "where was this sewer line at this point in time?" that would reflect that the sewer line was repositioned or rebuilt as of a certain date, with a resulting new valuation, expected lifespan, etc. This design also allows the query of asset condition belonging to a specific infrastructure asset at any point in time, and the juxtaposition of that asset condition against the asset condition of that same infrastructure asset in another selected point in time. For instance, engineers can instantly see how the most recent video inspection for a particular pipe segment compares to the one from a year earlier, or the one from five years earlier. To facilitate the value of this embodiment, there may be time sliders both on the map and within the query screen provided by client application 132 and/or server application 112 that allows any query to be filtered by time constraints.

One reason that the disclosed processes that systematically refine the geospatial locations of infrastructure data and aerial imagery into highly accurate geospatial alignment are so important is that the resulting, very accurate geospatial alignment for all the different infrastructure layers (e.g., sewer manholes, sewer mains, sewer laterals, gas lines, property lines, or other utilities) that a municipality might want loaded in this (e.g., cloud-based) platform 110 acts like a "Rosetta Stone" for far more efficient infrastructure management. It allows for all sorts of synergistic, mathematical interactions and queries with the involved infrastructure assets that were previously unavailable as long as they were in disparate and inaccurate coordinate systems that did not match each other and did not match reality. Combining very accurate geospatial locations of infrastructure assets with the temporal dimension allows what may be called "temporal geo-polymorphism" to take place. With this temporal geo-polymorphism functionality, very advanced four-dimensional queries can look across all infrastructure, aerial, and other mapping layers in a selected geospatial area for a selected slice of time.

For example, in one embodiment comprising an infrastructure layer comprising sewer assets, it is possible to (a) on a virtual map, see generated symbols of where all the sewer main repairs in a certain time frame or by a certain contractor have taken place, and (b) accurately jump to any of those repairs and to have lined up, within several inches of accuracy, the matching segments of pre-repair sewer pipe video and post-repair video in order to perform quality control to ensure that the repairs were done and done correctly. In another example comprising an environmental attribute layer representing rainfall in addition to the sewer infrastructure layer, a query can match up rainfall distribution maps against involved sewer basins and then proportionately compare the increase in flow in various sewer mains during rainfall events in their sewer basins in order to identify the priority pipes that are afflicted with disproportionately high inflow and infiltration. Another relevant example is that, once this geospatial alignment has taken place for two asset classes, such as sewer pipes and gas lines, mathematical algorithms can instantly show on the map all points where any sewer pipe is within "x" meters of a gas line. This kind of analytical power is only available when assets are brought into the highly accurate geospatial alignment provided by the disclosed platform 110. It cannot be done in CAD tile systems.

3.2. Site Administration

In an embodiment, administration module 220 enables a user to administer application 200, according to his or her role, via user interface 210. It should be understood that some users may not have access to administration module 220, depending on whether or not their roles include any administrative privileges.

3.2.1. Profile

In an embodiment, administration module 220 comprises a profile module 221, which enables a user to manage his or her profile via user interface 210. Specifically, user interface 210 may receive data for a user's profile via one or more inputs and store the received data in a profile data structure representing the user's profile and managed by profile module 221, and/or display data retrieved from the profile data structure. A user's profile may comprise any data related to the user, such as the user's first name, last name, title, email address, username, password, and/or avatar (e.g., an image of the user). It should be understood that the username and password stored in the user's profile may be used to authenticate the user with application 200, prior to the utilization of application 200 or portions of application 200, using standard authentication techniques. Alternatively, other methods of authentication may be used (e.g., digital certificates, biometrics, etc.).

3.2.2. Accounts

In an embodiment, administration module 220 comprises an account module 222, which enables a user to manage accounts, users, and settings via user interface 210. Each account may represent an organization (e.g., a municipality). However, it should be understood that an account may represent a plurality of organizations (e.g., a group of municipalities) or a portion of an organization (e.g., a portion of a municipality's infrastructure(s)).

3.2.2.1. Account

User interface 210 may provide one or more inputs for adding, editing, and/or deleting an account. While application 200 may support a plurality of accounts, the processes disclosed herein will be primarily be described in the context of a single account. It should be understood that the processes disclosed herein for one account may be duplicated for multiple accounts. Even though all of the accounts may be provided by a single application 200, each account may be discretely accessible and/or manageable.

In addition, user interface 210 may receive account data for a given account and store the account data in an account data structure representing an account and managed by account module 222, and/or display account data retrieved from the account data structure. The accounts data structure may comprise data related to an organization represented by the account. These fields may comprise a name (e.g., "City of Santa Barbara"), an address (e.g., street address, city, state, and Zip code), a description, and/or any other information relevant to the organization.

3.2.2.2. Users

In an embodiment, account module 222 may also manage the users associated with a given account. User interface may enable a user to add, edit, and/or remove a user from the account. User interface 210 may receive user data for each user associated with the account and store the user data in a user data structure comprised in or associated with the account data structure. This user data may comprise one or more roles. User interface 210 may provide one or more inputs for adding or removing roles from a user associated with the account. It should be understood that each user may also be associated with a user profile (e.g., comprising a username and password for authentication).

Each role provides a user with one or more privileges within application 200. As an example, four roles may be provided: organization administrator, asset administrator, maintenance manager, and maintenance crew. The organization administrator role enables the associated user to manage the account, including, without limitation, editing the account data and/or editing the users associated with the account (e.g., inviting users, editing users' roles, deleting users, etc.). The asset administrator role enables the associated user to manage an asset catalog (e.g., derived from a dataset), including, without limitation, adding and removing assets and/or changing asset permissions. The maintenance manager role enables the associated user to add, edit, and remove workplans, share workplans, approve and reject work, and/or modify activities (e.g., add, edit, or delete activities). The maintenance crew role enables the associated user to view workplans, and/or edit activities. In an embodiment, a workplan represents a group of one or more asset(s) associated with one or more activities against which work is performed (e.g., by workers in the field).

Advantageously, the centralization of infrastructure data and asset management enables application 200 to serve multiple users from different departments in an organization (e.g., municipality), according to their particular roles and needs. Conventionally, it has been very difficult for different departments to share data and communicate in an efficient manner. Such departments may include engineering, operations, information technology (IT)/GIS. However, it should be understood that these are simply examples, and other departments and roles are contemplated. The disclosed application 200 allows all departments to more efficiently communicate with each other and others (e.g., consultants, contractors, etc.) using the same data on the same unified platform and for a plurality of infrastructure domains, while also supporting legacy or other external systems 140. As one example in the sewer domain, the engineering department of a municipality may utilize application 200 for hydraulic flow modeling, capital improvement planning, sanitary sewer management planning, compliance with state water boards, pipe line replacement, and Cured in Place Pipe (CIPP) lining. The operations department for the municipality may utilize the same application 200 for SSO reports, CCTV mainline inspections (e.g., including conditions, defects, PACP scores, etc.), manhole alerts, reports, and locations, cleaning and flushing lines, fats, oils, and grease (FOG) program inspections, root removal, grouting, spot repair, and pump station maintenance. The IT/GIS department for the municipality may utilize application 200 for GIS district maps, wastewater pipes (e.g., gravity, forced main, and laterlas), manhole assets, drainage inlet locations, pump stations and other structures, basins, sewer systems, and work areas.

3.2.2.3. Invitations

In an embodiment, account module 222 may enable a user to invite other users to access a given account via user interface 210. User interface 210 may provide one or more inputs for generating a new invitation, including one or more inputs for receiving recipient information, such as an email address. Account module 222 may transmit an email to the received email address. The email may include a link (e.g., hyperlink) to a login and/or registration webpage of user interface 210. Thus, a recipient of the email may follow the link to the webpage and log in to or register with application 200. When the recipient logs in to or registers with application 200 using the link in the invitation, the recipient's user profile may be automatically associated with the account from which the invitation was sent. In addition, the recipient-user may be assigned default role(s) and/or provided role(s) by an administrating user via user interface 210 (e.g., via the input(s) for receiving the invitation information, or following acceptance of the invitation by the recipient of the invitation).

In an embodiment, user interface 210 may provide a list of all pending and/or accepted invitations generated by account module 222 for a given account. For each generated invitation, the list may comprise an identifier of the recipient (e.g., email address to which the invitation was sent), date that the invitation was sent, and/or date that the invitation was accepted.

3.2.2.4. Settings

In an embodiment, account module 222 may enable a user to specify settings for an account via user interface 210. User interface 210 may provide one or more inputs for receiving and storing settings associated with an account. Account settings may include, without limitation, a time zone, a Uniform Resource Locator (URL) or portion of a URL for the account, and/or other settings.

In an embodiment, each account is associated with its own unique URL, such that application 200 is accessible for the account via the URL. For example, an account for Santa Barbara may be associated with the URL "city-of-santa-barbara.domain.com", whereas an account for San Diego may be associated with the URL "city-of-san-diego.domain-.com". Account module 222 may enable a user to alter at least a portion of the domain name for the account, such as the lowest level domain name (e.g., "city-of-santa-barbara" and "city-of-san-diego" in the above examples). However, account module 222 may ensure that, each time the domain name is set (e.g., added or modified), the set domain name does not conflict with the domain name for a different account provided by application 200 (e.g., "city-of-santabarbara" is not already associated with another account). If the set domain name conflicts with the domain name for a different account in application 200, user interface 200 may notify the user of the conflict and/or prompt the user to choose a different domain name.

3.3. Integrating Datasets

In an embodiment, administration module 220 comprises an integration module 223 which enables a user to integrate datasets for a given account via user interface 210. Integration module 223 may provide for the importation of datasets in a plurality of formats, including, without limitation, shapefiles, web feature services, geodatabases, and/or comma-separated values (CSV). In addition, integration module 223 may provide for the importation of closed-circuit television (CCTV) databases (e.g., comprising inspection media). Each dataset may comprise a collection of infrastructure assets, locations of those infrastructure assets (e.g., latitude, longitude, and/or elevation, address, etc.), and/or attributes (e.g., size, material, identifier, reference string, etc.) of those infrastructure assets.

In an embodiment, user interface 210 comprises a drag-and-drop area, into which a user may drag and drop a file or a set of files (e.g., a compressed folder, such as a zip file comprising a plurality of files). Alternatively or additionally, user interface 210 may comprise a file input which allows a user to browse accessible folders and select one or more files from those folders. Such files may comprise a shapefile, which is a popular geospatial vector data format for GIS software, developed and regulated by the Environmental Systems Research Institute (ESRI). Such files may also comprise CAD files compatible with one or more CAD software programs, geodatabases (e.g., created using ArcGIS™ by Environmental Systems Research Institute (Esri)) comprising data representing objects defined in a geometric space, CSV files, and CCTV databases comprising data representing an inspection of an infrastructure asset.

In an embodiment, user interface 210 may provide one or more inputs for specifying a web feature service (WFS) interface. For instance, user interface 210 may comprise an input for receiving a Uniform Resource Identifier (URI) of the WFS interface. In addition, if application, user interface 210 may comprise one or more inputs for receiving authentication information for authenticating with the WFS interface. A WFS interface responds to platform-independent requests for geographical features across the web, according to the WFS interface standard established by the Open Geospatial Consortium (OGC). Each WFS interface may be hosted on an external system 140.

Integration module 223 may, for each specified WFS interface, generate a request and post it to the URI specified via user interface 210 (e.g., using HTTP or HTTPS) using authentication information, if any, specified by the user. The request may encode an operation, query, or other type of request in, for example, XML or using key/value pairs. Subsequently, integration module 223 will receive a response to the request from the WFS interface. Responses from a WFS interface may comprise Geography Markup Language (GML) or shapefiles.

Integration module 223 may communicate with each WFS interface to receive datasets, including updates to existing datasets. For a given WFS interface, integration module 223 may retrieve updates for the datasets automatically periodically (e.g., hourly, daily, weekly, monthly, etc.) or manually in response to a user operation (e.g., via user interface 210). For example, user interface 210 may comprise an input for receiving an update frequency specified by the user for each WFS interface, and integration module 223 may retrieve updates for the dataset. Alternatively, a given WFS interface may communicate a real-time or periodic feed of updates to integration module 223. Thus, a dataset associated with the WFS interface may be automatically kept up to date.

In an embodiment, user interface 210 may provide one or more inputs for associating imported data (whether uploaded by a user or provided by a WFS interface) with a new or existing dataset. For example, user interface 210 may provide—along with the drag-and-drop area, file input, and/or input for specifying a URI for an WFS interface—a drop-down menu for selecting one or more options, such as an option to create a new dataset along with a list of identifiers of existing datasets. Thus, a user can choose to create a new dataset for the imported data or add the imported data to any of the identified existing datasets. When the imported data is added to an existing dataset, the infrastructure assets, locations, and/or attributes in the imported data and existing dataset may be compared and merged (e.g., with more recent locations and/or attributes for each infrastructure asset overwriting less recent locations and/or attributes for the infrastructure asset).

In an embodiment, user interface 210 may also provide a preview of the imported data on a virtual map. For instance, integration module 223 may parse the data to extract infrastructure assets represented in the data, along with their associated geolocations, and then plot the extracted infrastructure assets on the virtual map at their associated geolocations. In this manner, a user can visualize the represented infrastructure assets prior to importation to identify any problems with the imported data (e.g., wrong file, geospatial misalignment, etc.). Once, a user has confirmed that the data is proper (e.g., via the visualization on the virtual map), the user may select an input (e.g., an "import" button or icon) to finalize the importation of the data.

In an embodiment, user interface 210 may provide a notes area associated with each set of imported data. This notes area may be similar or identical to the other notes areas described elsewhere herein, and, like those notes areas, may allow mentions of other users (e.g., using the special character "@"), and direct message notifications to mentioned users. In this manner, a discussion can develop around any particular set of imported data.

In an embodiment, regardless of how imported data is received (e.g., via a file upload, WFS interface, etc.) and in what format the data is received (e.g., CSV, GML, Microsoft™ Database (MDB), etc.), the file may be parsed and normalized into a standard data format (e.g., a JSON or JSON-based format) used by application 200 for all integrated datasets. Regardless of the format of the data when it is imported, all of the data (e.g., infrastructure assets) is normalized into the standard data format, thereby allowing it to be treated in an identical or similar manner irrespective of its source. In addition, the data may be synchronized geospatially. The original data (e.g., the original files uploaded by a user) may be maintained in persistent memory or discarded, depending on the particular implementation.

In an embodiment, integration module 223 comprises a software adapter for each dataset format. For example, integration module 223 may comprise a software adapter for each of a plurality of third-party software applications or platforms. Each software adapter may parse and normalize an output of the respective third-party software application or platform (e.g., uploaded using user interface 210 or retrieved from a WFS interface) into the standard data format used by application 200. Such adapters are advantageous, since, even though industry standards may apply to data for certain infrastructure domains (e.g., PACP for pipeline inspection), those standards are often not well-defined and implemented differently from one third party to another. Alternatively or additionally, one or more imported dataset formats may be normalized manually (e.g., by an operator of platform 110), for example, if there is not a software adapter available for them. However, ideally, the need for manual normalization would diminish as municipalities adopt more standardized data-management systems.

In an embodiment, integration module 223 also enables the exportation of datasets into one or more formats. For example, user interface 210 may provide one or more inputs for selecting a dataset to export and a format in which to export the dataset. Alternatively, user interface 210 may provide an input for selecting the dataset to export and export the dataset in the same format in which it was imported. In either case, the selected dataset may be converted from the standard data format used by application 200 into the export format. Alternatively, in embodiments in which the original data is maintained and the dataset is to be exported in the same format as the original data, the original data may be updated (e.g., to reflect modifications made during management of the dataset through application 200), and this updated data may be exported. In either case, platform 110 allows a user to import data (e.g., a shapefile), modify the data (e.g., edit the fields in data structures for infrastructure assets represented in the shapefile), and export the modified data. Regardless of how the data is exported, this exported data may be pushed back to a third-party asset management system (e.g., using an API of the third-party asset management) or used in some other manner.

3.4. Managing Datasets

In an embodiment, a number of modules enable a user to manage datasets via user interface 210. As discussed elsewhere herein, these datasets may wholly or partially represent data imported from one or more external sources by integration module 223. Additionally or alternatively, these datasets may wholly or partially represent data that has been input by a user (e.g., via user interface 210). In either case, each dataset may be stored in the same standard format by application 200, for example, in database(s) 114.

Each dataset may comprise a representation of an infrastructure, including one or more infrastructure assets. In some cases, a dataset may represent a single type of infrastructure asset (e.g., manholes), while, in other cases, a dataset may represent multiple types of infrastructure assets (e.g., all the assets of a sewer infrastructure, including manholes, pipes, etc.). In addition, a dataset may represent only a portion of an infrastructure, an entire infrastructure, or multiple infrastructures (e.g., a sewer infrastructure and potable water infrastructure).

3.4.1. Configuration

In an embodiment, datasets module 225 of administration module 220 enables a user to configure an asset catalog, derived from one or more datasets for a given account, via datasets module 225 and user interface 210. The asset catalog may represent all of the infrastructure assets in the dataset(s), and may include one or more types of infrastructure assets.

In an embodiment, datasets module 225 may extract all of the asset types from all of the dataset(s) associated with an account. For example, datasets module 225 may parse the dataset(s) to identify each type of represented infrastructure asset, as well as parameters associated with each asset type.

In an embodiment, user interface 210 may provide one or more inputs for selecting a type of infrastructure asset, represented in the dataset(s) for an account, to configure.

User interface 210 may provide one or more inputs for configuring fields associated with each type of infrastructure asset. Each field may comprise one or more configurable attributes. For example, each field for a given type of infrastructure asset may comprise an identifier, a name, a field type (e.g., number, string, Boolean), a visibility property (e.g., visible or hidden), and/or a uniqueness property (e.g., whether the field is required to be unique for each infrastructure asset of the asset type). In this case, the name, field type, visibility property, and uniqueness property attributes may be configurable by a user and/or by the system. For example, infrastructure assets imported into application 200 through different datasets may have differently-named, but identical or similar, fields—even if the infrastructure assets are of the same asset type—due to the different datasets having different schema. Application 200 (e.g., automatically or via user input) may standardize the names of these fields, such that all infrastructure assets (of the same type or even across types) have the same names for the same fields, irrespective of how they were imported, to facilitate comparisons between those infrastructure assets.

As an example, an asset type representing mainline pipes in a sewer infrastructure may comprise fields for length of the pipe, diameter of the pipe, sewer type, pipe material, directionality, identifier of an upstream manhole, identifier of a downstream manhole, and a segment reference. In this case, the segment reference may be configured as a unique field of the mainline pipe asset type, such that the segment reference can be used to uniquely identify each mainline pipe. If it is desirable for one or more of these fields to be hidden (e.g., to streamline information by removing unnecessary information presented in user interface 210), a user can specify that these field(s) be hidden. A hidden field for an asset type is not shown in user interface 210 when the field values for a particular infrastructure asset of that type are displayed.

As another example, an asset type representing manholes in a sewer infrastructure may comprise fields for an asset identifier, name, depth, diameter, material, latitude, longitude, elevation, GIS timestamp, creator, created timestamp, updater, updated timestamp, and comments. Notably, in this example, the mainline pipe asset type is not associated with a geolocation (e.g., latitude, longitude, elevation). This is because the geolocation of a mainline pipe asset may be defined by the geolocations of the upstream manhole and the downstream manhole identified in the upstream manhole field and downstream manhole field of the mainline pipe asset.

In an embodiment, an asset type represented in assets module 240 may comprise fields representing dynamic (e.g., real-time) attributes, such as real-time or periodic sensor readings. Assets module 240 may receive the real-time or periodic data via network(s) 120 from the sensors directly. Alternatively, asset module 230 may receive the real-time or periodic data via network(s) 120 from external system(s) 140 that are interfaced with the sensors, and/or from user system(s) 130 that are interfaced with the sensors or into which the sensor readings are input (e.g., by a worker in the field using client application 132).

As an example, the data structure representing a bridge as an infrastructure asset may comprise a field for storing seismic data. The bridge may be equipped with seismic sensors which are communicatively connected to an external system 140 and transmit real-time seismic data to external system 140. External system 140 may, in turn, transmit the real-time seismic data to application 200 over network(s) 120 either periodically (e.g., every 15 minutes) or in real time. Application 200 may receive the real-time seismic data and pass the real-time seismic data to assets module 240, which may identify the data structure representing the bridge (e.g., using an identifier of the asset or sensor included with the seismic data) and update the field for storing seismic data in the identified data structure with the received seismic data.

3.4.2. Permissions

In an embodiment, administration module 220 enables a user to set permissions for the asset catalog via datasets module 225 and user interface 210.

In an embodiment, permissions may be set according to asset type. For example, user interface 210 may provide one or more inputs for associating users with each asset type in the asset catalog. In addition, for each asset type in the asset catalog, user interface 210 may provide one or more inputs for assigning one or more permissions to each user associated with the asset type. Permissions may include, for example, a read permission for viewing infrastructure assets of the asset type, a write permission for modifying infrastructure assets of the asset type, a delete permission for deleting infrastructure assets of the asset type from the datasets, and/or a share permission for sharing infrastructure assets of the asset type.

In an embodiment, users may be associated with an asset type in groups, and permissions may be assigned to the group of users. For example, an "everyone" group may exist, which, if associated with an asset type, gives every user the associated permissions with respect to the asset type. As a default, each asset type in the asset catalog may be associated with the "everyone" group which may only have a read permission for viewing infrastructure assets of the asset type. It should be understood that other user groups are possible (e.g., all users having a certain role, such as the asset administrator role, as described elsewhere herein), including user-generated groups. For example, in an embodiment, a user could create an ad hoc user group using user interface 210 to name or otherwise provide an identifier of the group and select one or more users to be included in the group. When this ad hoc group is associated with an asset type and one or more permissions, all of the users in the group are provided with those permissions for that asset type.

As an example, the asset catalog may comprise a manhole asset type and a mainline pipe asset type. The "everyone" group may be associated with both asset types and, for both asset types, be assigned the read permission, such that every user may view the manhole and mainline pipe assets. In addition, an administrative user may be associated with both asset types and, for both asset types, have read, write, delete, and share permissions, such that the administrative user may view, edit, delete, and share the manhole or mainline pipe assets. Sharing, for example, may include providing information related to one or more assets (e.g., details about the asset(s), attributes of the asset(s), a view of the asset(s), etc.) to one or more other users.

3.5. API

In an embodiment, application 200 provides an application programming interface (API) 270. For example, one or more external systems 140 or external applications or modules may interface with application 200 via API 270. API 270 may provide Representational State Transfer (REST) and communicate over HTTP or HTTPS by responding to well-known HTTP verbs (e.g., GET, POST, PUT, DELETE, etc.). API 270 may be fully documented (e.g., via one or more webpages of user interface 210). In this manner, a developer may customize application 200 on platform 110 to the developer's particular needs by interfacing custom software modules to application 200 via calls to URI(s) specified in API 270. In an embodiment, data may be transmitted to and received from API 270 using JavaScript Object Notation (JSON).

API 270 may allow operations to performed on virtually any data structure that a user may view and/or modify via application 200. For example, API 270 may allow the retrieval and/or modification (e.g., adding, editing, deleting) of datasets, workplans, activities (descriptions, videos, notes, etc.), inspections (e.g., descriptions, media, observations, etc.), viewports, files, favorite locations, filters, etc. for an account within application 200. As an example, a user or module could retrieve a list of activities within the account for Santa Barbara—for which the lowest-level domain has been specified as "city-of-santa-barbara", as discussed elsewhere herein—by sending a GET request to city-of-santa-barbara.domain.com/api/activities. It should be understood that authentication may be required to utilize API 270, and that any of a number of well-known authentication methods may be utilized for this purpose.

3.6. Operation and Management of Infrastructure Assets

In an embodiment, application 200 comprises one or more modules for the operation and management of infrastructure assets represented in the one or more datasets of a given account (e.g., datasets generated from shapefiles, database files, etc. imported by integration module 223 or from data received from a WFS interface).

3.6.3. Visualization

In an embodiment, application 200 comprises a views module 230, which enables a user to visualize one or more of the infrastructure assets in user interface 210. Views module 230 may combine representations of infrastructure assets with a virtual map, for example, by overlaying visual representations of infrastructure assets over a virtual map. Infrastructure assets, such as manholes, junctions, intersections, street lights, trees, boxes, fire hydrants, etc. may be represented by dots on the virtual map, whereas infrastructure assets, such as sewer pipes, potable water lines, gas lines, electrical lines, oil pipes, roads, bridges, sidewalks, etc. may be represented as lines on the virtual map.

In an embodiment, these visual representations of infrastructure assets are color coded, such that the visual representation of each infrastructure asset of a given type is the same color, whereas the visual representations for infrastructure assets of different types are different colors. Alternatively or additionally, visual representations of infrastructure assets meeting one or more of the same criteria (e.g., matching a filter or search query) may be the same color, whereas the visual representations of infrastructure assets not meeting the same criteria are a different color or colors.

Furthermore, in an embodiment, each user may be able to set the colors, line widths, and/or other aspects of the visual representations of individual infrastructure assets and/or types of infrastructure assets according to his or her own preference, using one or more inputs of user interface 210. For example, a first user associated with an account may set the color of all visual representations of manholes to green and the color of all visual representations of sewer pipes to red, whereas a second user associated with the account may set the color of all visual representations of manholes to blue and the color of all visual representations of sewer pipes to green. Alternatively, an administrative user of an account may be enabled to set the colors of individual infrastructure assets and/or types of infrastructure assets for all users of the account and/or as a default using a user interface 210 (e.g., by changing a setting managed by account module 222).

Figure 4A:
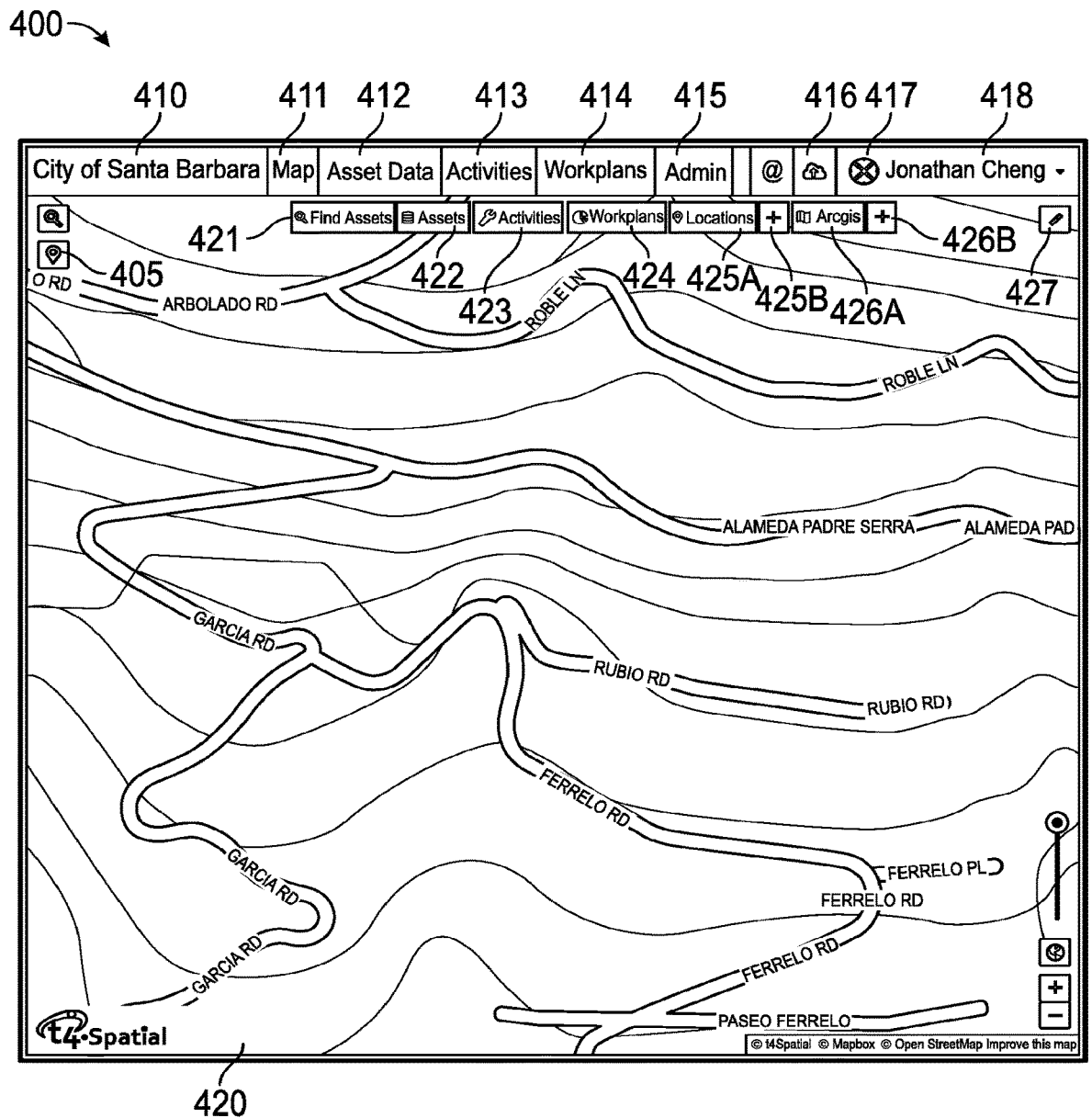

FIG. 4A illustrates a webpage 400 of user interface 210, according to an embodiment. Webpage 400 comprises a navigation frame 410, including navigational inputs, and a virtual map frame 420, including a virtual map.

In the illustrated example, navigation frame 410 comprises a "Map" input 411 for viewing virtual map frame 420, an "Asset Data" input 412 for managing an asset catalog, an "Activities" input 413, a "Workplan" input 414 for managing workplans, an "Admin" input 415 for performing administrative features (e.g., as described elsewhere herein with respect to administration module 220), a message notification input 416, a cloud input 417 for uploading files to cloud storage (e.g., database(s) 114) and/or checking the progress of a file upload to cloud storage, and a profile input 418 for managing the current user's profile and/or session.

Furthermore, in the illustrated example, virtual map frame 420 comprises a search input 421 for searching infrastructure assets based on a character string, an asset input 422 for selecting one or more types of infrastructure assets (e.g., represented by a particular dataset), represented in the asset catalog, to view on the virtual map, an activities input 423 for selecting one or more types of activity or groups of activities to view on the virtual map, a workplans input 424 for selecting one or more workplans to view on the virtual map, a locations input 425A for selecting a particular view of the virtual map, a new location input 425B for saving a view of the virtual map, an ArcGIS input 426A for selecting an ArcGIS layer, a new ArcGIS input 426B for adding a new ArcGIS layer, and/or a lasso input 427 for individually selecting assets and/or lassoing a group of assets within the virtual map. Virtual map frame 420 may also comprise a current location input 405, which centers or marks a current location of the user system 130 executing client application 132 (e.g., as determined by a GPS receiver in the user system 130) in the virtual map. In an additional or alternative embodiment, virtual map frame may also comprise a filter input (not shown) for selecting one or more saved filters (e.g., representing a query of infrastructure assets based on one or more criteria).

Figure 4B:
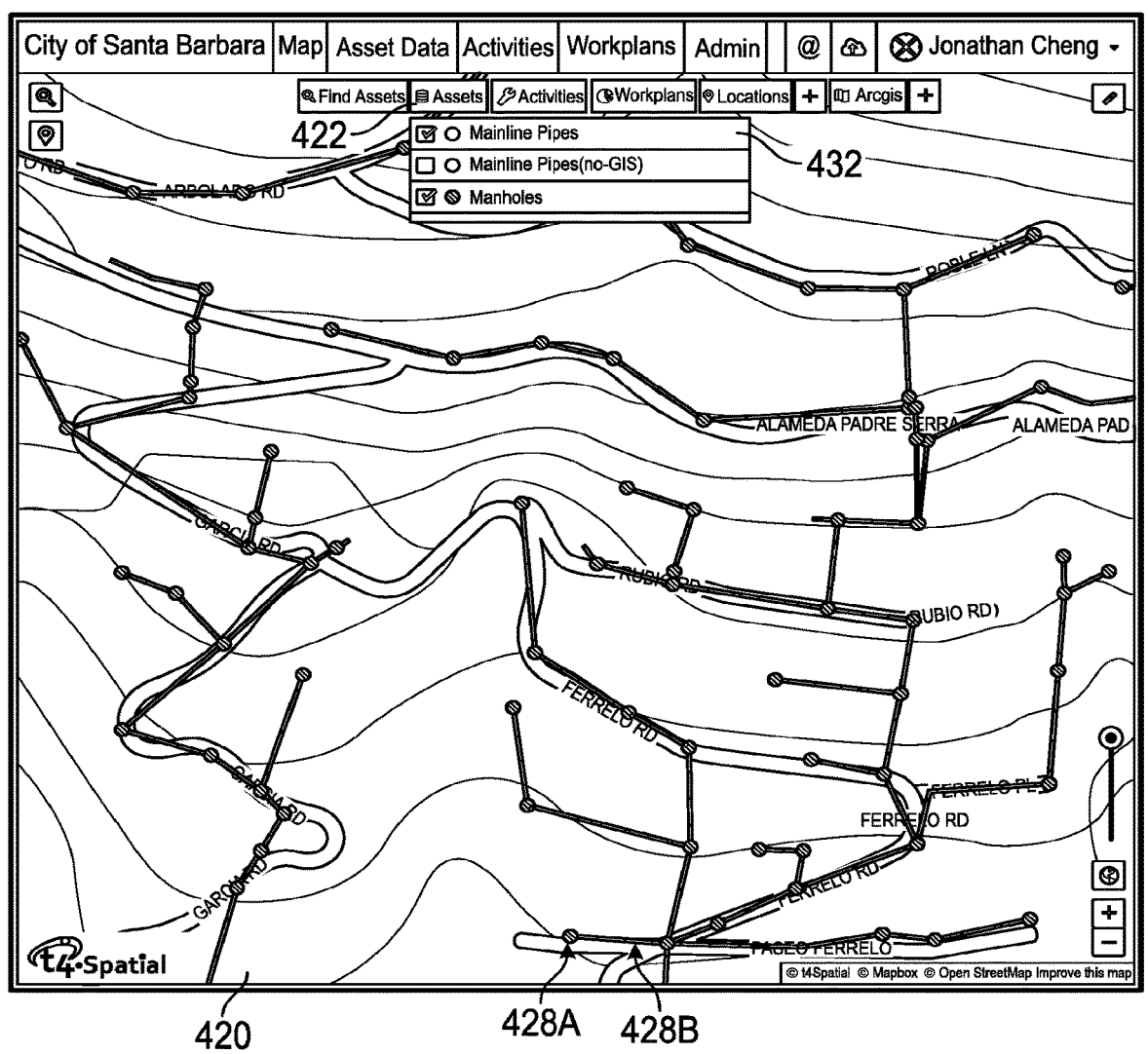

FIG. 4B illustrates webpage 400 of user interface 210 after a user has selected asset input 422 in FIG. 4A, according to an embodiment. Once the user selects asset input 422, a list 432 of selectable asset types from the asset catalog is overlaid on virtual map frame 420. A user may select one or more of the asset types, for example, by clicking on a checkbox next to each asset type that the user wishes to select. A visual representation for each infrastructure asset of the selected asset type(s) is then overlaid on the virtual map in virtual map frame 420 at a location corresponding to a location stored for that infrastructure asset (e.g., in latitude, longitude, and/or elevation fields in a data structure representing the particular infrastructure asset). In this manner, a user can visualize each of the infrastructure asset types individually or in combination with other infrastructure asset types, for example, by selecting the asset types to be displayed (e.g., overlaid) in asset list 432.

In the illustrated example, the user has selected the "Mainline Pipes" and "Manholes" asset types in asset list 432. In response, visual representations 428A of manholes within virtual map frame 420 and visual representations 428B of mainline pipes within virtual map frame 420 are overlaid on the virtual map at the locations associated with each infrastructure asset. For example, for each manhole, views module 230 may match a latitude and longitude in the latitude and longitude fields of the data structure representing the manhole to a latitude and longitude position on a portion of the virtual map visible within virtual map frame 420, and a visual representation of the manhole (e.g., a dot, an icon, an asset identifier) may be overlaid at or near that position. In addition, for each mainline pipe, views module 230 may identify an upstream and downstream manhole for the pipe, access data structures representing the upstream and downstream manholes to obtain a latitude and longitude for both of the upstream and downstream manholes, match those latitudes and longitudes of the upstream and downstream manholes to positions on the virtual map visible within virtual map frame 420, and then overlay a visual representation of the mainline pipe (e.g., a line) between those positions for the upstream and downstream manholes. It should be understood that these are simply examples, and that other types of infrastructure assets may be represented and positioned in a similar manner.

The view of the virtual map may be zoomed in, zoomed out, and/or scrolled using one or more inputs or operations, and the visual representations of infrastructure assets may be updated each time the virtual map view changes. It should be understood that, in an embodiment, only those infrastructure assets which correspond to a position in the portion of the virtual map currently visible in virtual map frame 420 are visually represented. Infrastructure assets corresponding to positions outside of the visible portion of the virtual map would not be visually represented unless and until a user scrolled, zoomed, or otherwise manipulated the visible portion of the virtual map such that the position of those infrastructure assets corresponded to positions within the visible portion of the virtual map.

Figure 4C:
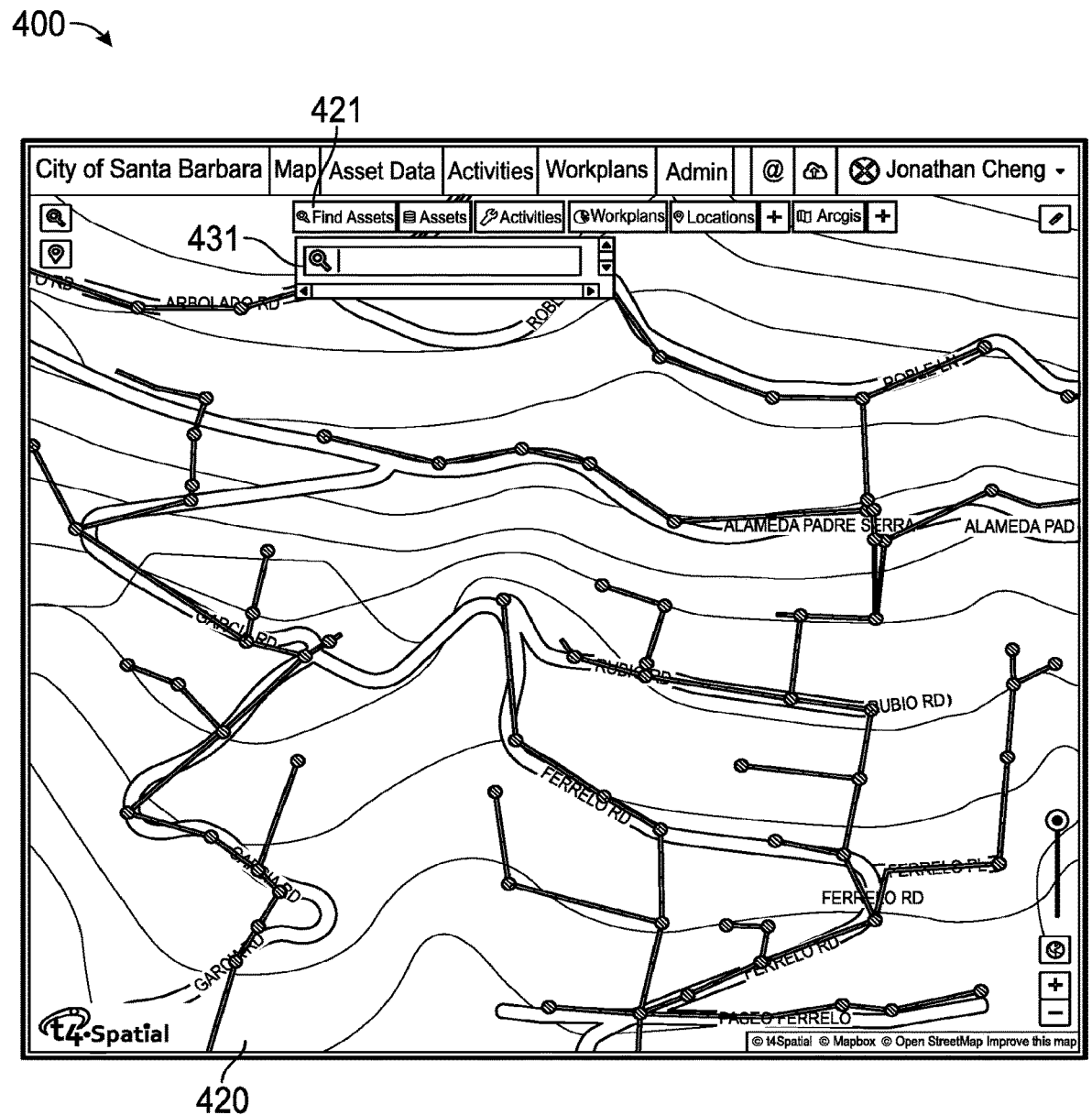

FIG. 4C illustrates webpage 400 of user interface 210 after a user has selected search input 421 in FIG. 4B, according to an embodiment. Once the user selects search input 421, a search input box 431 is overlaid on virtual map frame 420. A user may enter a character string into search input box 431 (e.g., via a virtual or physical keyboard) to initiate a search of infrastructure assets using the character string as a search string. As the user is entering a character string, character by character, predictive searching may be used to suggest completions of the character string based, for example, on an index of the names of all infrastructure assets stored for the given account. In response to a search, application 200 may identify one or more infrastructure assets matching the search string. In addition, views module 230 may remove all of the visual representations of infrastructure assets (e.g., visual representations 428A and 428B) from the virtual map except for those visual representations that are associated with the identified infrastructure asset(s). Alternatively, views module 230 could maintain the visual representations of all infrastructure assets selected in asset list 432, but highlight those visual representations that are associated with the identified infrastructure asset(s) (e.g., by changing their color, size, line weighting, etc.). For example, if the user typed "mh6" into search input box 431, views module 230 may change virtual map frame 420 to display visual representations of only those infrastructure assets that contain "mh6" within their name or other identifier (e.g., manholes named "mh600," "mh601," "mh602," etc.) or highlight those visual representations of infrastructure assets that contain "mh6" within their name or other identifier. However, it should be understood that the search does not have to be limited to identifiers, and may include other fields, such as diameter, materials, descriptions, comments, other attributes of imported or visible asset types, etc.

Figure 4D:
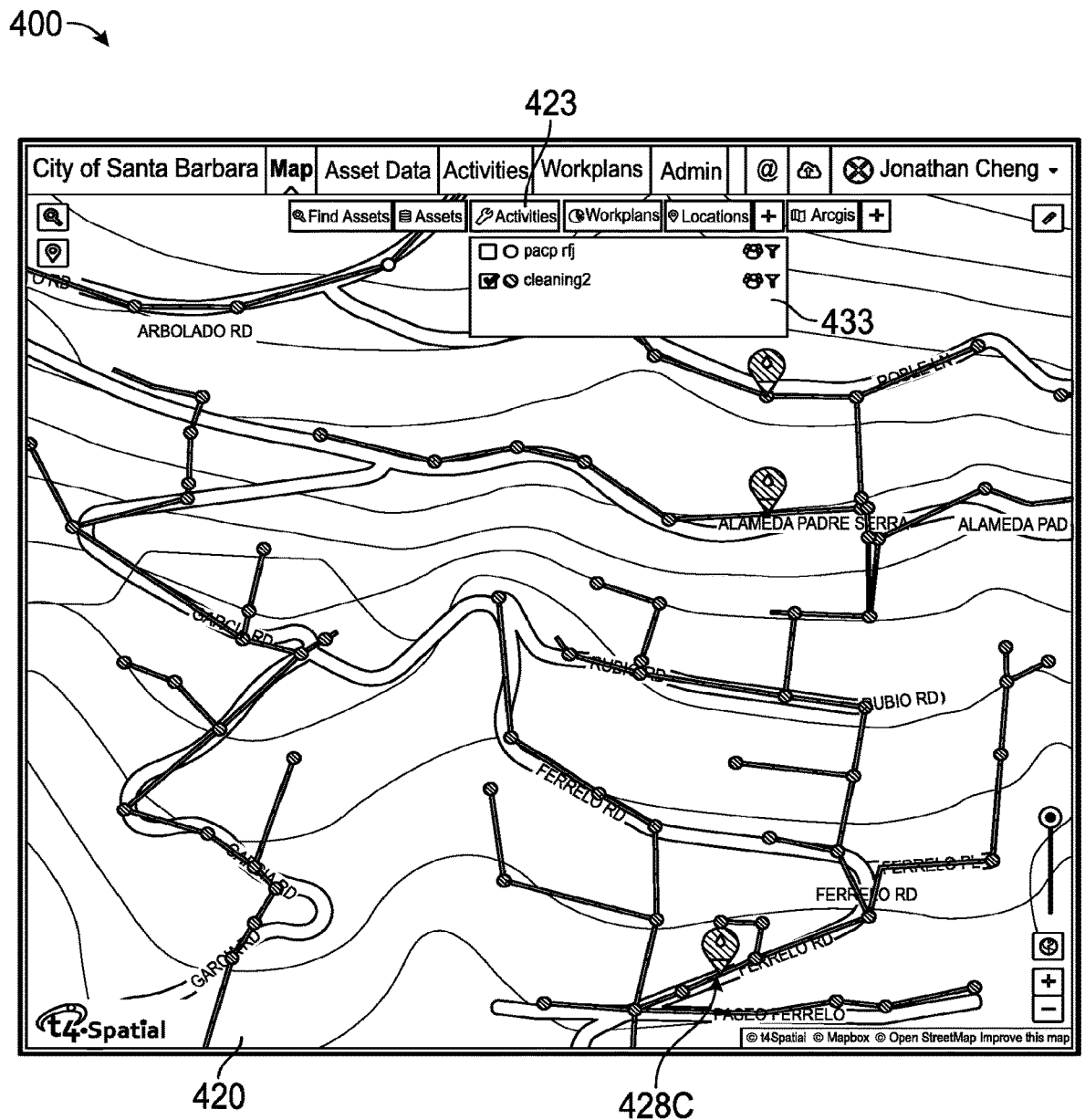

FIG. 4D illustrates webpage 400 of user interface 210 after a user has selected activities input 423 in FIG. 4A, 4B, or 4C and selected an activity type, according to an embodiment. When the user selects activities input 423, an activities list 433 is overlaid on virtual map frame 420. In the illustrated example, the user has selected a cleaning activity type, representing a query for cleaning activities associated with any infrastructure assets in the visible portion of the virtual map, from activities list 433. In response, views module 230 has highlighted the visual representations of those infrastructure assets which have a cleaning activity associated with them. In this case, these infrastructure assets are highlighted by overlaying icons 428C which point to each infrastructure asset having an associated cleaning activity. Alternatively, these infrastructure assets may be highlighted in a different manner (e.g., by changing their color, size, line weighting, etc.). In this manner, a user can easily and visually distinguish those infrastructure assets associated with the selected activity or activities.

Similarly, in an embodiment which has a filter input (not shown) which allows a user to select previously-saved filters, when the user selects the filter input, a filter list may be overlaid on virtual map frame 420. The user may select a saved filter, representing a query for infrastructure assets satisfying one or more criteria (e.g., for mainline pipes with a diameter greater than seven), from the filter list. In response, views module 230 may highlight (e.g., via icons, by changing their color, size, line weighting, etc.) the visual representations of those infrastructure assets which match the filter (i.e., mainline pipes having a diameter greater than seven). In this manner, a user can easily and visually distinguish those infrastructure assets matching the selected filter(s).

Figure 4E:
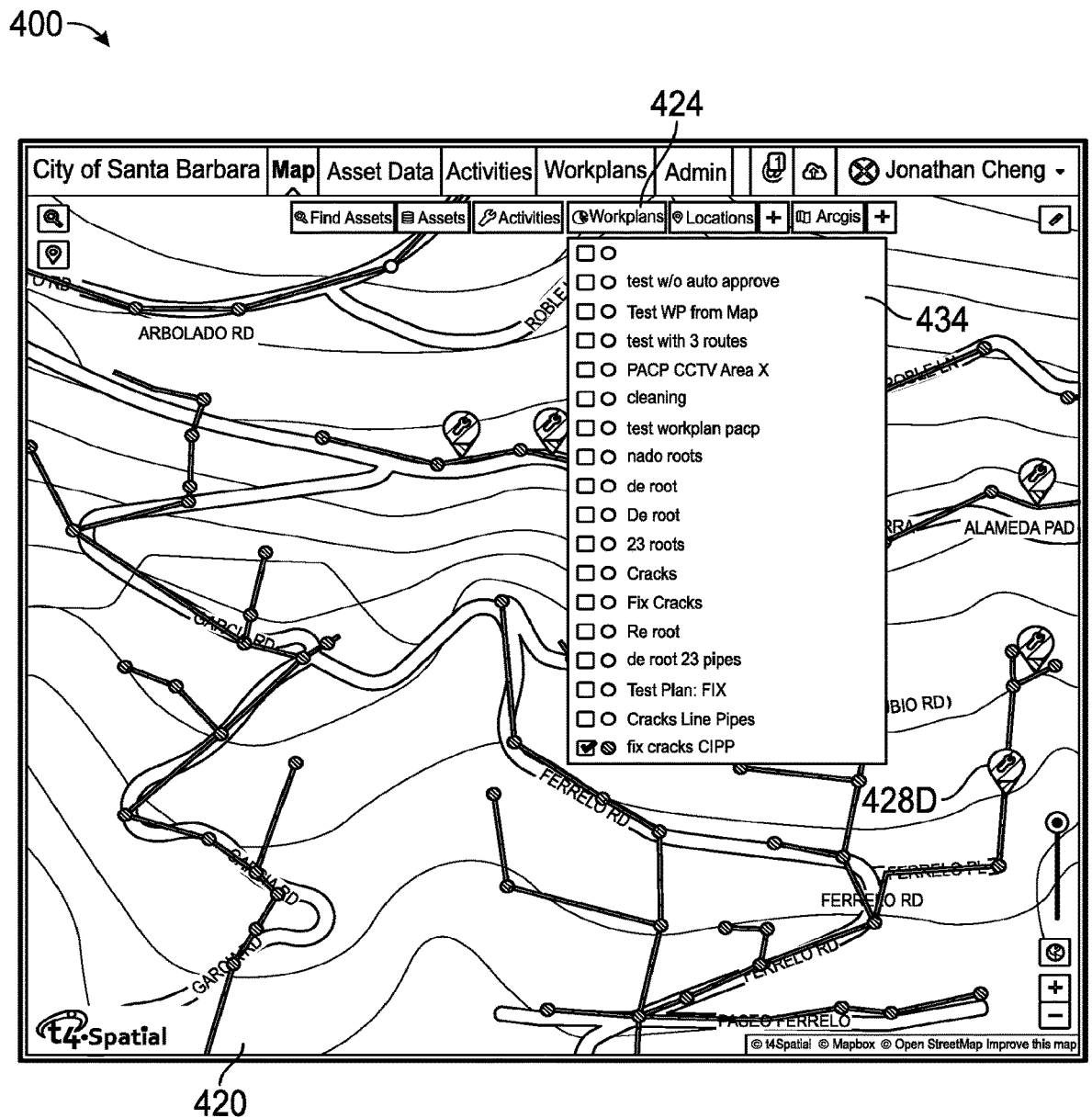

FIG. 4E illustrates webpage 400 of user interface 210 after a user has selected workplans input 424 in FIG. 4A, 4B, 4C, or 4D and selected a workplan, according to an embodiment. When the user selects workplans input 424, a workplans list 434 is overlaid on virtual map frame 420. In the illustrated example, the user has selected a workplan for fixing cracks from workplan list 434. In response, views module 230 has highlighted the visual representations of those infrastructure assets which are included in the selected workplan. In this case, these infrastructure assets are highlighted by overlaying icons 428D which point to each infrastructure asset included in the selected workplan. Each of these icons may comprise an image that indicates a type of activity to be performed as part of the workplan (e.g., a wrench representing a repair, a raindrop representing a cleaning, a video camera representing an inspection, a tree representing a re-rooting, etc.). Alternatively, these infrastructure assets may be highlighted in a different manner (e.g., by changing their color, size, line weighting, etc.). In this manner, a user can easily and visually distinguish those infrastructure assets included within the selected work plan(s).

Figure 4F:
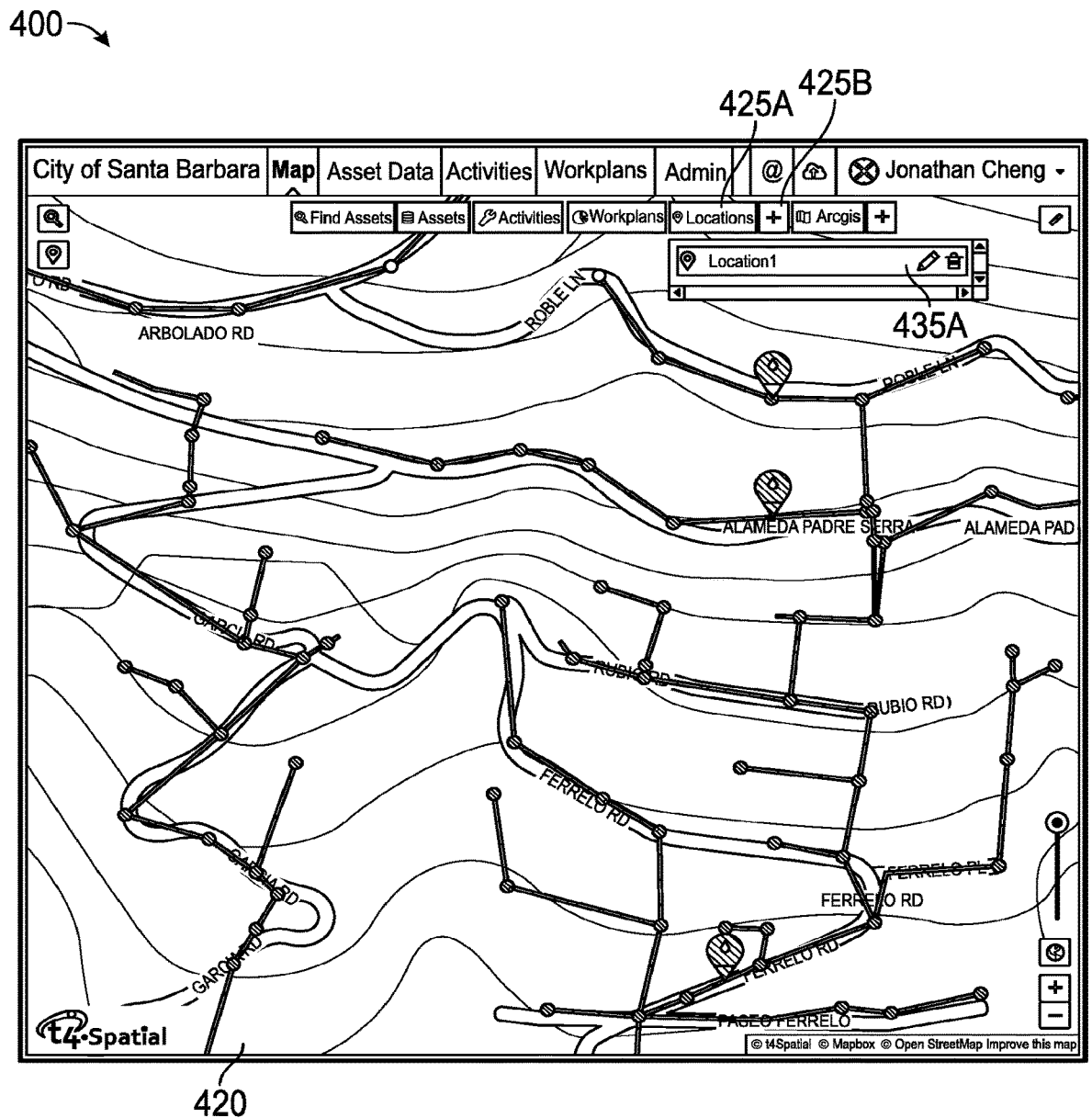
Figure 4G:
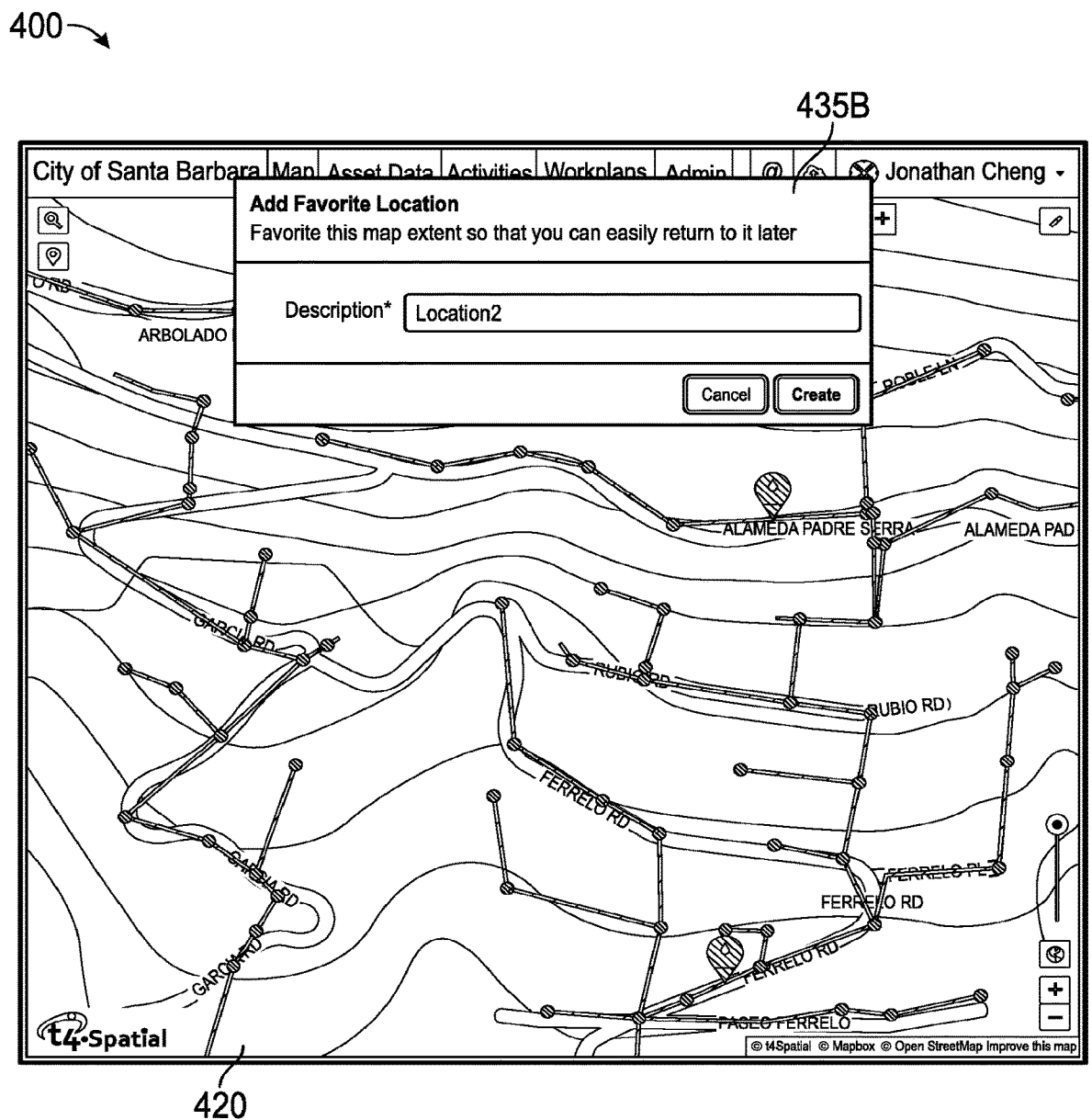
Figure 4H:
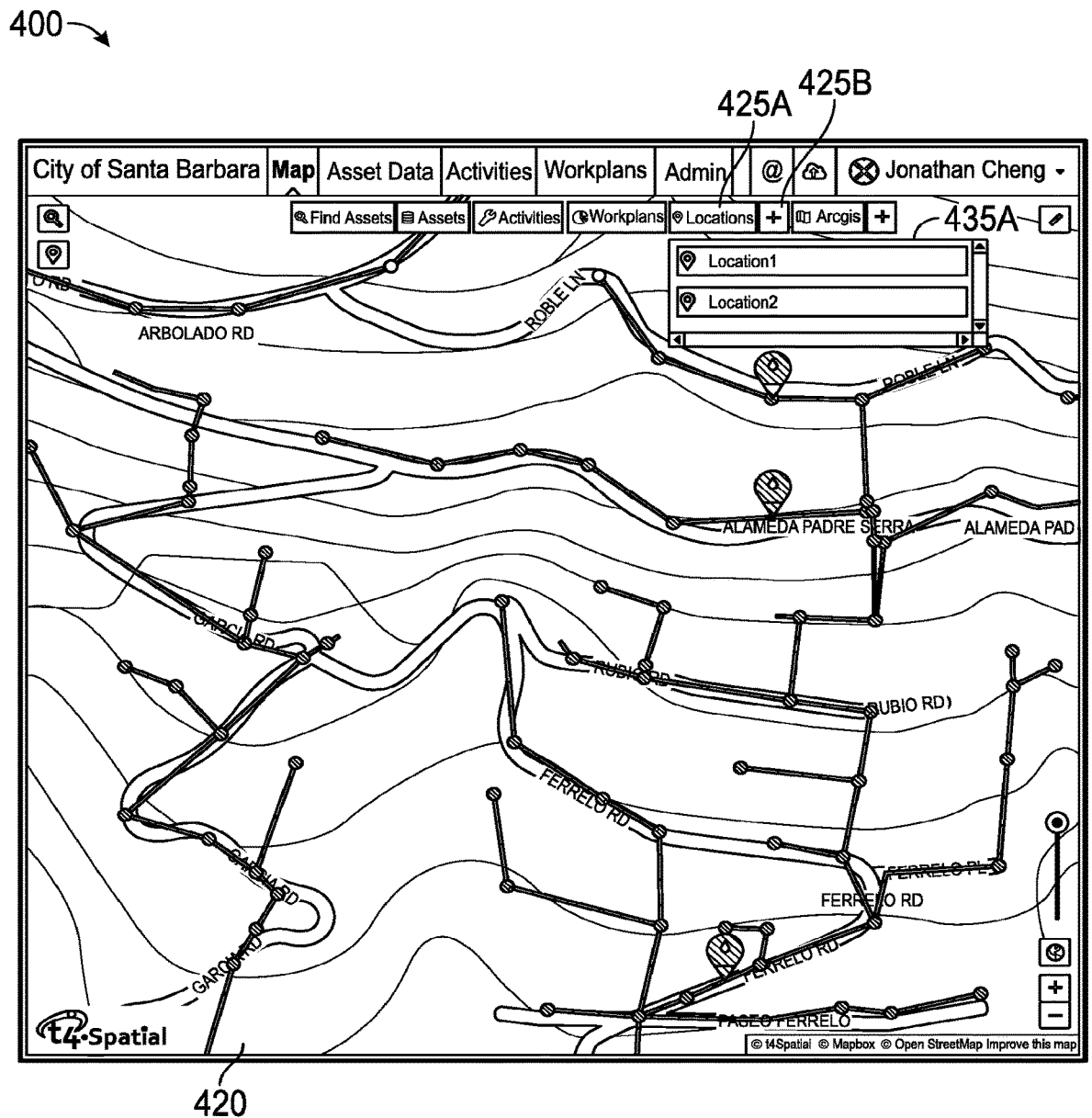
Figure 4I:
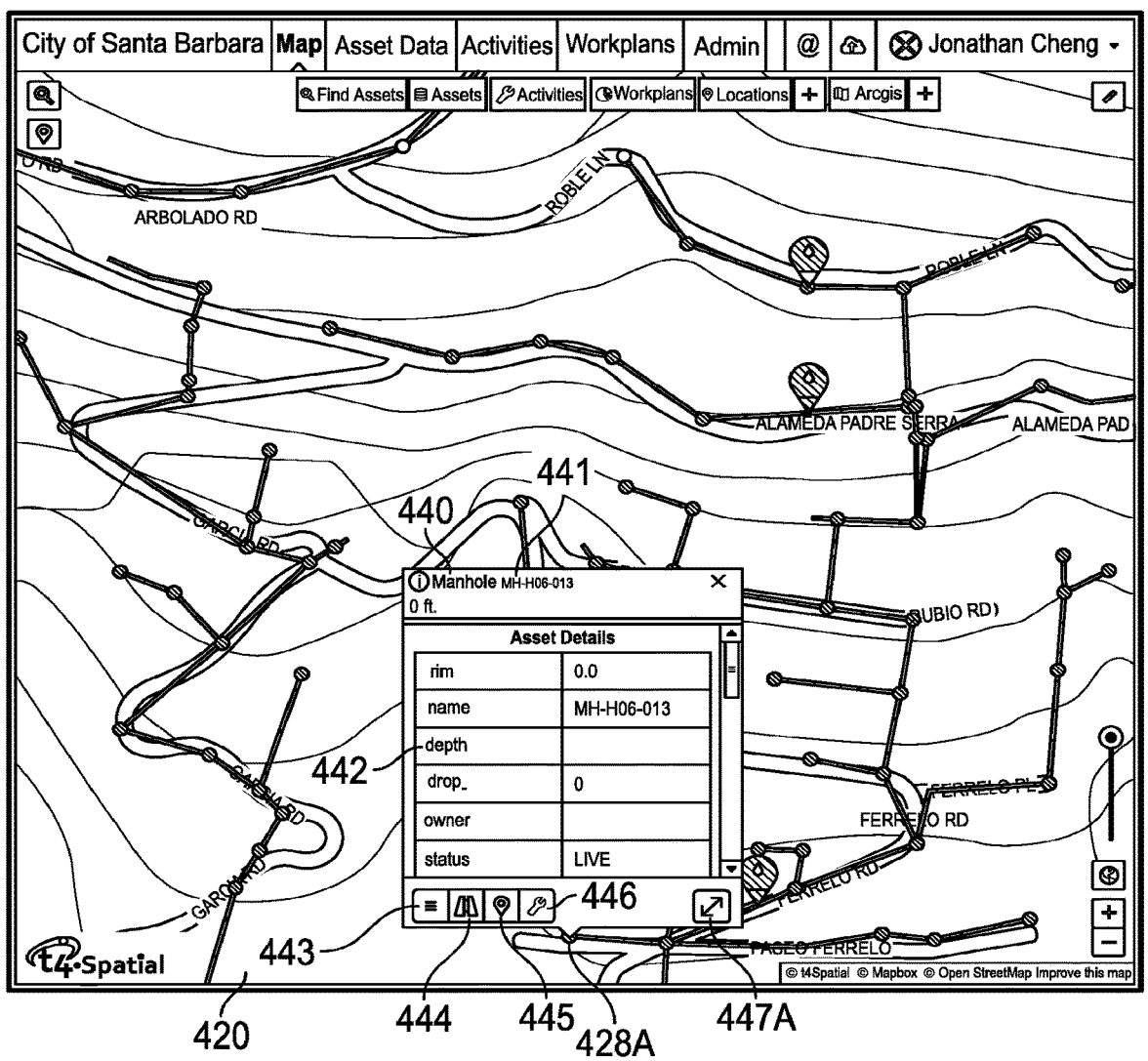
Figure 4J:
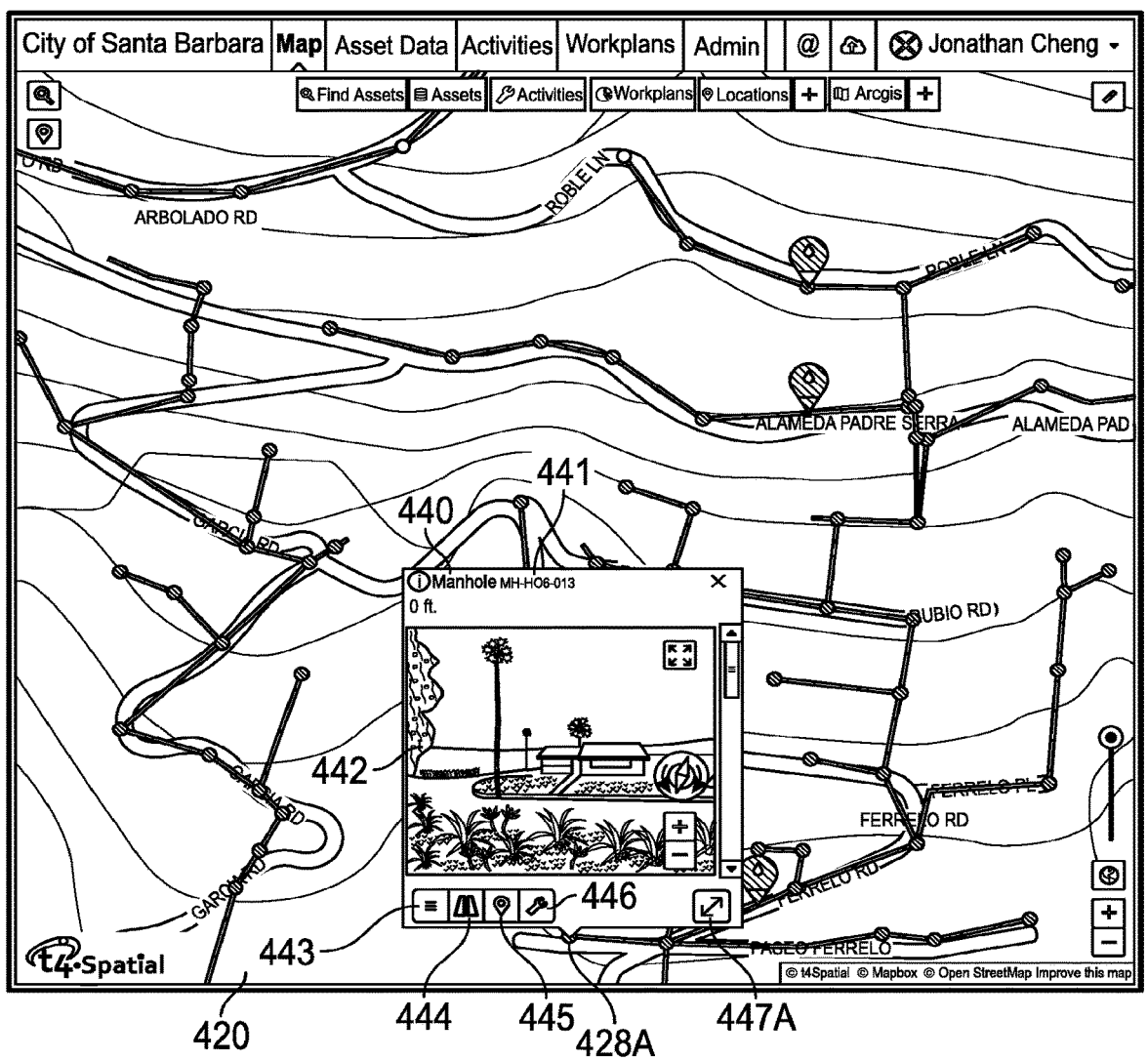
Figure 4K:
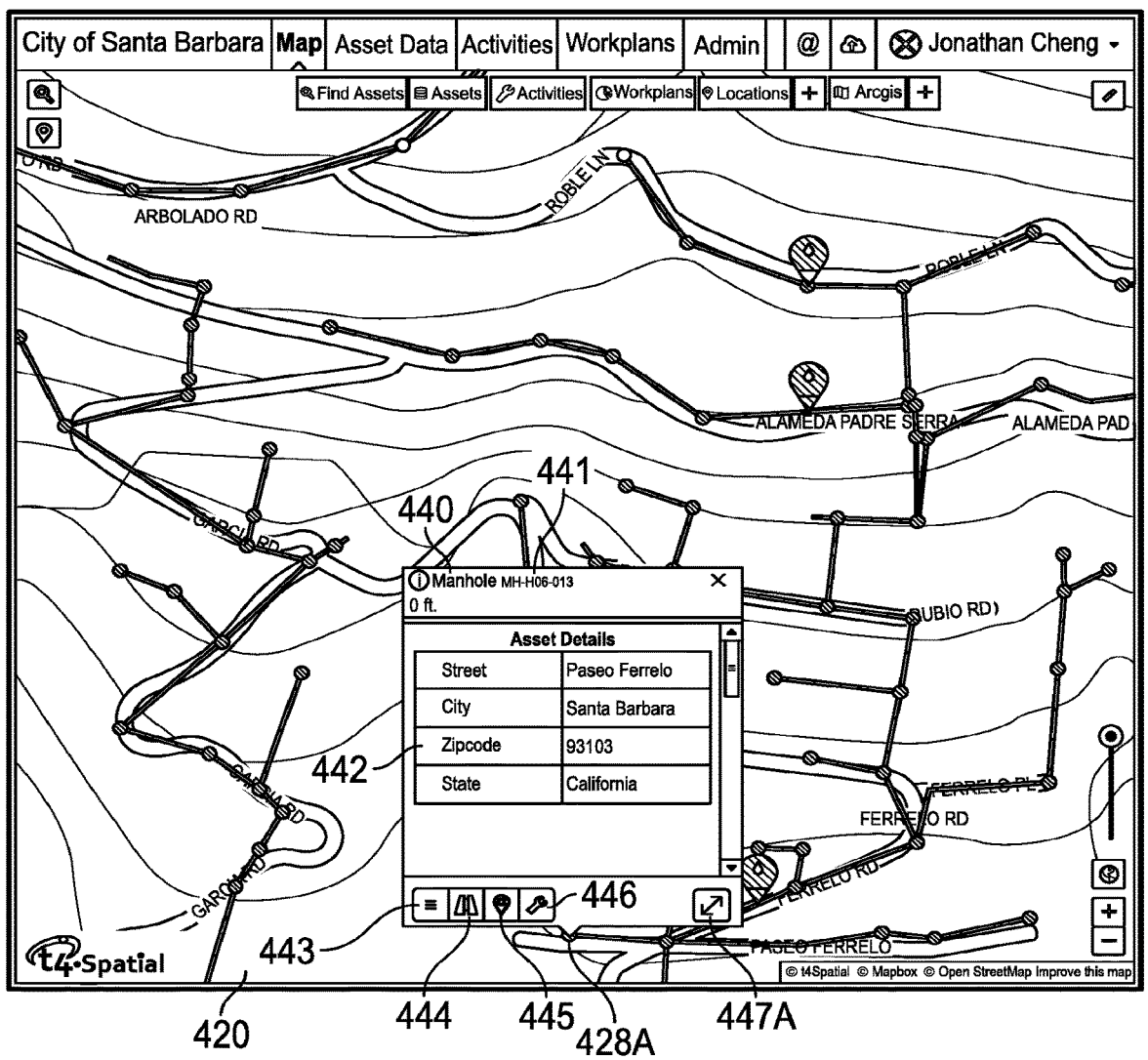
Figure 4L:
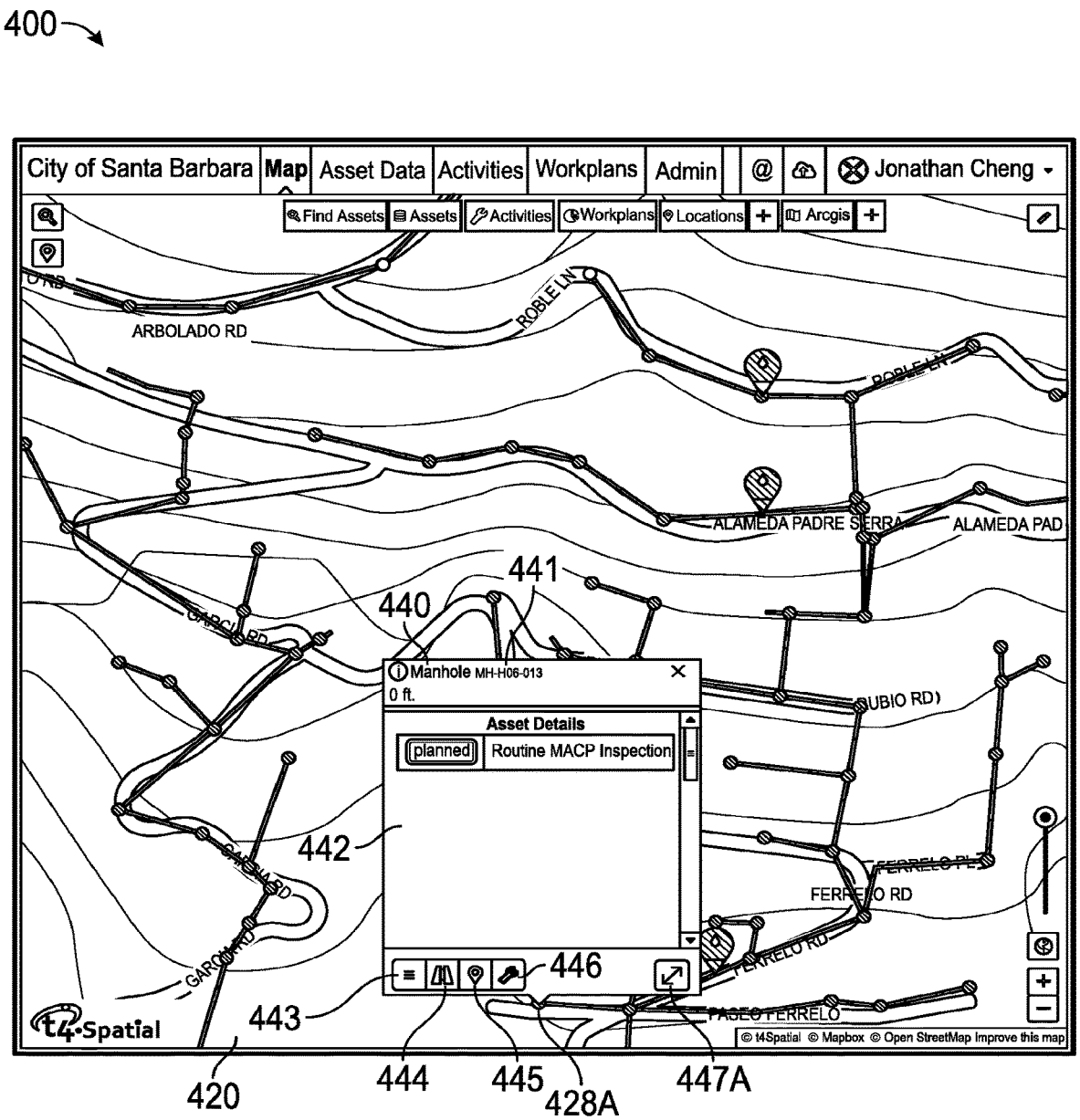
Figure 4M:
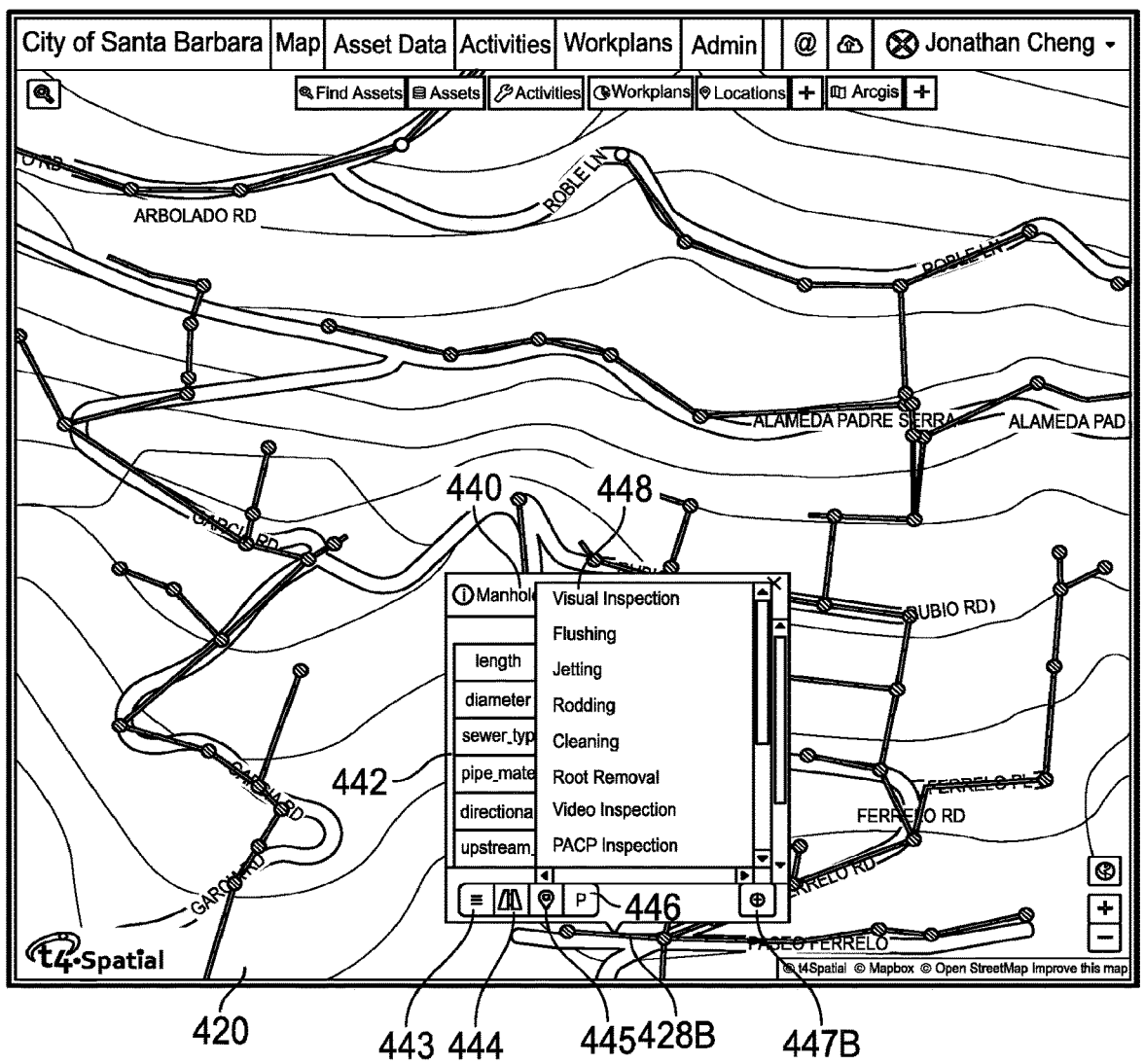
Figure 4N:
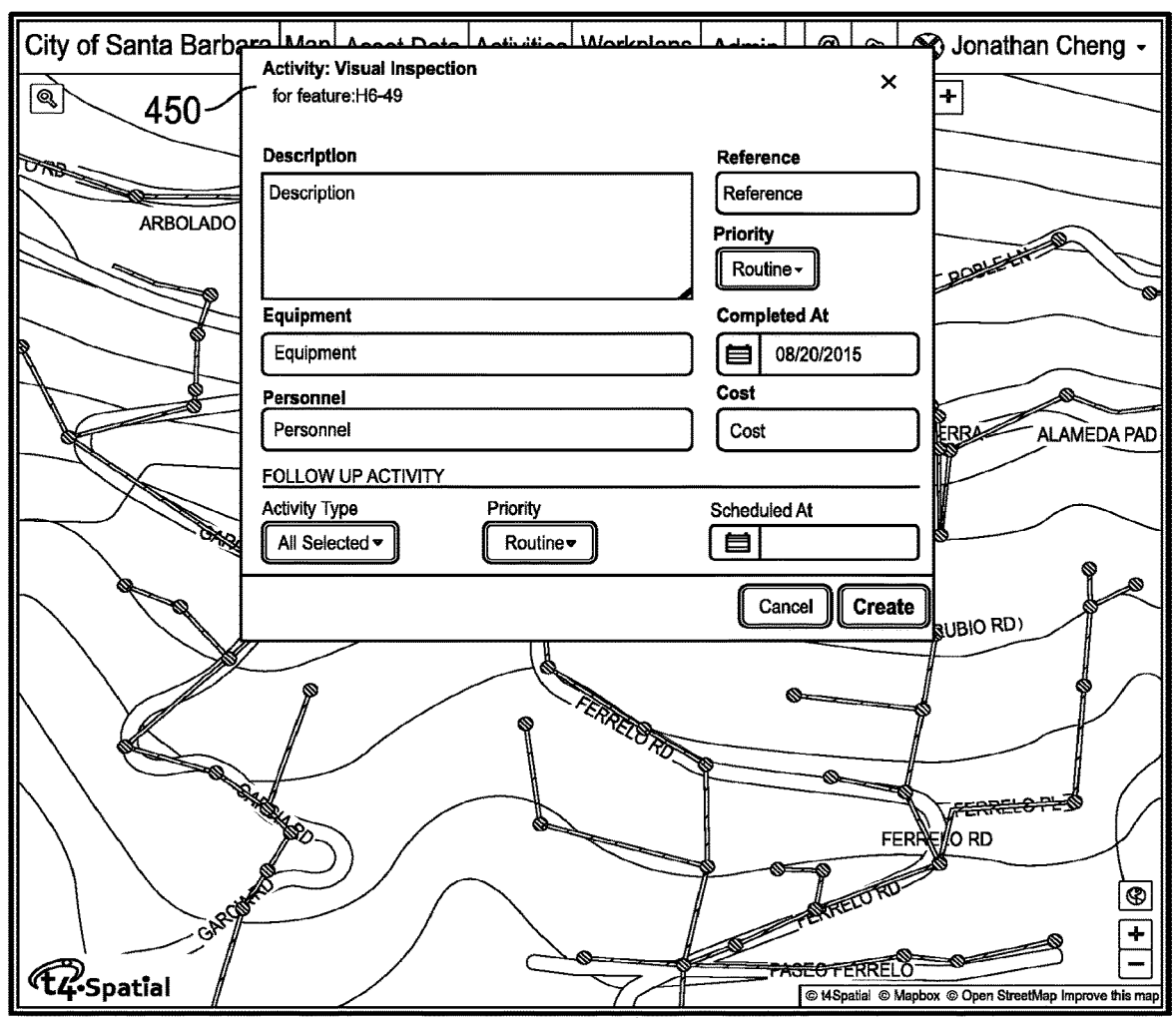
Figure 4O:
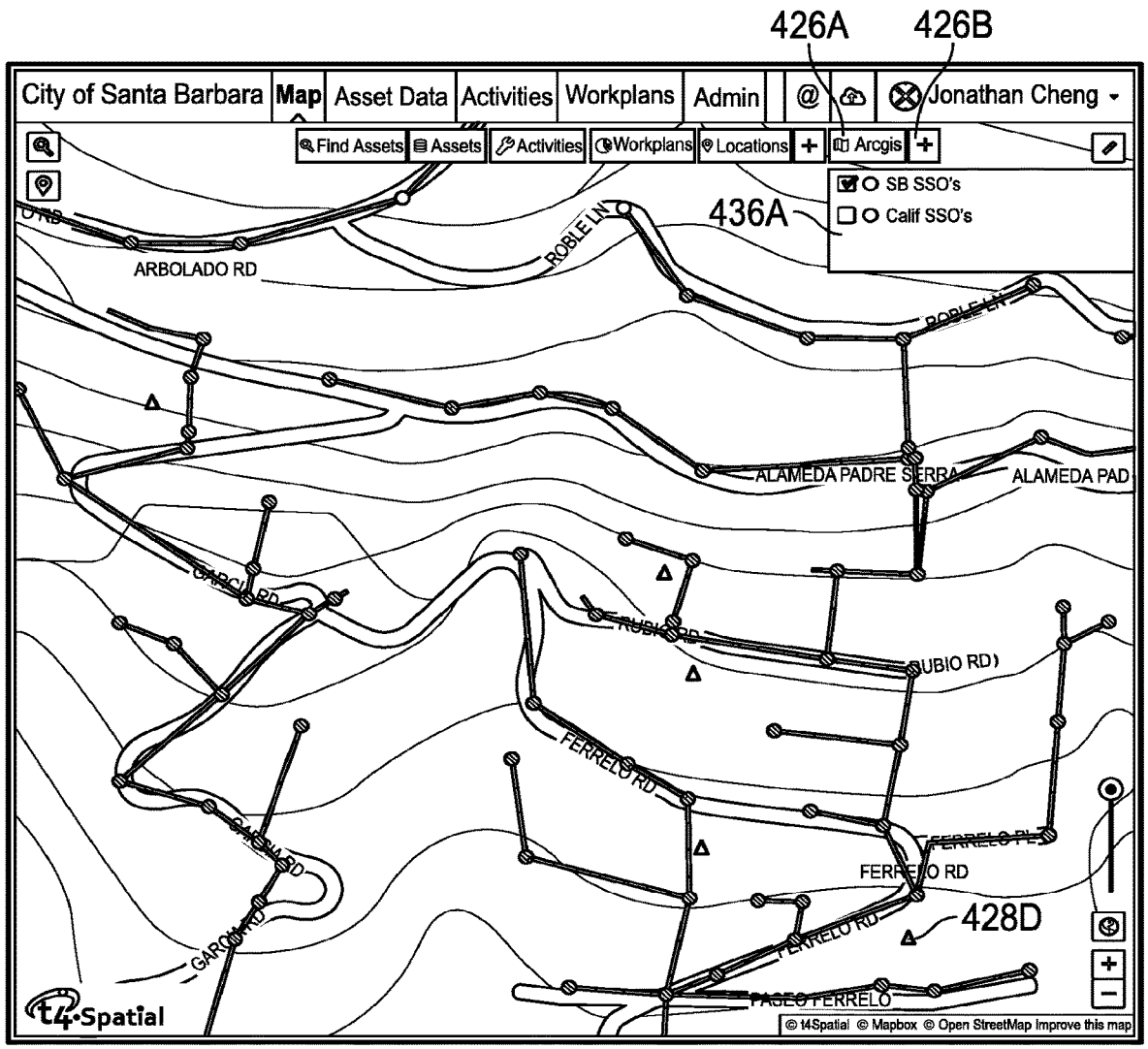

FIG. 4O illustrates webpage 400 of user interface 210 after a user has selected ArcGIS input 426A in FIG. 4A, 4B, or 4C and selected an ArcGIS layer, according to an embodiment. When the user selects ArcGIS input 426A, an ArcGIS list 436A is overlaid on virtual map frame 420. In the illustrated example, the user has selected an ArcGIS layer, comprising data representing Santa Barbara SSO events, from ArcGIS list 436A. In response, views module 230 has overlaid icons 428D representing these events, that are comprised in the ArcGIS layer, at their corresponding locations (i.e., the geolocation at which each event occurred) onto the virtual map. It should be understood that, although the illustrated ArcGIS layer comprises data concerning events that may affect infrastructure assets, an ArcGIS layer may comprise other types of data (e.g., infrastructure assets, parcel boundaries, weather data, easements, etc.). In this manner, a user can easily and visually distinguish data represented in an ArcGIS layer at their associated locations on the virtual map. For example, with both visual representations of infrastructure assets and events overlaid on the same map, a user can easily recognize relationships between each of those events and particular infrastructure assets within the vicinity of those events or otherwise geographically or functionally related to those events.

Figure 4P:
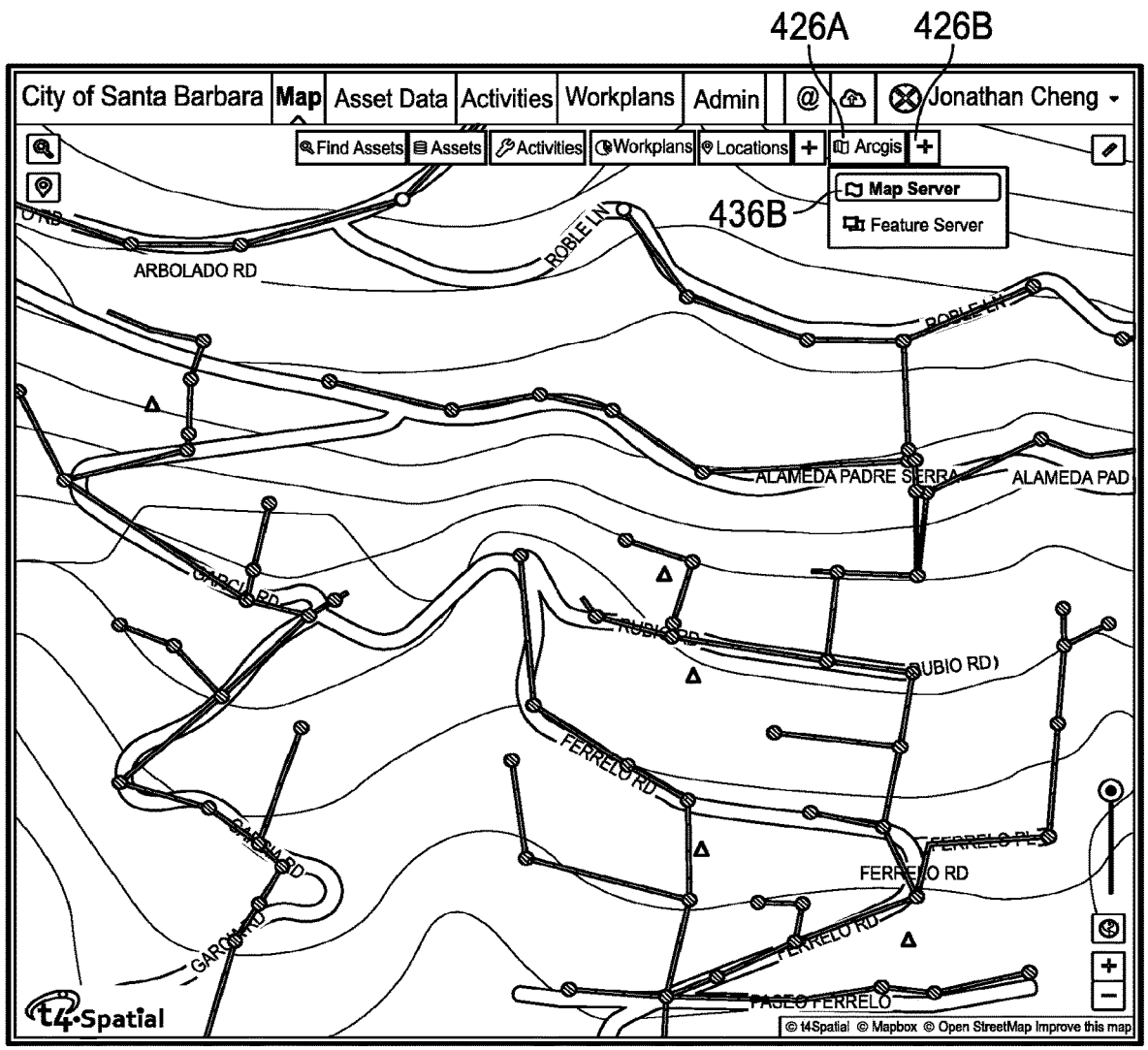

FIG. 4P illustrates webpage 400 of user interface 210 after a user has selected new ArcGIS input 426B, according to an embodiment. When the user selects new ArcGIS input 426B, a new ArcGIS source selection frame 436B is overlaid on virtual map frame 420. New ArcGIS source selection frame 436B comprises inputs for selecting a type of ArcGIS server. While the illustrated embodiment enables the selection of either a map server or feature server, other embodiments may include additional or different sets of servers. Alternatively, a user may not need to select a particular type of server at all, such that, when a user selects new ArcGIS input 426B, the user is presented with ArcGIS layer frame 436C, as illustrated in FIG. 4Q, instead of new ArcGIS source selection frame 436B.

Figure 4Q:
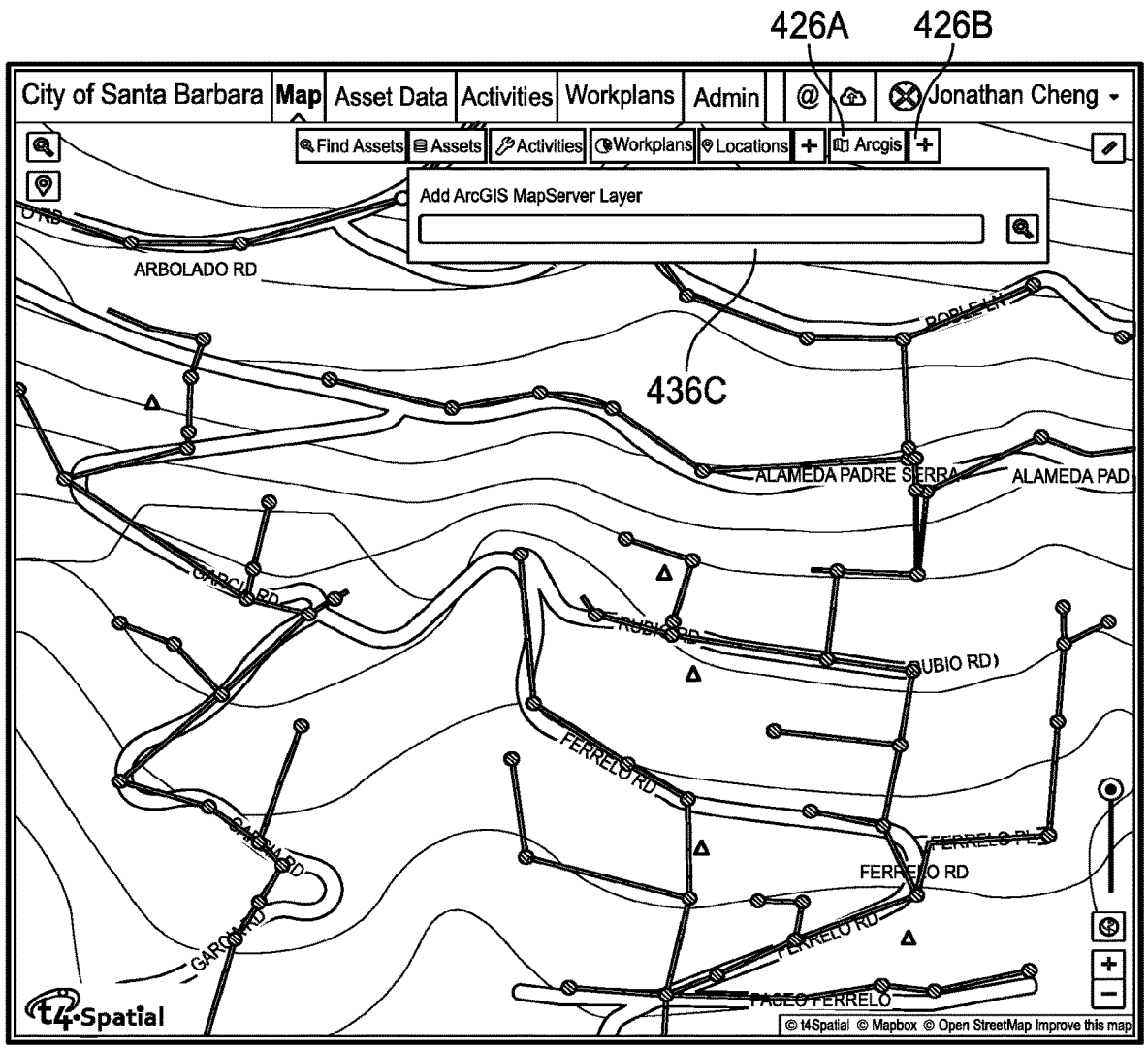

FIG. 4Q illustrates webpage 400 of user interface after a user has selected a type of ArcGIS server from new ArcGIS source selection frame 436B (or, in an alternative embodiment, after the user has selected new ArcGIS input 426B). Specifically, new ArcGIS source identification frame 436C is overlaid on virtual map frame 420. New ArcGIS source identification frame 436C comprises inputs for specifying the URI for a web feature service (WFS). Once a user has specified the URI for the WFS, integration module 223 may retrieve data representing an ArcGIS layer from the URI (as described elsewhere herein), and visually represent the data (e.g., using icons or other visual representations, such as circles, lines, etc.) on the virtual map in virtual map frame 420. These visual representations may be similar to, and comprise any of, the attributes of the other visual representations described elsewhere herein.

In an embodiment, multiple assets, asset types, activities, workplans, ArcGIS layers, and/or filters may be selected from their corresponding lists in any combination (e.g., multiple activity types and multiple workplans, a single activity type and a single workplan, multiple activity types and a single workplan and multiple asset types, etc.), such that multiple assets, asset types, activities, workplans, ArcGIS layers, and/or filters may be visualized together in a single view on the virtual map. In addition, infrastructure assets that belong to one asset type or are associated with one activity group, workplan, ArcGIS layer, and/or filter may be visually distinguished from infrastructure assets that belong to a different asset type or are associated with a different activity group, workplan, ArcGIS layer, and/or filter. For example, a first asset type, activity, workplan, ArcGIS layer, and/or filter and a second asset type, activity, workplan, ArcGIS layer, and/or filter may be selected. In this case, infrastructure assets included in the first selection may be distinguished using one form (e.g., one icon, changing the visual representation of each included infrastructure asset to a different color, size, line-weight, etc.) and infrastructure assets included in the second selection may be distinguished in a different form (e.g., different icon, different color, size, line-weight, etc.). Alternatively, the infrastructure assets included in both the first and second selections may be distinguished using the same color. As a further alternative, views module 230 may distinguish only those infrastructure assets included in both the first and second selections. In other words, the selections of asset type(s), activity(ies), workplan(s), ArcGIS layer(s), filter(s), etc. may be considered either as a selection of infrastructure assets that are associated with all of the user's selections or, as in the illustrated embodiments, as a selection of infrastructure assets that are associated with at least one of the user's selections.

FIG. 4F illustrates webpage 400 of user interface 210 after a user has selected locations input 435 in FIG. 4D, according to an embodiment. When the user selects locations input 425A, a locations list 435A is overlaid on virtual map frame 420. Locations list 435A lists identifiers for any previously-saved views. A previously-saved view may comprise a set of one or more assets, a set of one or more activities, a set of one or more workplans, a set of one or more filters, and/or a specific portion, zoom level, and/or other attribute(s) of the virtual map. These previously-saved views may be stored, for example, in database(s) 114. The user may select one of the view identifiers (e.g., "Location1") in locations list 435A. In response, views module 230 may load the identified previously-saved view into virtual map frame 420. In addition, as illustrated, locations list 435A may comprise one or more inputs (e.g., a pencil icon and trash can icon) for editing and/or deleting each listed view.

FIG. 4G illustrates webpage 400 of user interface 210 after a user has selected new location input 425B, according to an embodiment. When the user selects new location input 425B, a new location frame 435B is overlaid on virtual map frame 420. New location frame 435B comprises inputs for entering an identifier for the current view, saving the current view as a new stored view, and/or canceling the creation of a new stored view. If the user enters a name and selects the save input, the current view within virtual map frame 420 may be saved (e.g., in database(s) 114) for further retrieval. It should be understood that this current view that is saved may include any selected asset(s), activity(ies), workplan(s), filter(s), etc., as well as the current map portion, zoom level, and/or other attributes (e.g., styles, such as colors, sizes, line-weights, etc. of the visual representations of assets) of the virtual map as it appears in virtual map frame 420. In other words, the view of the virtual map is stored such that it can be exactly replicated in virtual map frame 420 at a later time (e.g., by the same or different client application 132, by the same or different user, etc.).

It should be understood that each overlay—whether it be an overlay of visual representations for an asset type selected via asset list 432 from the asset catalog, an overlay of visual representations for one or more infrastructure assets matching a search string input using search input box 431, an overlay of visual representations of one or more activities selected using activities list 433, an overlay of visual representations for one or more infrastructure assets included in a workplan selected using workplan list 434, an overlay of one or more ArcGIS layers selected using ArcGIS layer list 436A, an overlay of visual representations for one or more infrastructure assets satisfying a filter selected using a filter list, etc.—represents an individual, discrete layer overlaid on the virtual map in virtual map frame 420. Each layer may be toggled on and off, and stacked with one or more other layers using the disclosed inputs and lists. In addition, a layer or a set of a plurality of layers may be saved as a location using new location input 425B and shared with recipients, as discussed elsewhere herein. Thus, users are able to create and share unique views, comprising, for example, a location, a zoom level, and one or more layers of visual representations of infrastructure assets. These views may be shared within an account (e.g., within a single organization), between accounts (e.g., between different organizations), and/or outside of an account (e.g., with non-users or uses unassociated with any account).

For example, in the illustrated embodiment, the current location has been named "Location2". In addition, the manhole and mainline pipe infrastructure assets have been selected (e.g., using asset list 432), and the cleaning activity has been selected (e.g., using activities list 433). Thus, the current view comprises three layers: the manhole asset type, the mainline pipe asset type, and the cleaning activity. The "Location2" identifier may be saved in association with representations or identifications of the selected layers (i.e., manhole and mainline pipe infrastructure assets and the selected cleaning activity) as a new saved view. In addition, the new saved view may comprise or be associated with the particular portion of the virtual map, current zoom level, style(s), etc. being used in virtual map frame 420.

This new view (i.e., "Location2") will be added to the locations list 435A in FIG. 9, as illustrated in FIG. 4H, according to an embodiment. Thus, a user may subsequently select it from locations list 435. When the user does so, virtual map frame 420 will be updated to reflect the view of the virtual map that was present when the new location was saved (e.g., the view beneath new location frame 435B in FIG. 4G). For instance, in the illustrated example for "Location2," the visual representations of the infrastructure assets (i.e., the manholes and mainline pipes) as two layers in the selected view will be displayed and the visual representations associated with the selected activity (i.e., the cleaning activity) as a third layer will be visually distinguished. In addition, the virtual map in virtual map frame 420 may be updated to reflect the position, zoom level, and style(s) displayed in virtual map frame 420 at the time that "Location2" was saved. It should be understood that workplans (e.g., selected using workplans list 434), filters (e.g., selected using a filters list) and/or searched-for assets (e.g., using search input box 431) may be represented in a saved view in a similar manner. Specifically, if a current view in virtual frame 420 includes selected workplan(s), filter(s), and/or searched-for asset(s), those wokrplan(s), filter(s), and/or searched-for asset(s) may be saved in a view created using new location frame 435B, and the virtual map in virtual map frame 420 may be updated to reflect those workplan(s), filter(s), and/or searched-for asset(s) whenever that created view is subsequently selected (e.g., from locations list 435A). It should be further understood that each saved view may also comprise any other overlays, attributes, and/or the like that are present in virtual map frame 420 at the time that the location is saved (e.g., using new location frame 435B). In this manner, a user can save the exact view that is being displayed in his or her virtual map frame 420, at any given time, for subsequent retrieval and/or to share with other users.

In an embodiment, saved views may be specific to a particular user, such that each user can only view the saved views that he or she created. Alternatively, saved views may be specific to an account, such that each user can view all saved views for an account, regardless of which user created them. As another alternative, this may be an account-level or location-specific setting. For example, each saved view may, by default, only be viewed by the user who created it. However, a user may edit permissions with respect to his or her saved views or each specific one of his or her saved views to allow other users of the account to view those saved views(s).

Additionally or alternatively, user interface 210 (e.g., in locations list 435A) may provide one or more inputs (e.g., a share icon) that allows a user to share specific saved views with one or more other users (e.g., by selecting a user from a list of available users and/or entering an email associated with the desired recipient). In this case, application 200 may send an email or other message (e.g., using the internal message system in embodiments described elsewhere herein) to the desired user(s) or other recipient(s) with a URL that directs the recipient(s) to application 200. The URL may comprise a parameter string that identifies the particular saved view, in which case, application 200 may extract the identifier of the saved view, retrieve the saved view, and load the saved view into a virtual map frame (e.g., similar or identical to virtual map frame 420) for viewing. In some embodiments, each recipient may be required to authenticate or register with application 200 prior to viewing the shared view.

Figure 5A:
Figure 5B:
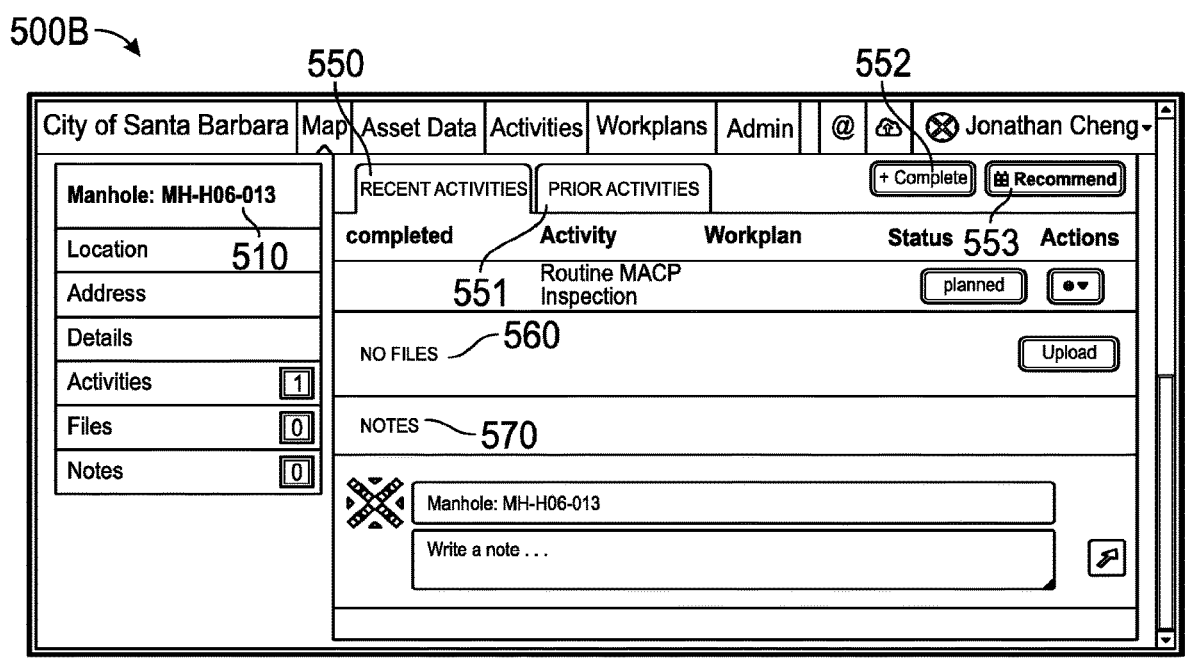

FIG. 4I illustrates webpage 400 of user interface 210 after a user has selected a visual representation 428 of an infrastructure asset (e.g., a mainline pipe) overlaid on the virtual map in virtual map frame 420, according to an embodiment. When the user selects (e.g., touches or clicks on) a particular visual representation of an infrastructure asset, an asset detail frame 440 is overlaid on virtual map frame 420. Asset detail frame 440 comprises an identifier 441 (e.g., name) of the infrastructure asset corresponding to visual representation 428 and an informational area 442 comprising data related to the infrastructure asset. In addition, in the illustrated example, asset detail frame 440 comprises a detail input 443 for displaying attributes of the infrastructure asset (e.g., represented in the fields of a data structure representing the infrastructure asset), a street-view input 444 for displaying a street view of the infrastructure asset, a location input 445 for displaying a location (e.g., address, GPS coordinates, etc.) of the infrastructure asset, an activities input 446 for displaying any activities associated with the infrastructure asset, and an expand input 447A for navigating to a user interface with more details regarding the infrastructure asset (e.g., as illustrated in FIGS. 5A and 5B). In addition, asset detail frame 440 could comprise a new activity input for associating the infrastructure asset with a new activity. If the user selects detail input 443, attributes of the infrastructure asset are retrieved from the fields of a data structure for the infrastructure asset and displayed in informational area 442 (e.g., in rows comprising a field name and a field value), as illustrated in FIG. 4I.

FIG. 4J illustrates webpage 400 of user interface 210 after a user has selected street-view input 444, according to an embodiment. In response to the user's selection of street-view input 444, informational area 442 has been updated with a street view at or near the location of the infrastructure asset. The street view may comprise a panoramic image at or near the location of the infrastructure asset, which may be panned, zoomed, etc. The street view may be stored at an external system 140 and retrieved (e.g., by views module 230) over network(s) 120 or may be stored at platform 110 (e.g., in database(s) 112).

FIG. 4K illustrates webpage 400 of user interface 210 after a user has selected location input 445, according to an embodiment. In response to the user's selection of location input 445, informational area 442 has been updated to include location information associated with the infrastructure asset. In the illustrated example, the location information comprises an address, including a street, city, Zip code, and state. Alternatively or additionally, the location information may comprise a latitude, longitude, and/or elevation. It should be understood that the location information may be derived from one or more fields stored in a data structure representing the infrastructure asset. For example, one or more modules of application 200 (e.g., assets module 240) may retrieve latitude and longitude coordinates from latitude and longitude fields in the data structure, send a request comprising the latitude and longitude coordinates to an external system 140, receive a response comprising the address, and display the address in informational area 442.

FIG. 4L illustrates webpage 400 of user interface 210 after a user has selected activities input 446, according to an embodiment. In response to the user's selection of activities input 446, informational area 442 has been updated to include a list of all pending and/or completed activities associated with the infrastructure asset. In the illustrated example, each completed activity associated with the infrastructure asset is represented by a row in the list in information area 442. Each row may include information about the activity, such as a date and activity type for the activity. In addition, each row may be selectable, such that additional details about the activity may be displayed in response to selection of the row (e.g., as illustrated in webpage 900 in FIGS. 9A-9E, according to an embodiment).

FIG. 4M illustrates an alternative embodiment of webpage 400 of user interface 210, which uses a new activity input 447B instead of expand input 447A, after a user has selected new activity input 447B, according to an embodiment. In response to the user's selection of new activity input 447B, a list 448 of selectable activity types is displayed in informational area 442. A user may select one of the activity types in order to create a new activity for the infrastructure asset.

FIG. 4N illustrates webpage 400 of user interface 210 after a user has selected an activity type from list 448, according to an embodiment. In response to the user's selection of the activity type from list 448, a new activity frame 450 is overlaid in webpage 400. New activity frame 450 comprises inputs for receiving activity data entered by the user, inputs for saving the new activity, and/or inputs for canceling the new activity. The activity data may comprise, without limitation, an activity description, equipment to be used for the activity, personnel to perform the activity, an activity reference, an activity priority (e.g., routine, high priority, emergency), an activity date or date range, a cost, a status, an activity checklist (e.g., tasks to be performed to complete the activity), an identification or specification of a follow-up activity, an identification of an industry-standard application, etc. At least some of these inputs may comprise selection inputs (e.g., drop-down menus) which allow a user to select from a finite set of possible values, which may be automatically populated based on account settings (e.g., a drop-down menu of available equipment and/or personnel, associated with the account, for the activity). In addition, the activity data may comprise a follow-up activity, along with a priority and date for the follow-up activity. It should be understood that the received activity data may be stored as fields in a data structure representing the activity.

Figure 4R:
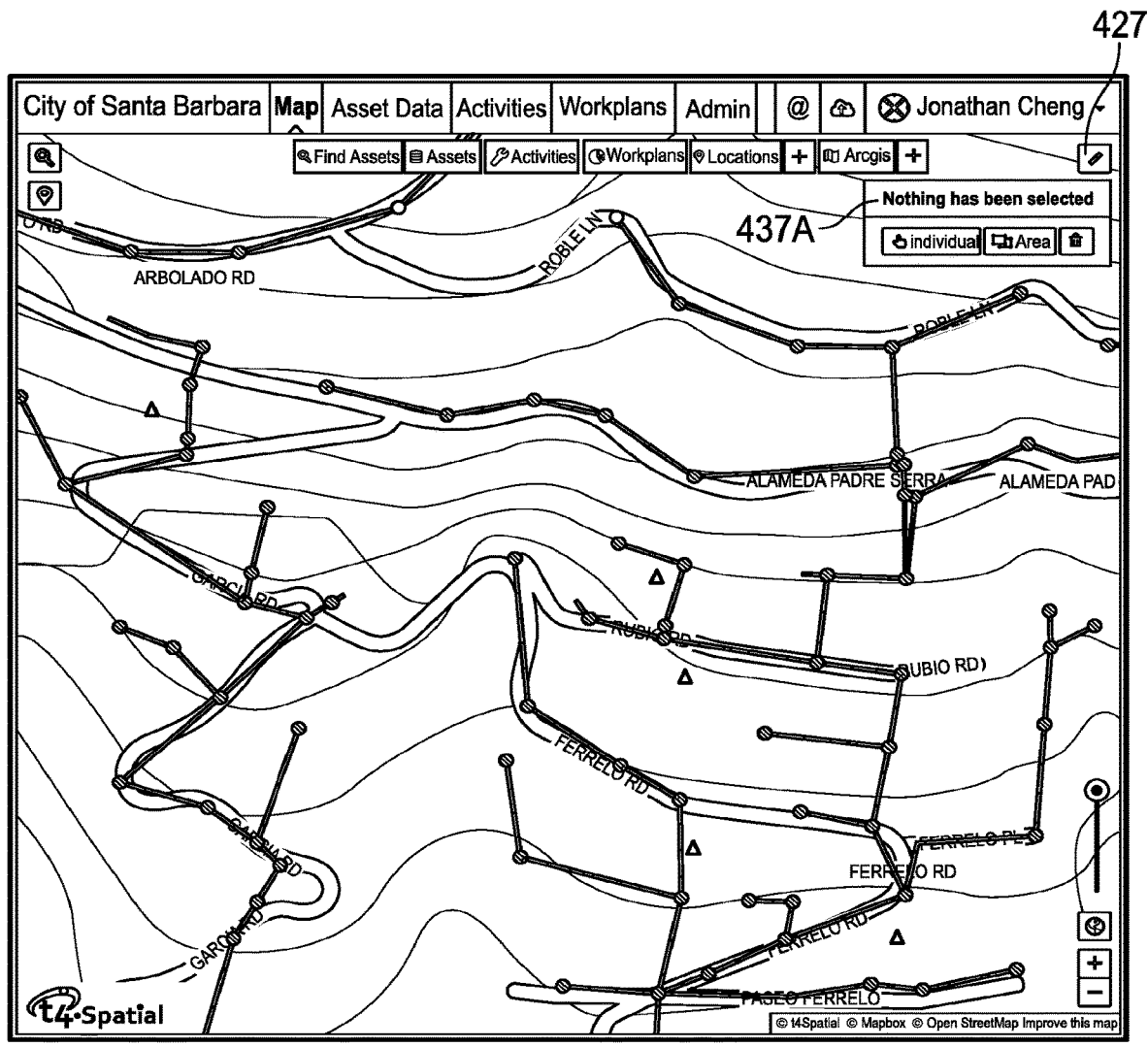

FIG. 4R illustrates webpage 400 of user interface 210 after a user has selected lasso input 427 in FIG. 4O, 4P, or 4Q, according to an embodiment. When the user selects lasso input 427, an asset selection frame 437A is overlaid on virtual map frame 420. Asset selection frame 437A comprises inputs for selecting individual infrastructure assets on the virtual map, lassoing a region, on the virtual map, which may comprise one or more infrastructure assets, and/or clearing a prior selection of infrastructure assets.

Figure 4S:
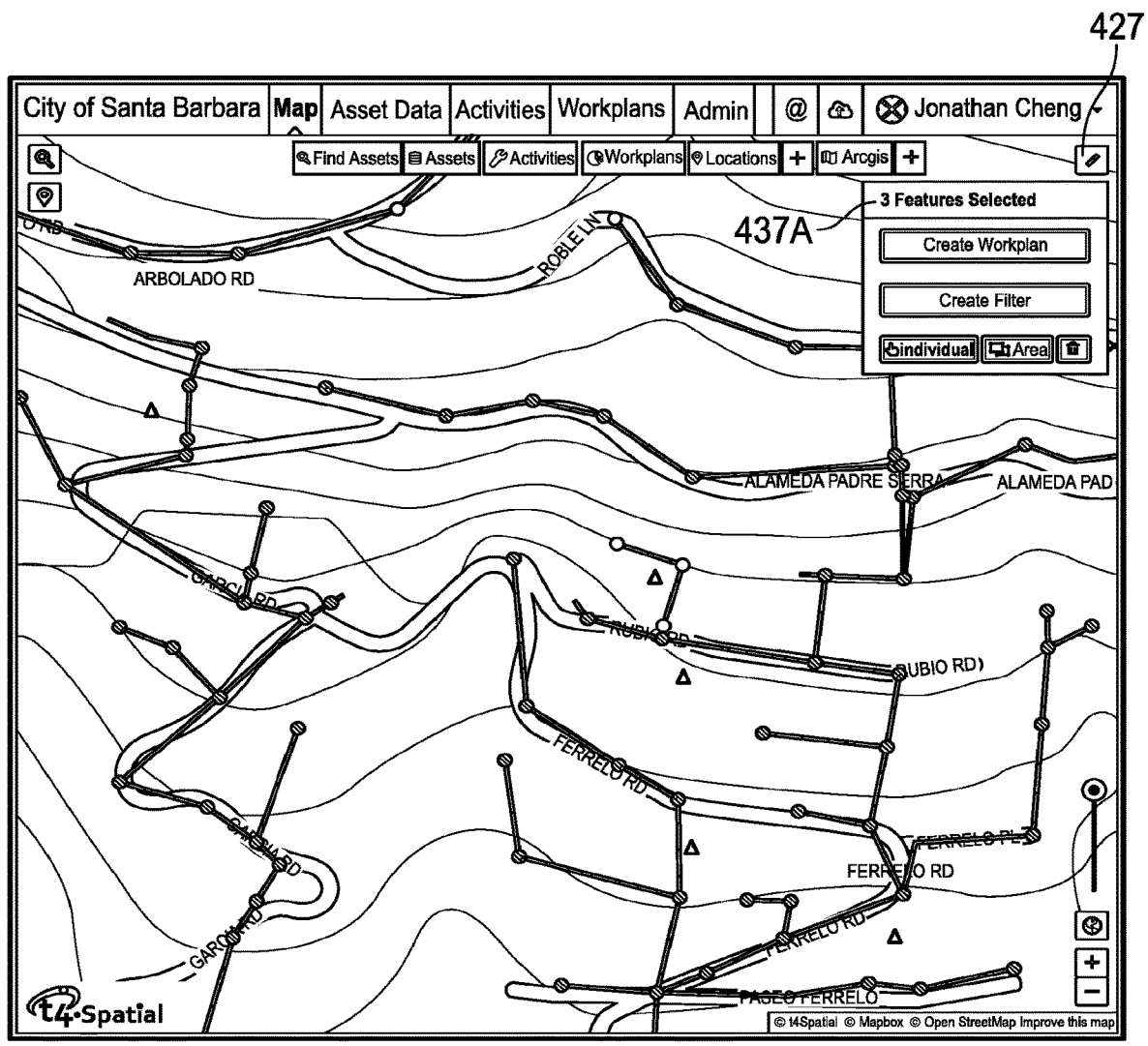

FIG. 4S illustrates webpage 400 of user interface 210 after a user has selected an input for individually selecting infrastructure assets within virtual map frame 420. After the user has selected this input, the user may select one or more individual infrastructure assets (e.g., by clicking them with a mouse, touching them on a touch-enabled device, etc.) one-by-one.

Figure 4T:
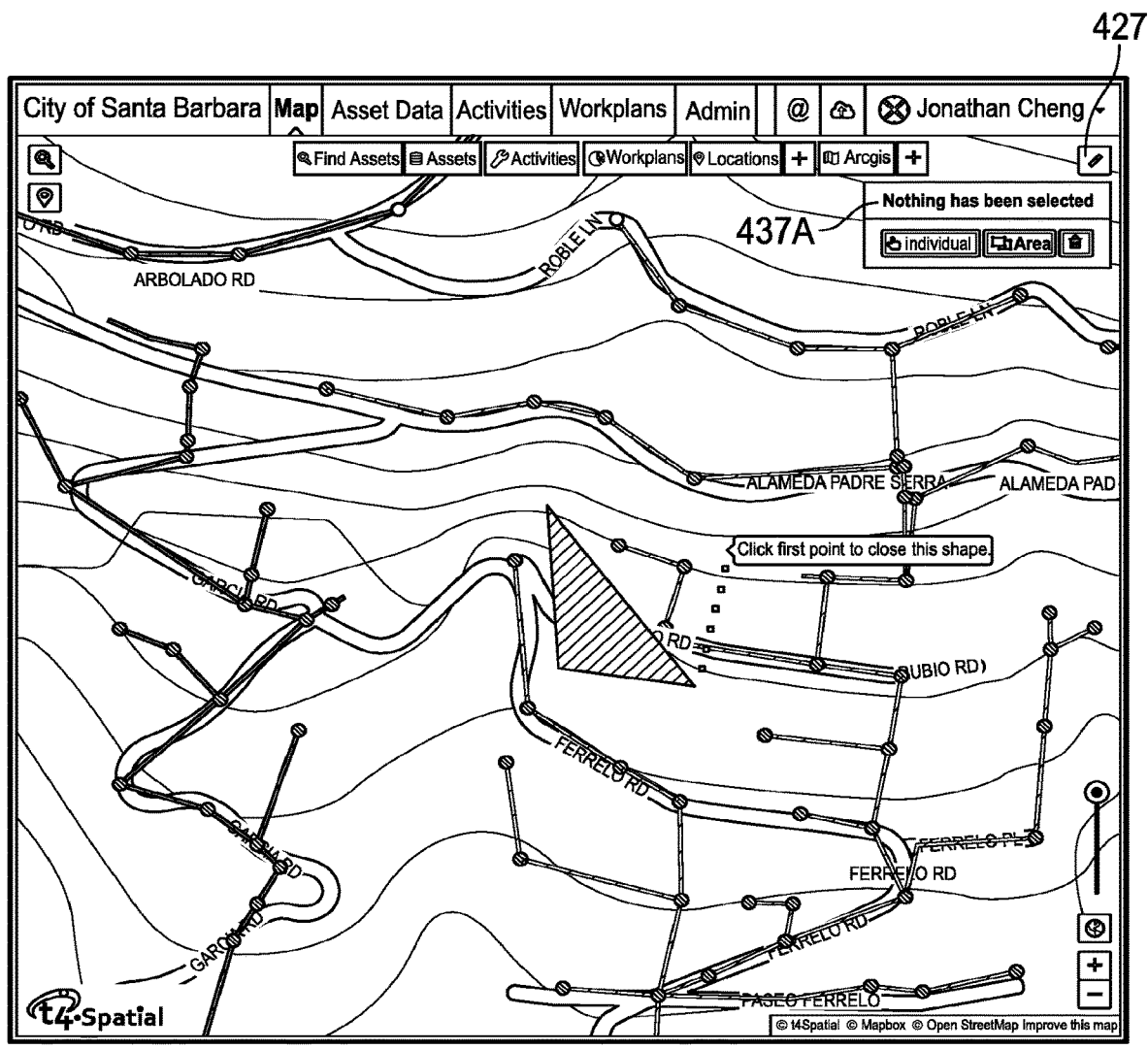
Figure 4U:
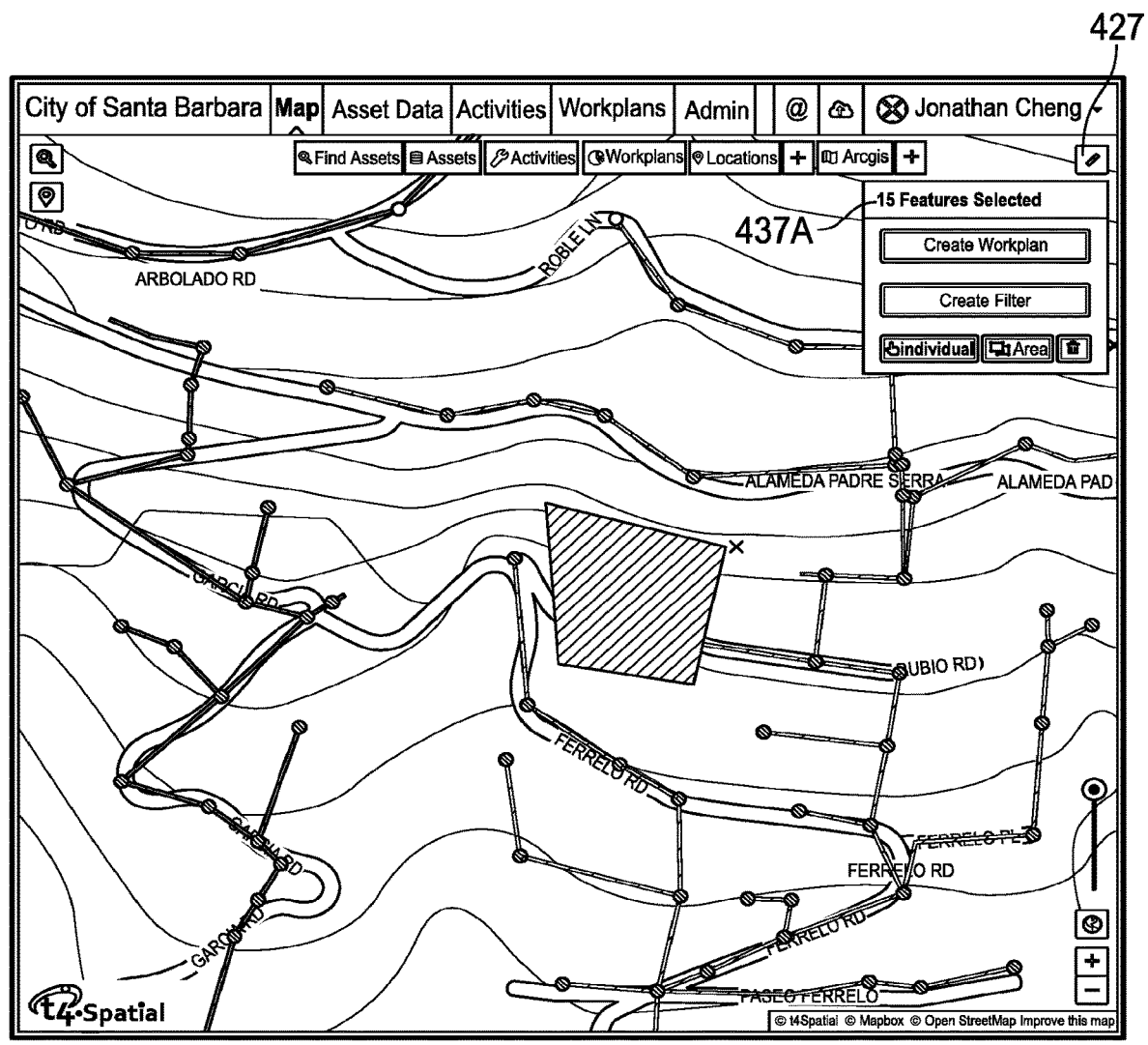
Figure 4V:
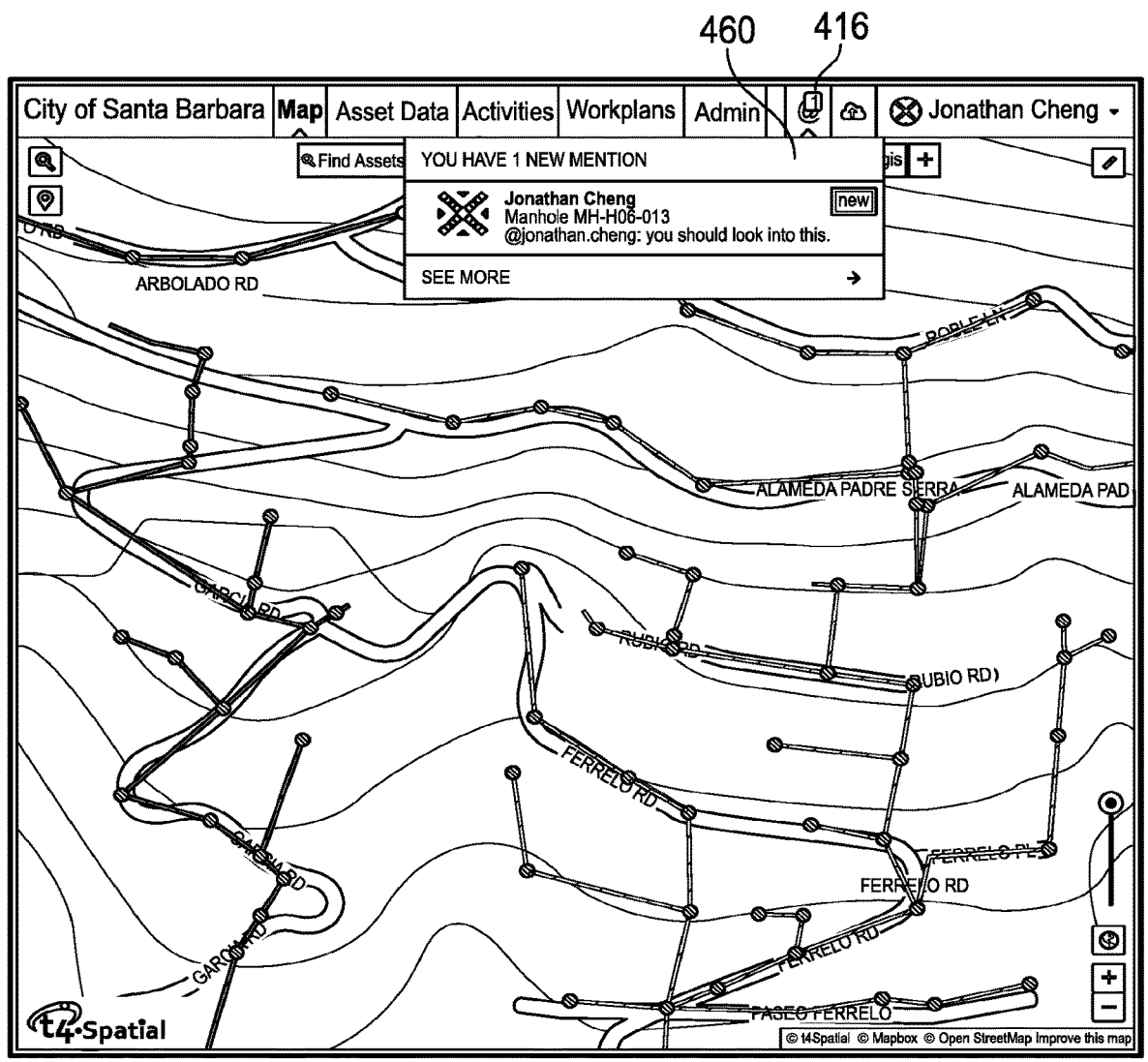

FIG. 4T illustrates webpage 400 of user interface 210 after a user has selected an input for lassoing a set of one or more infrastructure assets within virtual map frame 420. After the user has selected this input, the user may begin a lassoing operation by selecting points on the virtual map (e.g., by clicking or touching a position on the virtual map representing a first point and dragging to another position on the virtual map representing a second point). Once the user has selected at least three points, a two-dimensional region enclosed by the points may be visually distinguished (e.g., by shading) on the virtual map, as illustrated in FIG. 4T. The user may select as many points on the map as he or she desires to create virtually any polygon imaginable. The user may end the lassoing operation by selecting the first-selected point again, thereby completing the polygon, as illustrated in FIG. 4U. All infrastructure assets within the polygon are selected by the lassoing operation.

In an embodiment illustrated in FIGS. 4S and 4U, once at least one infrastructure asset is selected (either one-by-one or via the lassoing operation), asset selection frame 437A expands to include additional inputs. These additional inputs may comprise inputs for creating a workplan for the selected infrastructure assets, creating a filter that consists of the selected infrastructure assets, and/or the like. In this manner, a user can easily create workplans and/or filters for specific infrastructure assets that the user may intuitively select within virtual map frame 420.

FIG. 4F illustrates webpage 400 of user interface 210 after a user has selected message notification input 416, according to an embodiment. Notably, message notification input 416 may indicate the presence of new messages to the current user, including the number of these new messages. When the user selects message notification input 416, a message notification frame 460 is overlaid on virtual map frame 420. Message notification frame 460 lists any new messages that have been sent to the current user (e.g., with the sender's avatar, sender's name, identifier(s) of the infrastructure assets to which the message pertains, the body or a portion of the body of the message, the status of the message, etc.). Message notification frame 460 may also provide one or more inputs for viewing other messages, for example, by directing the user to a messaging dashboard. In this manner, a current user can be notified of new messages, in real time, as they arrive, and easily and intuitively view those messages.

FIGS. 5A and 5B illustrate portions 500A and 500B of a webpage 500 of user interface 210 for viewing asset details for a particular infrastructure asset, according to an embodiment. A user may be directed to webpage 500 in response to a user selecting (e.g., clicking on or touching) asset identifier 441 in asset detail frame 440. It should be understood that there may be additional entry points to webpage 500. For example, anywhere that an asset identifier is presented in user interface 210 (e.g., within a message, within a workplan detail, within a search result list, within a filter result list, etc.), the asset identifier may be included in a hyperlink which links to webpage 500 comprising details for the corresponding infrastructure asset.

As illustrated in FIGS. 5A and 5B, webpage 500 may comprise a navigational frame 510 which allows a user to jump to particular areas of webpage 500. These areas may comprise a location area 520 comprising a street view at or near the location of the infrastructure asset and/or a virtual map showing the location of the infrastructure asset, an address area 530 comprising an address (e.g., street, city, state, Zip code) and/or other geolocation of the infrastructure asset, a details area 540 comprising attributes represented in fields of a data structure representing the infrastructure asset.

In addition, the areas of webpage 500 may comprise a recent activities area 550 comprising a list of recent pending and/or completed activities and/or workplans associated with the infrastructure asset. The list may comprise a row for each activity and/or workplan. Each row may be selectable or comprise a selectable link to the activity or workplan. For example, selection of an activity may direct the user to a webpage 900 illustrated in FIGS. 9A-9E, and selection of a workplan may direct the user to a webpage 700 illustrated in FIG. 7A. The areas of webpage 500 may also comprise a prior activities area, which may be selected by a user selection of a prior activities tab 551. Prior activities area may be similar or identical to recent activities area 550, but listing activities which occurred more than a predetermined amount of time in the past (e.g., more than one year ago), whereas the recent activities area 550 may list activities which have occurred within the predetermined amount of time in the past (e.g., within one year).

In an embodiment, recent activities area 550 and the prior activities area selected via tab 551 may comprise a completion input 552 for completing a pending activity (e.g., changing its status to "completed"), and a recommend input 553 for recommending an activity to a user.

In addition, the areas of webpage 500 may comprise a files area 560 for associating files with the infrastructure asset. Files area 560 may comprise a list of associated files, if any, and an input for uploading new files to be associated with the infrastructure asset. For example, such files may comprise inspection videos of the infrastructure asset, images of or related to the infrastructure asset, documents related to the infrastructure asset, etc.

In addition, the areas of webpage 500 may comprise a notes area 570 for viewing and associating notes with the infrastructure assets. For example, notes area 570 may comprise an input for entering a free-form note. A user may enter a note into the input and submit the note. In response, assets module 240 may associate the submitted note with the infrastructure asset, such that the note is subsequently displayed in notes area 570 for all users to see and to potentially respond. In an embodiment, notes may be directed to specific users as messages, for example, using a "To" line or a special character.

As an example, the character "@" may be used to direct a note to a specific user. When a current user types "@" into a new message in notes area 570, a frame may be overlaid that comprises a selectable list of users (e.g., by their avatars, names, usernames, etc.). As the user continues typing characters following the "@" character, the list may be continually repopulated such that only those users, whose usernames match the typed characters following the "@" character, remain in the list. When the user selects a user from the list, that user's username is populated into the note after the "@" character, representing a mention of the user within the note (e.g., "@JohnSmith"). In addition, if the user knows the user's username, the user could simply type the mention directly into the note without selecting the user from the populated list (e.g., by simply typing "@JohnSmith"). In either case, when the note is submitted, the note will be notified as a message to any users mentioned within the note. Thus, for example, the note will be notified by message notification input 416 to each mentioned user when each mentioned user is logged into application 200.

Additionally or alternatively, the message may be emailed to each mentioned user at an email address associated with the user's profile.

Figure 5C:
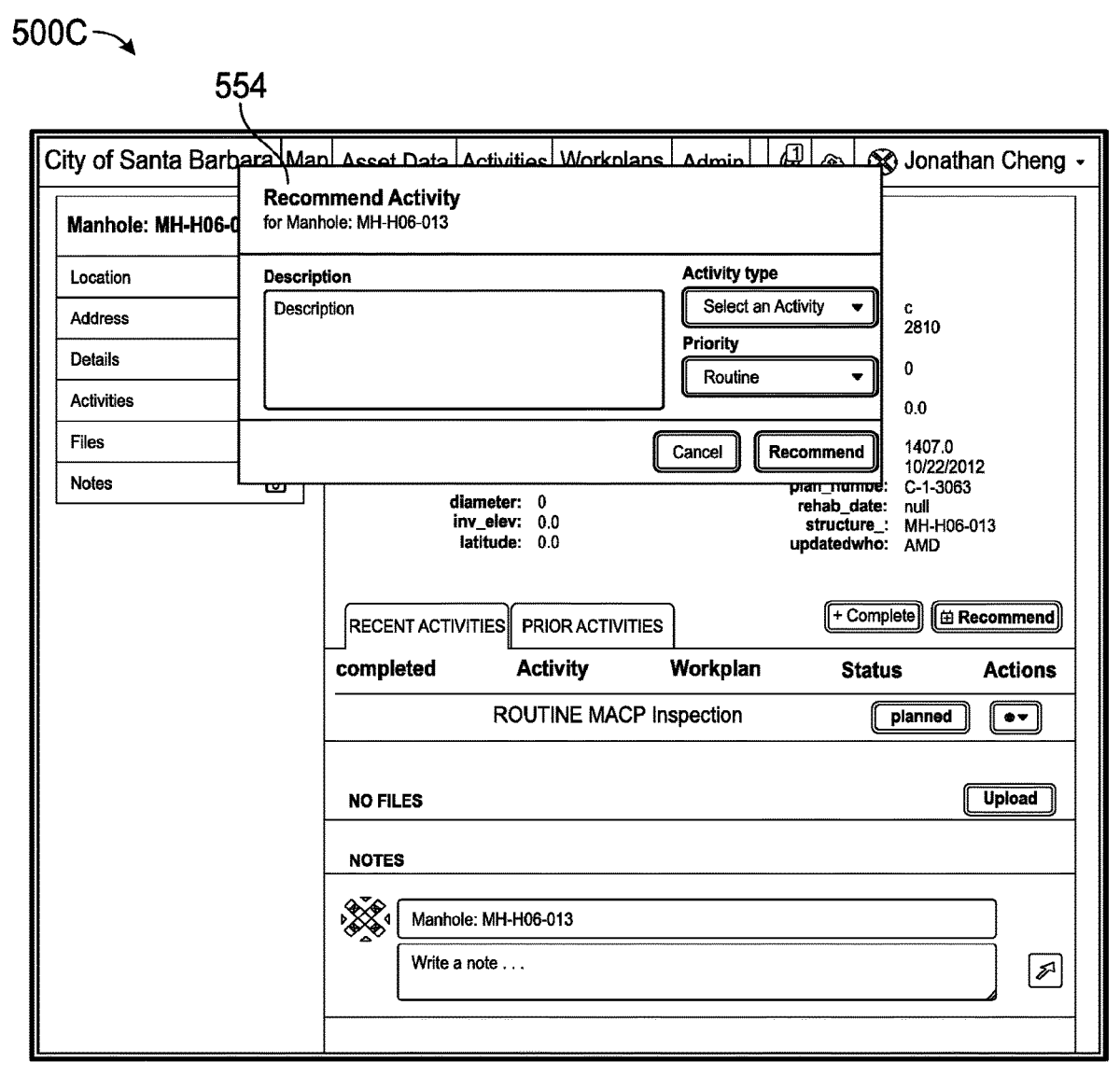

FIG. 5C illustrates webpage 500 of user interface 210 after a user has selected recommend input 553 in the activities area, according to an embodiment. When the user selects recommend input 553, a recommend activity frame 554 is overlaid in webpage 500. Recommend activity frame 554 may comprise one or more inputs for selecting an activity type for the infrastructure asset detailed in webpage 500, inputting a description of the activity, specifying a priority of the activity, submitting the recommendation, and/or canceling the recommendation. In an embodiment, a user may mention one or more users in the description in the same manner, as described above, with respect to a note. For example, the user may use the "@" character to specify or select another user to which the recommendation should be directed. Subsequently, when the user submits the recommendation, the recommendation may appear as a message to the mentioned user(s), such that it is, for example, notified to the user via message notification input 416. In an embodiment, recommended activities may then be converted into a requested activity for the associated infrastructure asset and/or added to a workplan (e.g., via one or more inputs in the message, and/or other means described herein). Recommend input 553 may also appear in other webpages of user interface 210 and operate in the same manner as described above. The status of a recommended activity may be set as "recommended," for example, until it is changed (e.g., by a user) to "approved" or "rejected."

Figure 6A:
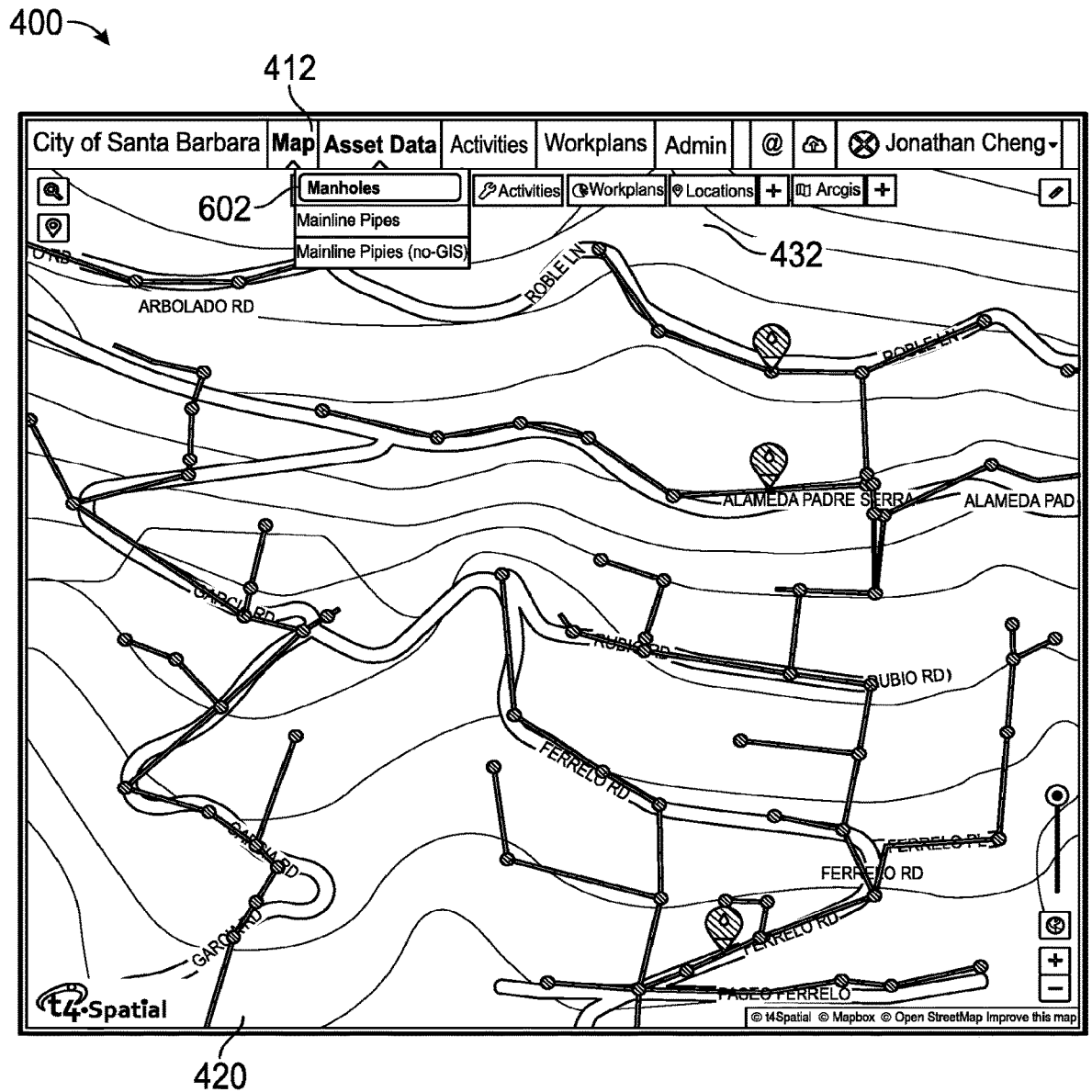

FIG. 6A illustrates webpage 400 of user interface 210 after a user has selected asset data input 412, according to an embodiment. When the user selects asset data input 412, an asset catalog list 602 is overlaid in webpage 400. Asset catalog list 602 comprises a list of selectable asset types from the asset catalog. These may be the same asset types as those listed in asset list 432. The user may select one of these asset types from asset catalog list 602, for example, by clicking on the identifier of the asset type in asset catalog list 602.

Figure 6B:
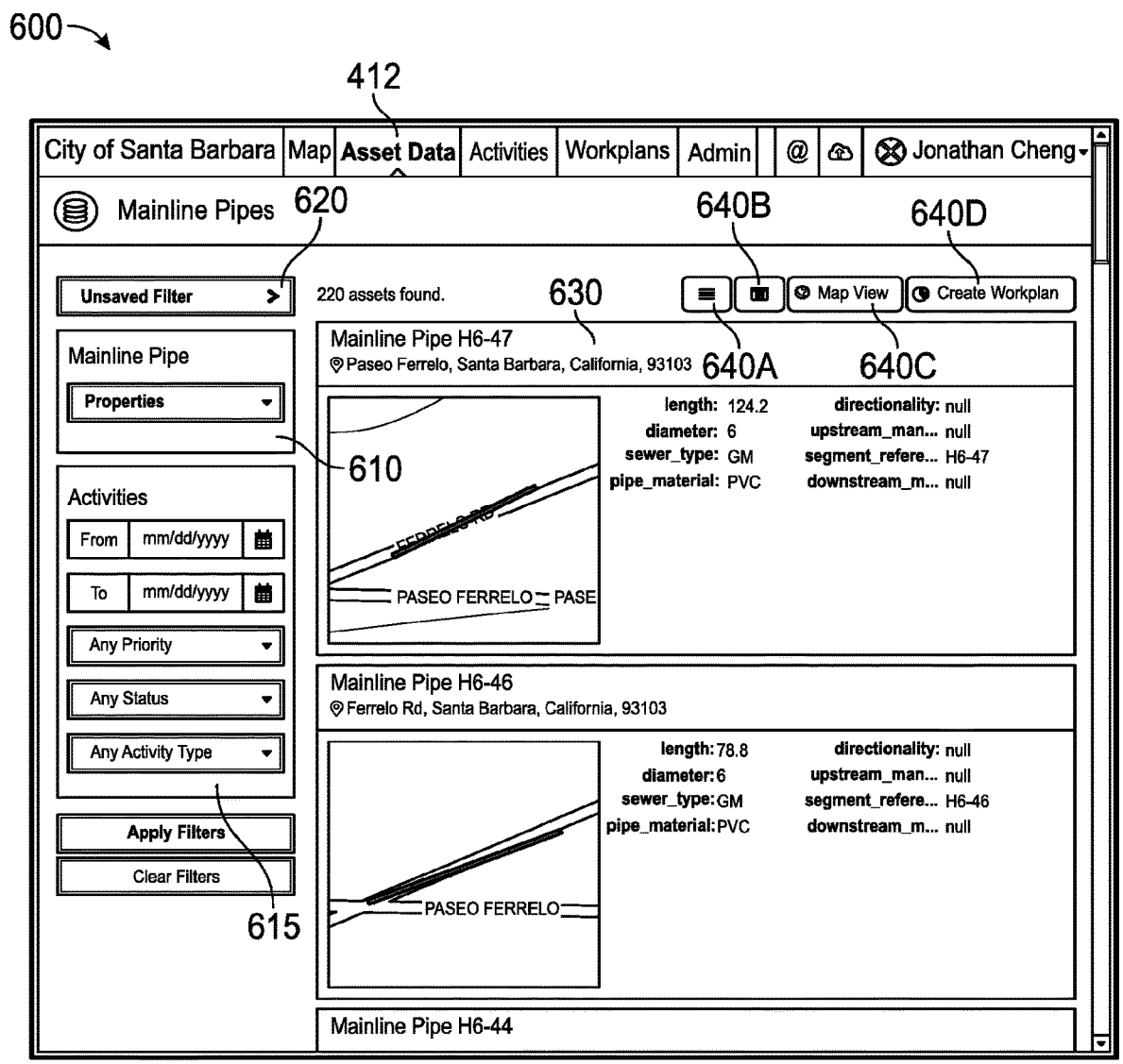

FIG. 6B illustrates a portion of a webpage 600 of user interface 210 which may be presented after a user has selected the asset type of "Mainline Pipes" from asset catalog list 602, according to an embodiment. In the illustrated embodiment, webpage 600 comprises a set of property filter input(s) 610, a set of activity filter input(s) 615, new or saved filter input 620, an asset list 630 comprising each infrastructure asset of the asset type selected from asset catalog list 602 (e.g., "Mainline Pipes" in the illustrated example), a collapse view input 640A for switching to a collapsed summary view of asset list 630, an expand view input 640B for switching to an expanded detailed view of asset list 630, a map view input 640C for viewing visual representations of the assets in asset list 630 together on the virtual map in virtual map frame 420, and a new workplan input 640D for creating a new workplan for the infrastructure assets listed in asset list 630.

Figure 6C:
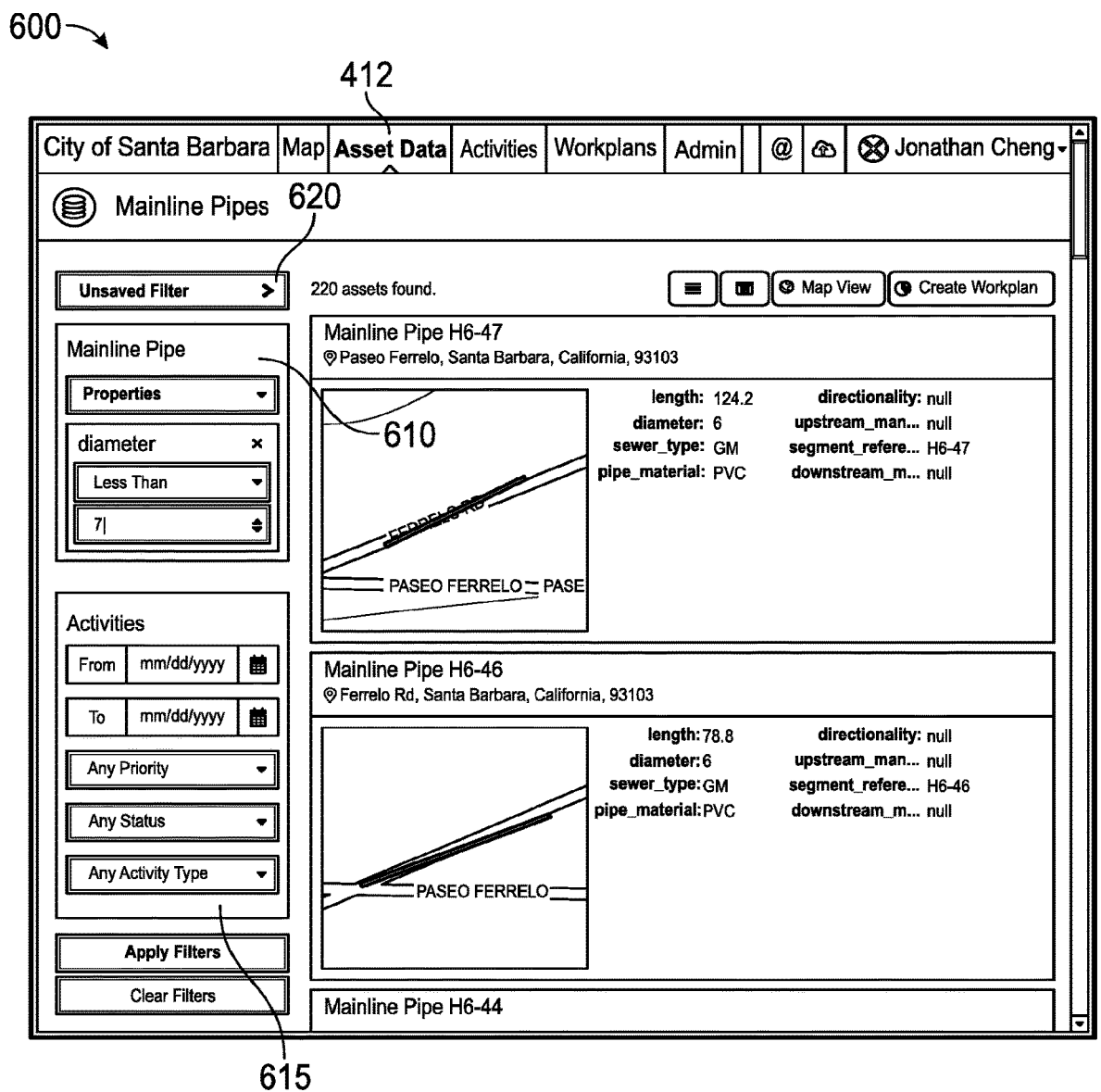

FIG. 6C illustrates a portion of webpage 600 of user interface 210 after a user has entered a criterion using property filter input(s) 610, according to an embodiment. In the illustrated example, the user has entered a criterion that the diameter is less than seven. In response, assets module 240 performs a search of the infrastructure assets of the asset type selected from asset catalog list 602 based on the entered criterion, and asset list 630 is updated to include only those assets which meet that criterion. It should be understood that different criteria may be entered using property filter input(s) 610, and that multiple criteria may be entered using filter inputs. The possible criteria may include a value or range of values for any attribute represented in a field for the selected asset type. In addition, possible values for one or more attributes that may form the basis of a criterion may be populated (e.g., in a drop-down list) based on attribute values in the fields for the infrastructure assets of the selected asset type, to ensure that the search always returns at least one result. Alternatively or additionally, one or more of the values for attributes that may form the basis of a criterion may be specified by a user using free-form input.

In an embodiment, a user may also search infrastructure assets using activity filter input(s) 615. As is discussed in greater detail elsewhere herein, each infrastructure asset may have one or more activities associated with it. A user may search for infrastructure assets associated with activities having one or more criteria using activity filter input(s) 615 in a similar manner as discussed above with respect to property filter inputs 610. For example, a user may enter a date range, a priority value, a status value, and/or an activity type into activity filter input(s) 615. In response, asset module 240 may perform a search of the infrastructure assets of the asset type selected from asset catalog list 602 based on these criteria, and asset list 630 may be updated to include only those assets which meet the criteria.

Using property filter input(s) 610 and activity filter input(s) 615, a user may search infrastructure assets based on both the fields of those infrastructure assets and the fields of activities associated with those infrastructure assets. In a further embodiment, additional input(s) could be provided to allow a user to search the infrastructure assets across additional criteria (e.g., fields of workplans associated with the infrastructure assets, sources of the datasets from which the infrastructure assets were derived, events associated with the infrastructure assets, etc.). In this manner, a user can identify unique relationships between different infrastructure assets.

In an embodiment, webpage 600 allows a user to change the order of the infrastructure assets in asset list 630. When a filter is saved using new filter input 620, this order is saved as part of the filter. Thus, when the saved filter is subsequently retrieved by a user, the assets are presented to that user in the order in which those assets are saved. In addition, when a workplan is created against those assets using new workplan input 640D, the workplan may comprise those assets in the same order in which they are arranged in asset list 630. Thus, for example, a particular order in which the workplan is to be performed against the assets can be specified by the user. This order may comprise the highest-priority assets first (e.g., assets with the lowest overall ratings, assets with the highest risk assessment, etc.), such that the workplan is performed on those assets first. Alternatively, the assets may be ordered according to their locations, such that the order represents a most efficient route (e.g., to be taken by a worker in the field) between the assets in the workplan. Notably, since this order is saved in the filter, the same filter can be used again and again to generate workplans with the same ordering of assets.

Figure 6D:
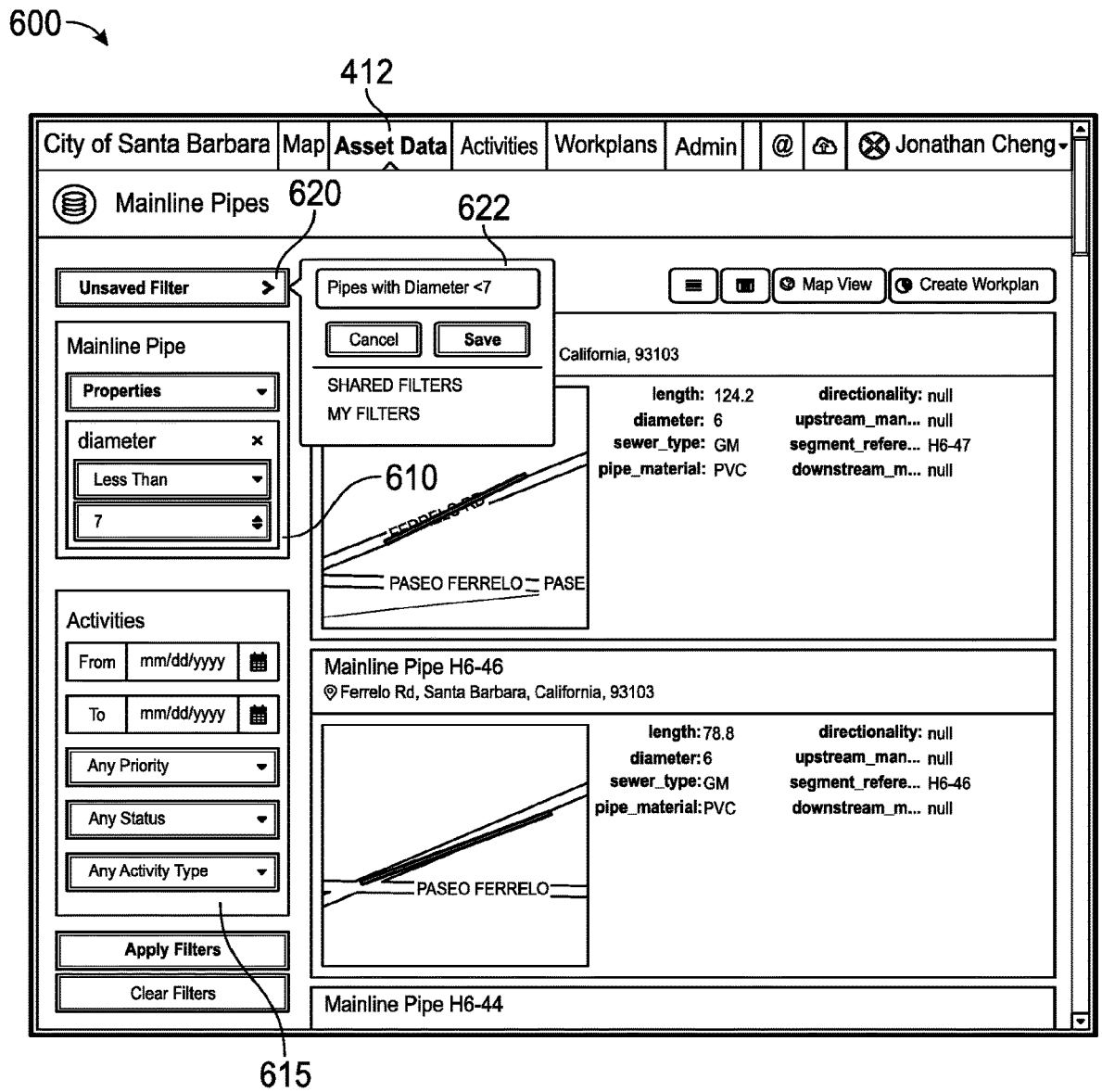

In an embodiment, all of the criteria entered using property filter input(s) 610 and activity filter input(s) 615 may be saved as a filter using new filter input 620. FIG. 6D illustrates a portion of webpage 600 of user interface 210 after a user has selected new filter input 620 and entered an identifier (i.e., "Pipes with Diameter<7") for the new filter, according to an embodiment. When the user selects new filter input 620, a new filter frame 622 is overlaid in webpage 600. Filter frame 622 may comprise an input for entering an identifier (e.g., name) of the new filter, a save input for saving the new filter, a cancel input for canceling the new filter, and/or a list of selectable previously-saved and/or shared filters which are each associated with inputs for editing and/or deleting each particular saved or shared filter. When the user selects the save input, a new filter is generated comprising all of the criteria that have been input into property filter input(s) 610 and activity filter input(s) 615, and stored (e.g., in database(s) 114). It should be understood that the new saved filter may subsequently appear in a filter list as a selectable filter available to be visualized in virtual map frame 420, and may be subsequently selected from filter frame 622, such that it populates property filter input(s) 610 and/or activity filter input(s) 615.

Figure 6E:
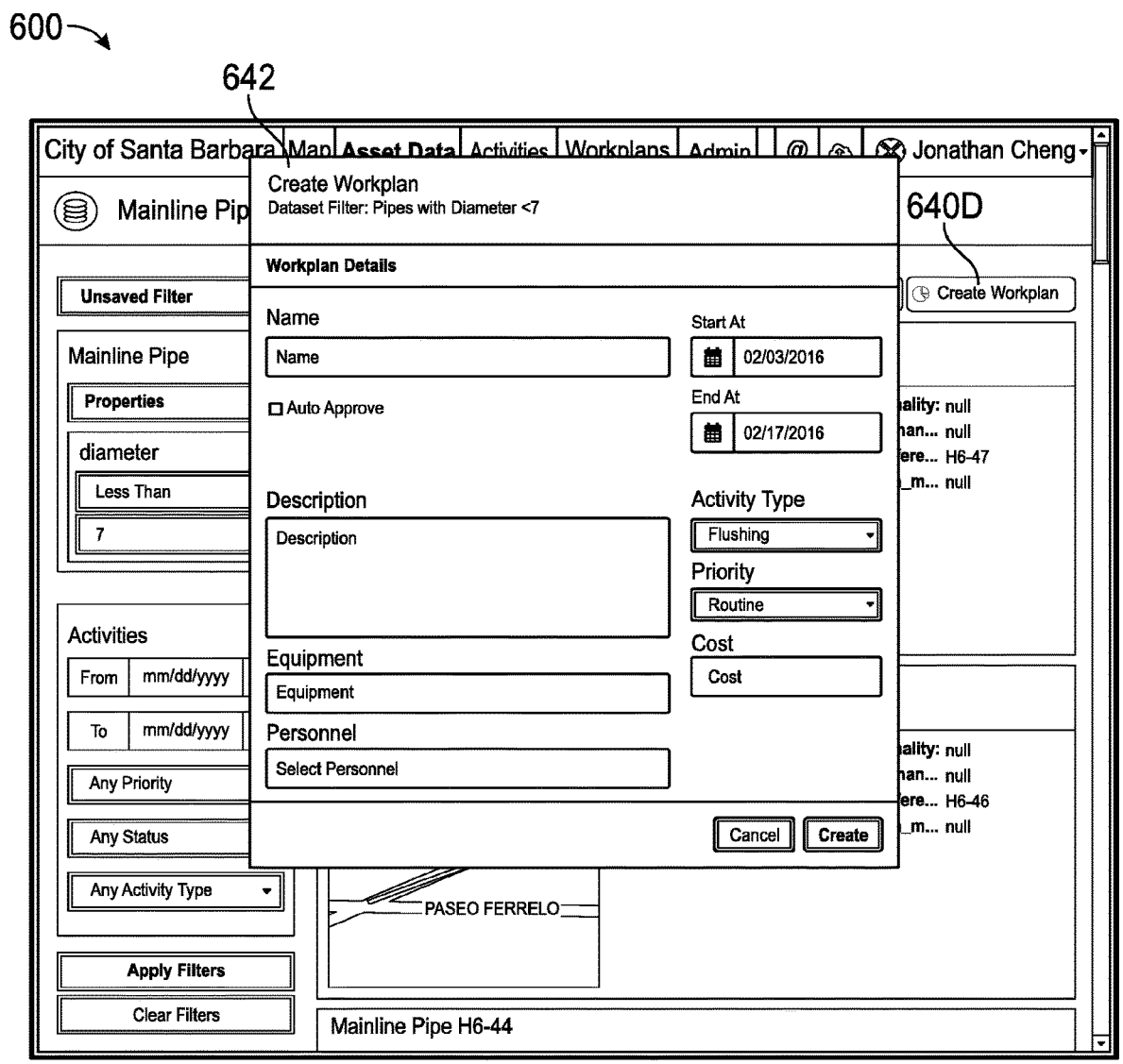

FIG. 6E illustrates a portion of webpage 600 of user interface 210 after a user has selected the new workplan input 640D, according to an embodiment. In response to the user selection of new workplan input 640D, a new workplan frame 642 is overlaid in webpage 600. New workplan frame 642 comprises one or more inputs for entering workplan data to be used to generate a new workplan for the infrastructure assets listed in asset list 630. This workplan data may comprise, without limitation, a name for the workplan, a start date and/or end date for the workplan, whether the workplan is to be automatically approved or manually approved, an input for saving the workplan, and/or an input for canceling the workplan. It should be understood that the received workplan data may be stored as fields in a data structure representing the workplan.

In addition, in the illustrated example, new workplan frame 642 comprises one or more inputs for entering activity data to be used to generate an activity to be associated with the new workplan. This activity data may comprise, without limitation, an activity description, equipment to be used for the activity, personnel to perform the activity, an activity type, an activity priority (e.g., routine, high priority, emergency), a cost, a status, an activity checklist, an identification or specification of a follow-up activity, an identification of an industry-standard application, etc. It should be understood that the received activity data may be stored as fields in a data structure representing the activity, and that the activity data structure may be stored in or associated with the workplan data structure.

One or more of these inputs may depend on the asset type of the infrastructure assets included in the workplan. For example, the possible activity types (e.g., in a drop-down list) may be different for one asset type than for another asset type (e.g., manholes may have activity types of visual inspection, cleaning, and MACP inspection, whereas mainline pipes may have activity types of visual inspection, video inspection, PACP inspection, acoustic inspection, flushing, jetting, cleaning, root removal, hydraulic flow monitoring, spot repair, grouting, CIPP lining, and replacement). It should be understood that the possible activity types may be different for one infrastructure domain than for another infrastructure domain (e.g., the potable water domain may include activities for pump station maintenance and management, booster pump station maintenance and management, valve station maintenance and management, valve turning/exercising, valve vaults, access holes and structures, valve replacements, water meter reading, repair, or replacement, water service repair or replacement, catholic protection, pipeline replacements, etc., as opposed to the sewer domain activities mentioned above). As another example, the available equipment and/or personnel (e.g., in a drop-down list) for an activity may be different for one asset type than for another asset type. As yet another example, new workplan frame 642 may include more, less, or different inputs for one asset type than for another asset type.

Similarly, one or more of these inputs may depend on the selected activity type. For example, the available equipment and/or personnel for an activity may be different for one activity type than for another activity type. As another example, new workplan frame 642 may include more, less, or different inputs for one activity type than for another activity type.

In an embodiment, each workplan may only be associated with a single activity. Alternatively, each workplan may be associated with a plurality of activities. In such a case, new workplan frame 642 may comprise one or more inputs for adding a new activity to the workplan, in which case new workplan frame 642 may receive activity data for each of the added activities.

Once a user selects the save input in new workplan frame 642, workplans module 260 may generate and store the new workplan based on the inputs received via new workplan frame 642. The new workplan comprises the workplan data and activity data entered in new workplan frame 642, as well as an identification of each of the infrastructure assets to be included in the workplan (e.g., the infrastructure assets in asset list 630 at the time that the new workplan was created).

FIG. 7A illustrates a portion of a webpage 700 of user interface 210 after a user has selected the save input in new workplan frame 642, according to an embodiment. In the illustrated example, webpage 700 comprises an informational area 710 which comprises workplan data and/or activity data for the workplan. In addition, webpage 700 comprises a virtual map area 720 which comprises a virtual map that includes a visual representation of each infrastructure asset included in the workplan. Notably, the zoom level of the virtual map is set so that virtual map area 720 encompasses the location of each infrastructure asset included in the workplan. Webpage 700 also comprises an asset list 730 comprising a row of information for each of the infrastructure assets included in the workplan. Each row may comprise an identifier of the asset, a location of the asset (e.g., street, city, Zip code), a status of the asset (e.g., whether or not the activity or activities in the workplan have been completed for that asset), a status date (e.g., representing the date that the status of the asset last changed), and an input for changing settings for the asset (e.g., show details for the asset, remove the asset from the workplan, etc.). In addition, webpage 700 may also comprise a settings input 740, which allows a user to, for example, edit the workplan, delete the workplan, and/or share the workplan.

FIG. 7B illustrates a portion of webpage 700 of user interface 210 after a user has selected settings input 740, according to an embodiment. Specifically, after a user has selected settings input 740, a settings frame 745 is overlaid in webpage 700. In the illustrated example, settings frame 745 comprises inputs for editing the workplan, viewing a report view of the workplan, and deleting the workplan.

Figure 7C:
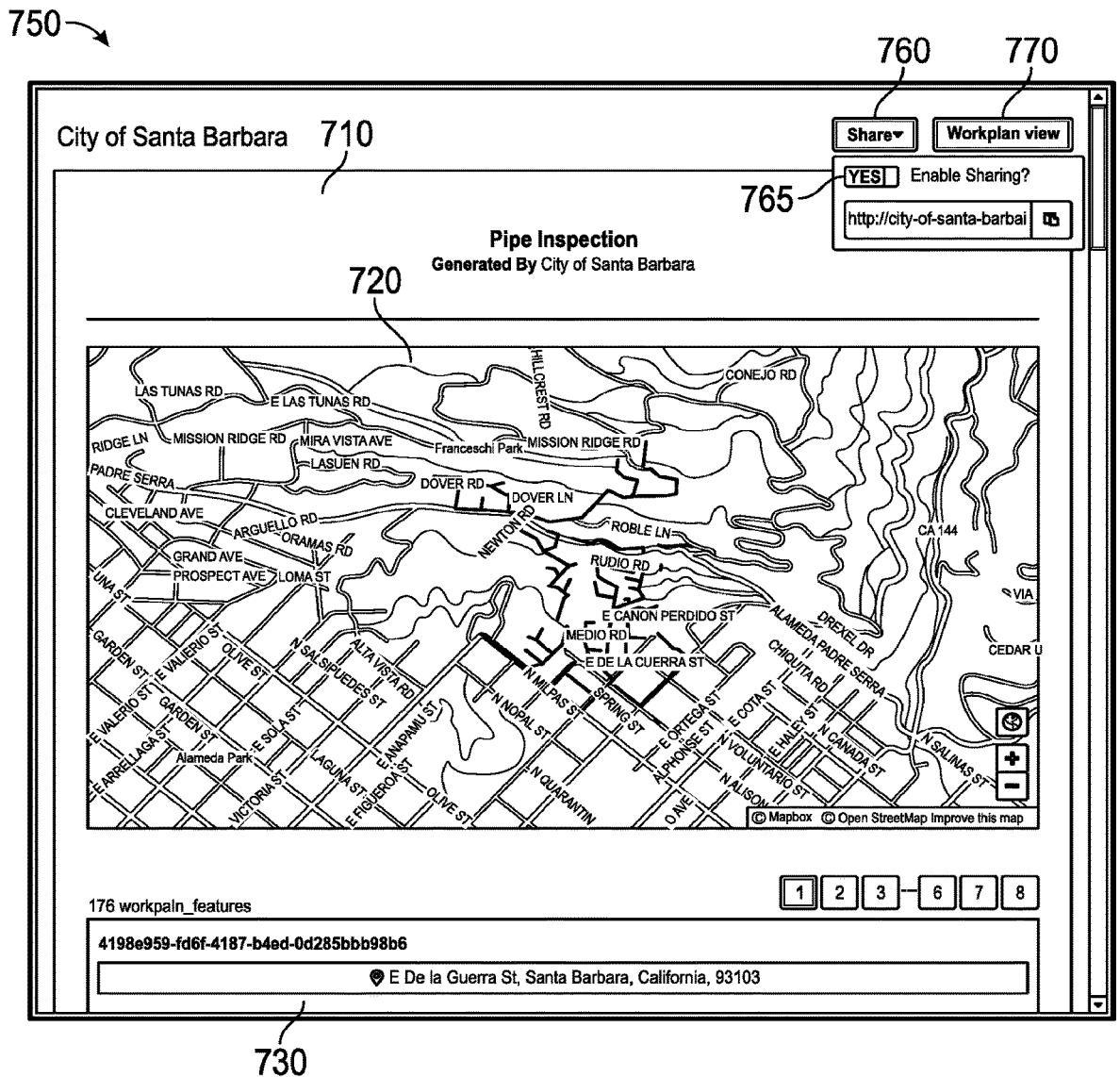

FIG. 7C illustrates a portion of a webpage 750 of user interface 210, which may be presented after a user has chosen to view the report view of the workplan from settings frame 745. Webpage 750 summarizes a workplan in a reporting format for easier printing and/or sharing. Similarly to webpage 700, webpage 750 comprises an informational area 710, a virtual map area 720, and an asset list 730. In addition, webpage 750 comprises a workplan view input 770 which may redirect the user back to webpage 700 or a similar webpage.

Webpage 750 may also comprise sharing input 760. In response to a user selection of sharing input 760, a sharing frame 765 may be overlaid in webpage 750. In the illustrated example, sharing frame 765 allows a user to toggle sharing of the report presented in webpage 750. Sharing frame 765 also comprises a unique URL for webpage 750 that can be used in the future to direct a browser directly to webpage 750. Workplans may be shared within an account (e.g., within a single organization), between accounts (e.g., between different organizations), and/or outside of an account (e.g., with non-users or uses unassociated with any account).

FIG. 8 illustrates a portion of a webpage 800 of user interface 210 which may be presented after a user has selected workplans input 414 from any of the other webpages of user interface 210, according to an embodiment. Webpage 800 may comprise a list of all saved workplans, with each row in the list representing a workplan and providing information about the workplan. For instance, each workplan row may comprise a name of the workplan, the number of infrastructure assets included in the workplan, the type of activity associated with the workplan, a priority of the activity, a scheduled date range for the activity, a progress of the workplan or activity (e.g., a percentage of infrastructure assets for which the activity has been completed), a status of the workplan or activity (e.g., active, planned, incomplete, overdue, pending, etc.), and/or an input for editing the workplan. If a user chooses to edit a workplan, a frame, similar to new workplan frame 642 in FIG. 6E, may be overlaid on webpage 800 with one or more inputs for editing workplan and/or activity data, changing a workplan status and/or activity status, etc.

FIGS. 9A-9E illustrate portions 900A-900E of a webpage 900 of user interface 210 for viewing activity details for a particular activity associated with a particular infrastructure asset and/or workplan, according to an embodiment. A user may be directed to webpage 900 in response to a user selecting (e.g., clicking on) an activity identifier associated with a particular infrastructure asset. Anywhere that an activity identifier for a particular infrastructure asset is presented in user interface 210, the activity identifier may be included in a hyperlink which links to webpage 900 comprising activity details for the particular activity.

As illustrated in FIGS. 9A-9E, webpage 900 may comprise a navigational frame 910 which allows a user to jump to particular areas of webpage 900. These areas may be different depending on the type of the particular activity and/or the type of the particular infrastructure asset. In the illustrated example, webpage 900 comprises activity details for a PACP inspection of a sewer pipe segment.

For a video-based inspection activity, the areas of webpage 900 may comprise a media area 920. Media area 920 may comprise a list of media, if any, such as inspection video(s). The list of media may comprise a row for each available medium, including, without limitation, a name of the media file, a size of the media file, a date that the media file was created or uploaded, an identifier (e.g., name) of the user who uploaded the media file, an input for downloading the media file (e.g., from cloud storage), and/or an input for deleting the media file. In addition, each row may be selectable or comprise an input for selecting the media file. When a media file is selected, it may be displayed and/or played in media area 920, as illustrated in FIG. 9A. It should be understood that media area 920 may not be present for activities which do not involve media or do not have any associated media.

The areas of webpage 900 may comprise a details area 930, which provides details of the activity. In the illustrated example, the details comprise Pipeline Assessment Certification Program (PACP) inspection details. However, it should be understood that, for other types of activities, details area 930 may comprise other types of details.

The areas of webpage 900 may comprise an asset detail area 940 which comprises attributes of the particular infrastructure asset, for example, derived from fields in the data structure for the infrastructure asset. For instance, asset detail area 940 may comprise the field name and stored value for each represented attribute of the infrastructure asset.

The areas of webpage 900 may comprise a conditions area 950 which provides conditions of the activity. In the illustrated example, the conditions comprise PACP conditions. However, it should be understood that, for other types of activities, conditions area 950 may comprise other types of conditions.

The areas of webpage 900 may comprise a ratings area 960 which provides one or more ratings of the infrastructure asset, for example, as determined during the activity. In the illustrated example, the ratings comprise PACP ratings. However, it should be understood that other types of ratings may be used. In an embodiment, each infrastructure asset may be associated with multiple ratings, such as a structural rating, operations and management rating, and overall rating. Alternatively, each infrastructure asset may only be associated with a single rating (e.g., just an overall rating) or no rating at all.

The areas of webpage 900 may comprise an asset diagram 970. However, it should be understood that not all types of infrastructure assets may lend themselves to a diagram. Therefore, webpage 900 may not include an asset diagram 970 for some types of infrastructure assets. Asset diagram 970 may be generated by one or more modules of user interface 210, for example, in conjunction with assets module 240 and/or activities module 250. Asset diagram 970 may be generated dynamically when webpage 900 is requested, or may be pre-generated, stored, and retrieved when webpage 900 is requested.

In the illustrated example, since the particular infrastructure asset is a pipe segment, asset diagram 970 comprises a pipe diagram. The pipe diagram may be generated using the stored fields in the data structure representing the pipe segment and inspection data received for the inspection of the pipe segment (i.e., the activity). For example, an identifier of the upstream manhole and an identifier of the downstream manhole for the pipe segment may be retrieved from the data structure for the pipe segment. A visual representation 971 (e.g., a circle) of the upstream manhole with its identifier and a visual representation 972 (e.g., a circle) of the downstream manhole with its identifier are generated and displayed. The identifiers for the manholes may be hyperlinks, such that, when a user selects an identifier, his or her client application 132 (e.g., browser) is directed to a webpage comprising asset details for the associated manhole. In addition, a visual representation 973 (e.g., a line) of the pipe segment between the upstream and downstream manholes is generated and displayed between visual representations 971 and 972 of the upstream and downstream manholes, respectively.

In the illustrated embodiment, additional data for the pipe diagram is generated from inspection data associated with the activity being represented by webpage 900. Specifically, the inspection data may be comprise one or more of the media listed and/or displayed in media area 920, metadata associated with the media, and/or other data related to an inspection that has been performed. For example, third-party inspection software (e.g., Granite XP™, WinCan™, Pipelogix™, ITpipes™, Posm™, ICOM3™, Pipetech™) may be used to generate an inspection database (e.g., a Microsoft Database (MDB) file) for a particular inspection that comprises a video and/or images and notes input by a worker conducting the inspection. This inspection database may be uploaded (e.g., by a client application 132 executing on a user system 130 operated by the worker or another individual) to application 200 over network(s) 120. It should be understood that the database may be uploaded in real time (e.g., while the worker is conducting the inspection, for example, using a wireless communication network, such as a cellular or Wi-Fi network), contemporaneously with the inspection (e.g., soon after the worker has finished the inspection and in the field, for example, using a wireless communication network), or some time period after the inspection (e.g., after the worker has returned to his or her base of operation, using a wireless or wired communication network). In addition, it should be understood that the database may be uploaded in portions. For example, metadata (e.g., PACP codes, observations, etc.) may be uploaded in the field via a cellular network, whereas the media (e.g., an inspection video which may be much larger than the associated metadata) may be uploaded once a Wi-Fi connection is available (e.g., when the worker returns from the field). In either case, activities module 250 may receive the inspection database, and determine to which infrastructure asset and/or activity the inspection database is associated.

It should be understood that the infrastructure asset or activity associated with the inspection database may be determined based on a user operation (e.g., the user using user interface 210 to specify the activity and uploading the inspection database specifically for that activity), an activity identifier (e.g., the inspection database comprising an identifier of the activity to which it is associated), an asset identifier (e.g., added to a particular field of the inspection database), and/or the like. In an embodiment, multiple conditional methods may be used to automatically identify the infrastructure asset or activity based on data in the inspection database. This may provide support for legacy methods of providing inspection databases to application 200. As an example, for a CCTV inspection of a pipe segment, application 200 may (1) access a predetermined field of the inspection database (e.g., a "pipe_segment_reference" field created by third-party CCTV software) for an asset identifier, (2) if the predetermined field is empty or does not match any stored asset identifier, access predetermined fields of the inspection database for the asset identifiers of the manholes bracing the pipe segment, and retrieve the asset identifier for the pipe segment between the identified manholes, (3) if the predetermined fields for the asset identifiers of the manholes are empty or do not match any stored asset identifiers, access predetermined field(s) of the inspection database representing a location (e.g., address, GPS coordinates), and retrieve the asset identifier of a pipe segment nearest to that location.

Once the asset identifier has been retrieved, assets module 240 may associate data from the inspection database with the infrastructure asset associated with the identifier, and/or activities module 250 may retrieve or create an inspection activity associated with that infrastructure asset and associate data from the inspection database with that inspection activity. For example, assets module 240 or activities module 250 may extract the inspection video from the inspection database and attach it to the infrastructure asset or activity, respectively, such that it subsequently appears in media area 920. In addition, the module may extract the inspection worker's notes from the inspection database, and utilize the extracted notes to generate annotations of the pipe segment in the pipe diagram.

In the illustrated embodiment, a visual indication 974 (e.g., icon) representing the direction of travel of the inspection video is provided with the pipe diagram. Visual indication 974 indicates that the video was captured while a camera traveled from the upstream manhole (represented by 971) to the downstream manhole (represented by 972). Thus, the starting point of the video is the upstream manhole, and the ending point of the video is the downstream manhole (or some position within the pipe segment between the upstream manhole and the downstream manhole). In an embodiment, it may always be assumed that the inspection video begins at the upstream manhole and ends at the downstream manhole. Alternatively, the starting and/or ending point of the video may be indicated in and extracted from the database.

In addition, in the illustrated embodiment, the inspection worker's notes are extracted from the inspection database and displayed as annotations 975 alongside the visual representation 973 of the pipe segment. Notes may comprise observations made by the worker during inspection, including, for example, water levels, taps, junctions, faults (e.g., cracks, roots), or other issues in the pipe segment. Each note may be associated with a relative position from the beginning of the video or starting point of the video. For example, the position of a note may be expressed in terms of a distance (e.g., feet, meters, etc.) traveled by the camera during the inspection or a distance traveled by the camera from a position of the starting manhole (e.g., the upstream manhole).

Figure 9D:
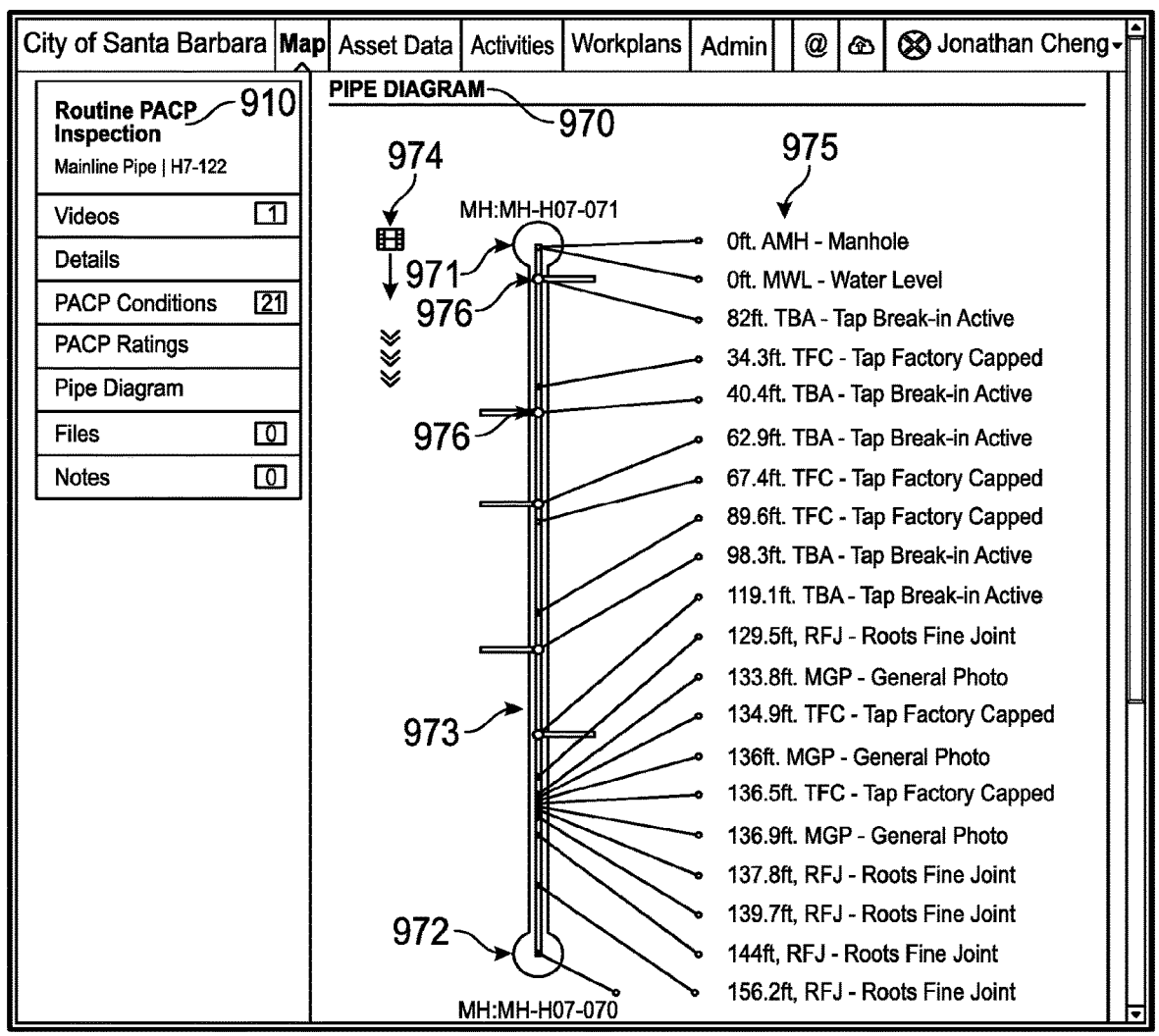
Figure 9E:

Annotations 975 may be positioned along visual representation 973 at a position representing the relative position of the corresponding note. Alternatively, as illustrated in FIG. 9D, annotations may be equally spaced from each other but each annotation may be associated with a line, arrow, or other indication showing its position along visual representation 973. As an example, if the pipe segment represented by visual representation 973 is 100 feet long, and the inspection worker notes roots after the camera has traveled 8 feet from the upstream manhole, an annotation 975 (e.g., "roots", "8 ft. roots", etc.) may be positioned relative to visual representation 973 at a position that is 8% of the distance from visual representation 971 of the upstream manhole to visual representation 972 of the downstream manhole. Thus, if visual representation 973 of the pipe segment happens to be 1,000 pixels long in webpage 900, the annotation 975 corresponding to the note would be positioned approximately 80 pixels from the visual representation 971 of the upstream manhole.

Annotations 975 and/or their positions along visual representation 973 of the pipe segment may be selectable (e.g., using hyperlinks), such that a user may click on an annotation 975 and view a video frame (e.g., within an overlay, within media area 920, or within a separate webpage), within the associated inspection video or extracted from the inspection video, that corresponds to that annotation. For example, each annotation 975 may be associated with a particular video frame in the inspection video, and a user selection of the annotation may result in display of that video frame. Annotations 975 may be associated with a video frame based on its corresponding note which may be associated with a particular video frame in the inspection video. Alternatively, the video frame corresponding to an annotation 975 or its corresponding note may be determined based on a distance displayed in each video frame. For example, many inspection videos annotate the video frames with date, time, reference, and/or distance from a starting point. Optical character recognition (OCR) may be applied to the distance annotation in each video frame or a portion of video frames in an inspection video (e.g., by activities module 250), such that a distance value can be derived for each of the OCR'ed video frames. Each annotation 975 may then be associated with a video frame which has a distance that most closely matches the distance for the annotation or its corresponding note (e.g., an annotation for "7 ft." may be matched to a video frame with an OCR'ed distance annotation of "7.0 ft"). In this manner, a user can jump right to a video frame relevant to an observation (represented by a note displayed as an annotation 975) made by an inspection worker. For example, if an annotation 975 identifies a fault in the pipe segment at 8 feet from the upstream manhole, the user may click on the annotation, and be presented with a video frame of the inspection video at 8 feet from the upstream manhole, such that the user may view the fault for himself or herself.

In addition, notes from the inspection database may also be represented as diagram elements. For example, notes made by the inspection worker regarding a sewer tap at "8.2 ft." and "40.4 ft." may be converted into visual representations 976 of a sewer tap at their relative positions (i.e., 8.2/172.8 and 40.4/172.8, respectively, along the length of visual representation 973 from visual representation 971 to visual representation 972), as well as being represented in annotations 975.

The areas of webpage 900 may comprise a files area 980 for associating files with the particular activity. Files area 980 may comprise a list of associated files, if any, and an input for uploading new files to be associated with the particular activity. For example, such files may comprise inspection videos of the infrastructure asset, images of or related to the particular activity and/or infrastructure asset, documents related to the particular activity and/or infrastructure asset, etc.

The areas of webpage 900 may comprise a notes area 990 for viewing and associating notes with the infrastructure assets. For example, notes area 990 may comprise an input for entering a free-form note. A user may enter a note into the input and submit the note. In response, activities module 250 may associate the submitted note with the particular activity, such that the note is subsequently displayed in notes area 990 for all users to see and to potentially respond. As described elsewhere herein, notes area 990 may accept mentions of users (e.g., via special character "@") and notify the note as a message to the mentioned users (e.g., via message notification input 416).

Figure 10A:
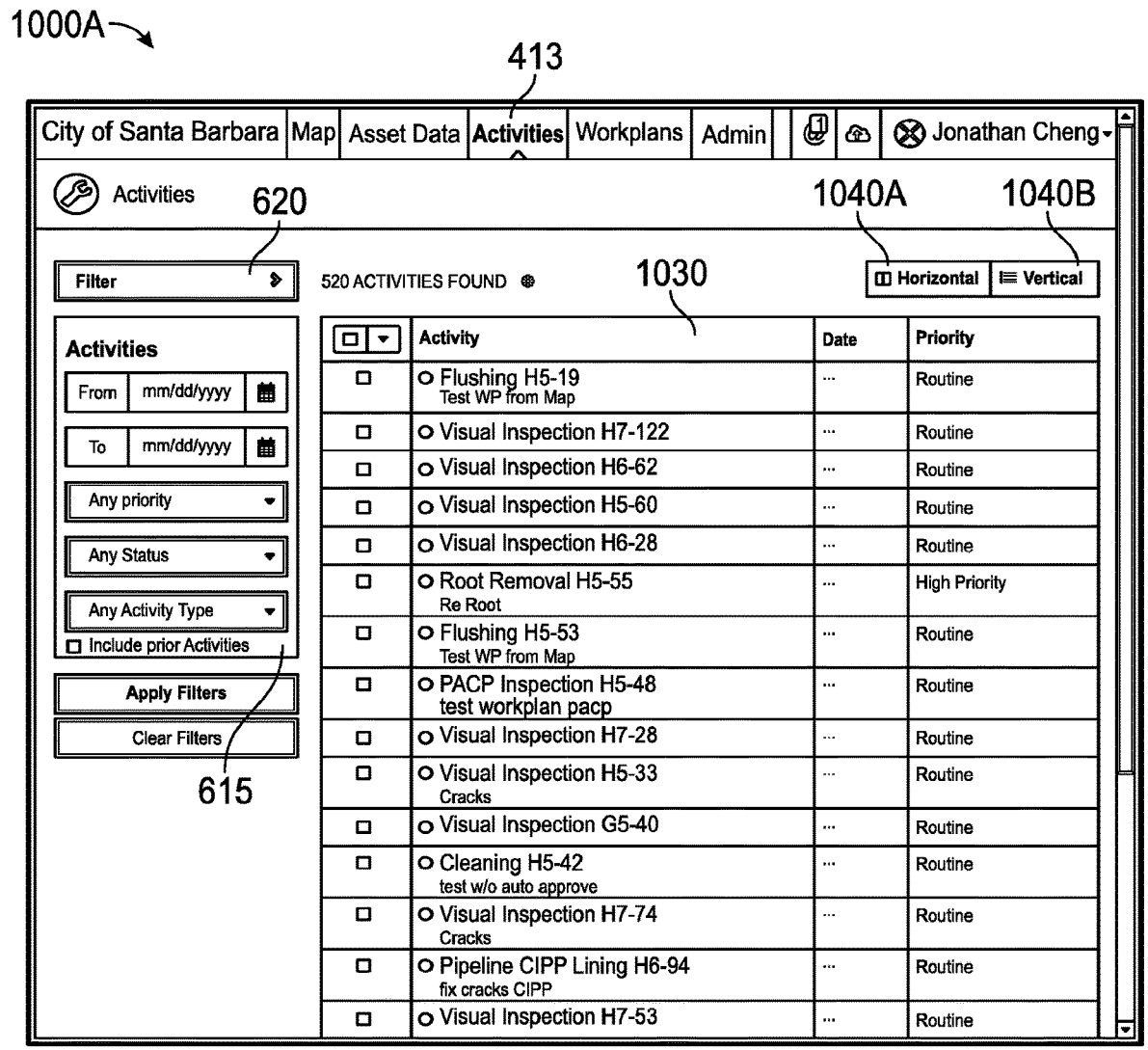

FIG. 10A illustrates a portion of a webpage 1000A of user interface 210 which may be presented after a user has selected activities input 413 from any of the other webpages of user interface 210, according to an embodiment. At least initially, webpage 1000A may comprise a list of all saved activities.

In the illustrated embodiment, webpage 1000A comprises a set of activity filter input(s) 615, new filter input 620, an activity list 1030, a horizontal view input 1040A, and a vertical view input 1040B. Activity filter input(s) 615 and new filter input 620 are similar or identical, in operation and function, to those illustrated in FIG. 6B. Horizontal view input 1040A, when selected, formats the records such that the information is arranged horizontally, as depicted in FIG. 10A. Vertical view input 1040B, when selected, formats the records such that the information is arranged vertically.

In an embodiment, activity list 1030 comprises an activity record for each activity that satisfies the filter criteria input using activity filter input(s) 615, or selected from new or saved filter input 620. Each activity record may comprise a color-coded status indicator (e.g., an orange icon to indicate a "pending" status, a green icon to indicate a "completed" status, etc.), a name or type of the activity, asset identifier(s) identifying one or more infrastructure assets associated with the activity, a description of the activity, a date, and/or a priority. In addition, the name or type of the activity may be selectable (e.g., by comprising a hyperlink), such that, when selected, the user is directed to an activity detail user interface, such as the example webpage 900 illustrated in FIGS. 9A-9E, which provides details about the selected activity. Each of the asset identifier(s) may also be selectable (e.g., by comprising a hyperlink), such that, when selected, the user is directed to an asset detail user interface, such as the example webpage 500 illustrated in FIGS. 5A-5C, which provides details about the selected asset. In addition, each record may be individually selected (e.g., using checkbox inputs) and/or selected in groups, and an action may be performed on all of the selected record(s) at once (e.g., changing the status of the selected record(s) to completed, approved, rejected, etc.).

In an embodiment, webpage 1000A may also comprise a map view input and new workplan input. These map view and new workplan inputs may be similar or identical, in operation and function, to the map view input 640C and the new workplan input 640D, respectively, illustrated in FIG. 6B. In other words, the map view input, when selected, may visually represent each of the listed activities in virtual map frame 420, and the new workplan input, when selected, may result in the overlaying of new workplan frame 642 for generating a new workplan comprising each of the activities for which an activity record was selected in activity list 1030 prior to selection of the new workplan input. Thus, for example, a user could query all activities with a status of "recommended" using activity filter input(s) 615 in webpage 1000A, selected all of the recommended activities returned by the query in activity list 1030, and create a workplan for the recommended activities using the new workplan input.

In an embodiment, webpage 1000A allows a user to change the order of the activity records in activity list 1030. When an activity filter is saved using (e.g., using the new filter input), this order is saved as part of that activity filter. Thus, when the saved activity filter is subsequently retrieved by a user, the activity records are presented to that user in the order in which those activity records were saved. In addition, when a workplan is created against those activities (e.g., using the new workplan input), the workplan may comprise those activities in the same order in which they are arranged in activity list 1030.

Figure 10B:
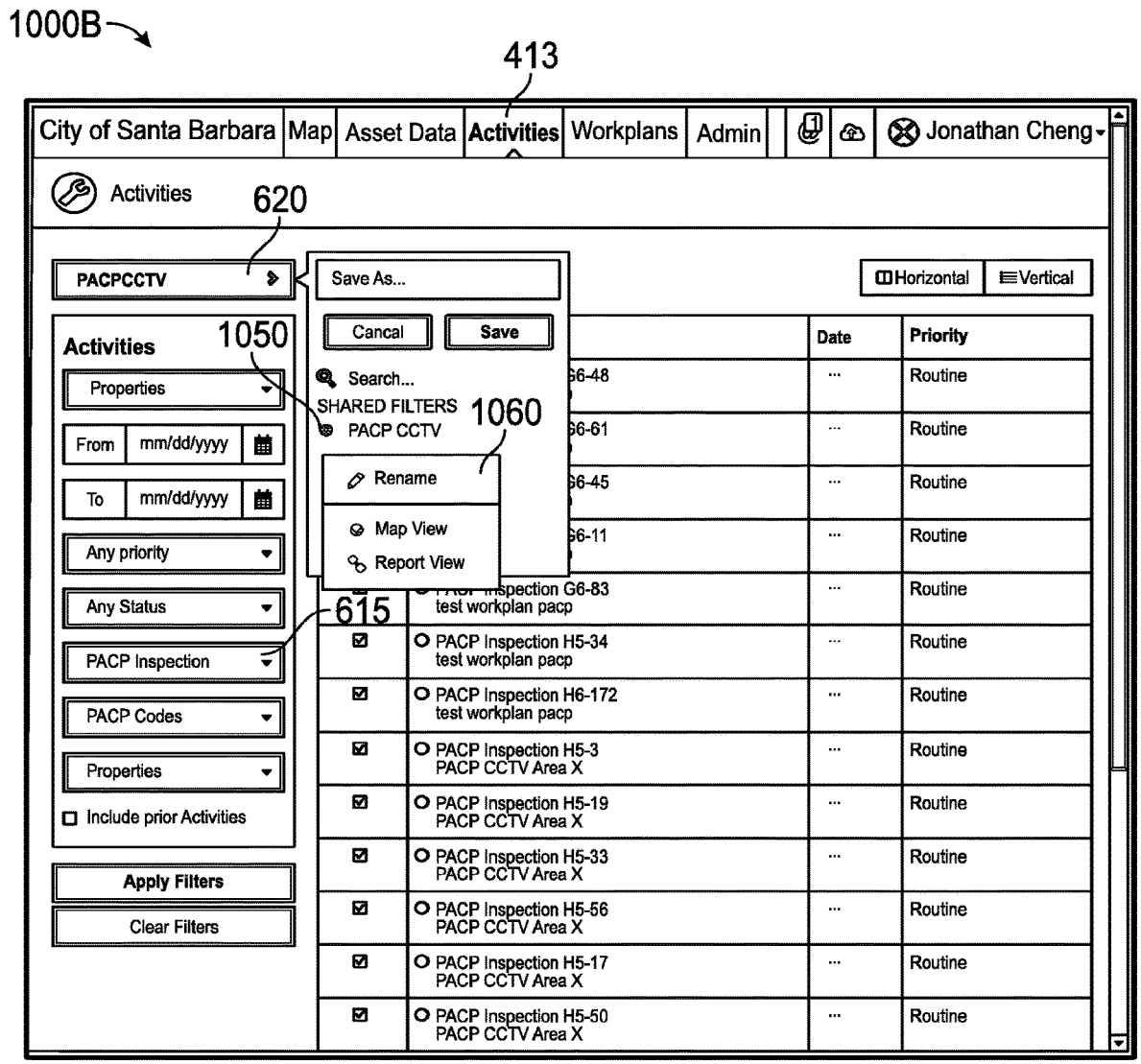

FIG. 10B illustrates a portion of a webpage 1000B of user interface 210 which may be presented after a user has selected a settings input 1050 corresponding to a particular saved activities filter, according to an embodiment. In response, views module 230 may overlay a settings menu 1060 over webpage 1000B. Settings menu 1060 may comprise one or more inputs for renaming the activities filter, viewing the activities that satisfy the filter on a map, viewing the activities that satisfy the filter in a report, and/or the like. If a user selects the input for viewing the activities on a map, all of the activities that satisfy the corresponding filter may be visually represented in virtual map frame 420, for example, in the same manner as illustrated in FIG. 4D.

Figure 10C:
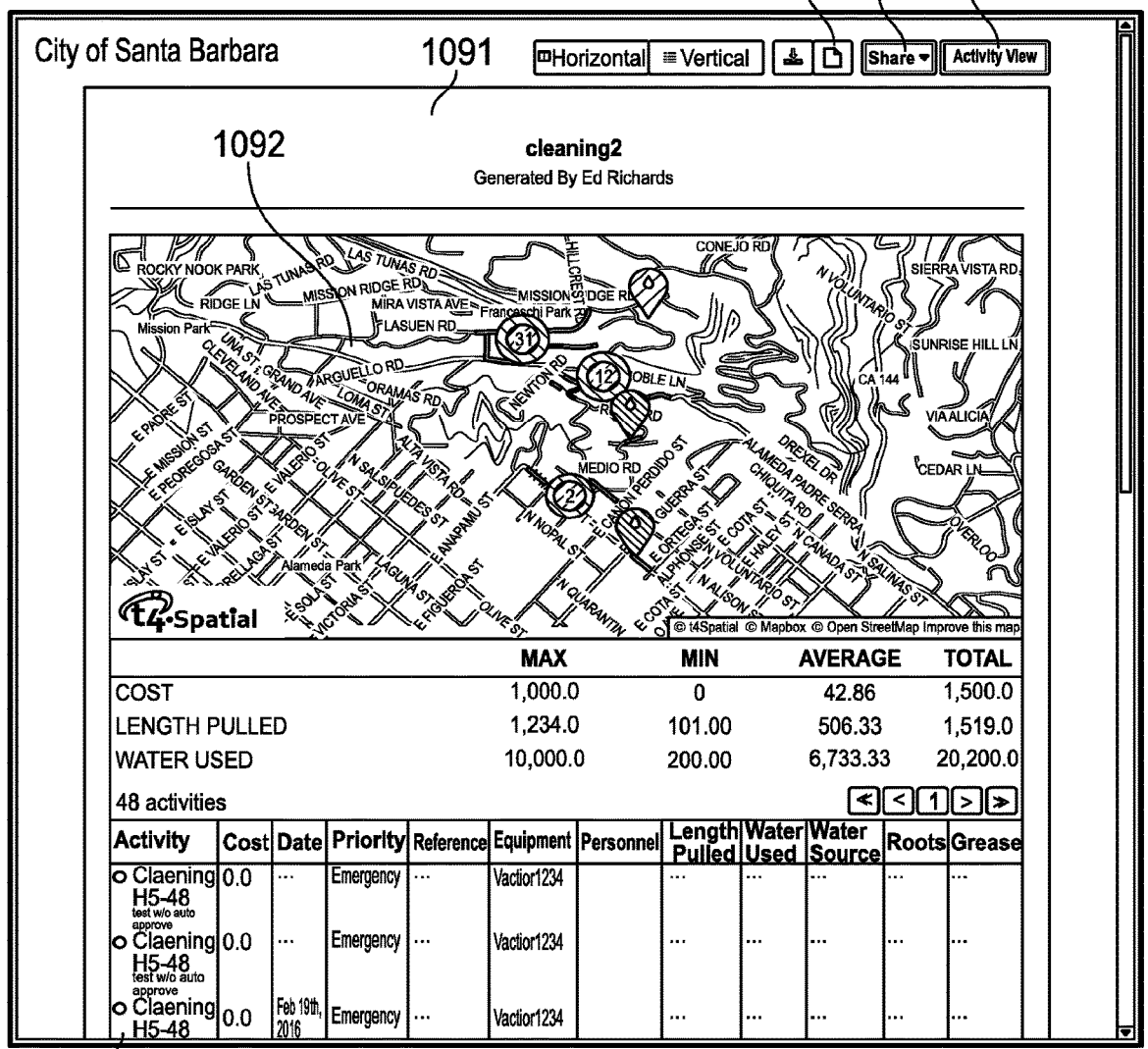

FIG. 10C illustrates a webpage 1000C of user interface 210, which is provided after a user has chosen to view the activities that satisfy a particular activities filter via an input in settings menu 1060 for that activities filter in webpage 1000B, according to an embodiment. In the illustrated example, webpage 1000C comprises an informational area 1091 which comprise, for example, a title and originator of the activities filter. In addition, webpage 1000C comprises a virtual map area 1092 which comprises a virtual map that includes a visual representation of each activity that satisfies the activities filter. Notably, the zoom level of the virtual map is set so that virtual map area 1092 encompasses the location of each activity satisfying the activities filter, and may include cluster(s) of activities as discussed elsewhere herein. Webpage 1000C also comprises an activity list 1093 comprising a row of information for each of the activities satisfying the activities filter. Each row may comprise an identifier of the activity, a cost of the activity, a date of the activity, a priority of the activity, a reference string for the activity, an equipment to be used for the activity, various attributes related to the activity (e.g., attributes of an asset involved in the activity), and/or the like. Webpage 1000C may comprise an input for converting the report, represented by webpage 1000C, into a PDF file for portable viewing. Furthermore, as with the workplan report, illustrated in webpage 750 in FIG. 7C, webpage 1000C may comprise an input 1096 for sharing the activities report in the same or similar manner as described with respect to sharing a workplan. In addition, webpage 1000C may comprise an input 1097, which may redirect the user back to webpage 1000B or a similar webpage.

Figure 11A:
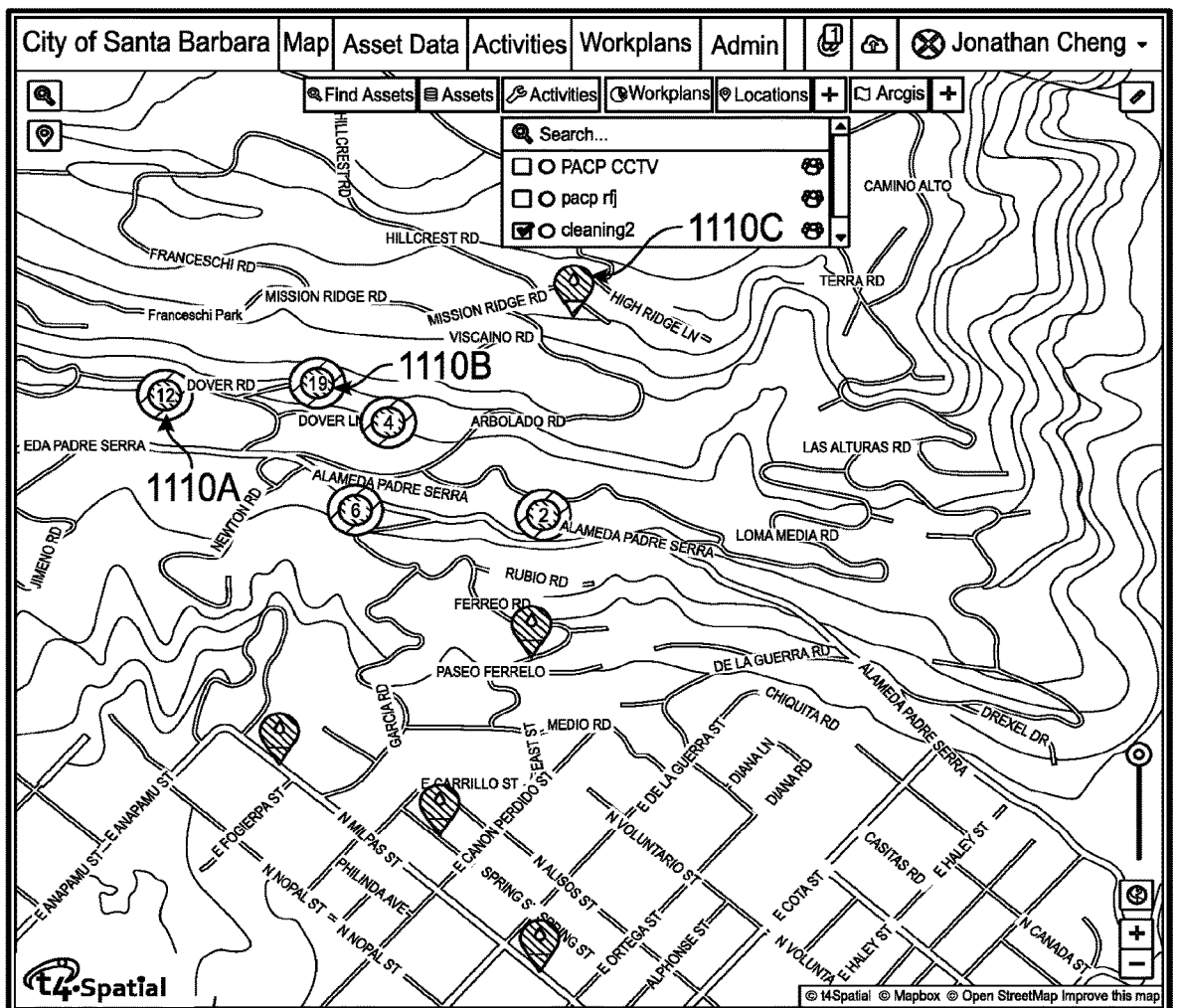
Figure 11B:
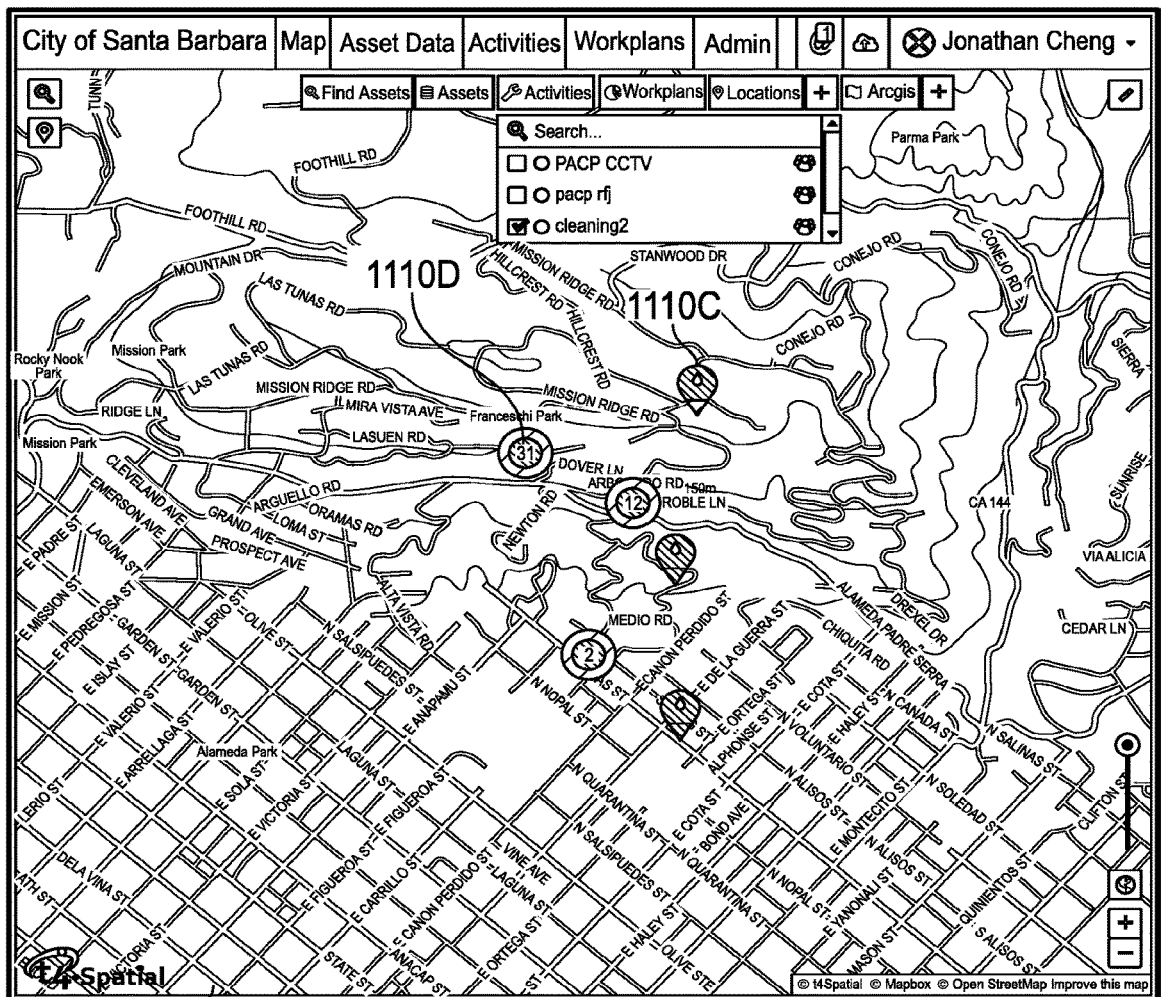

FIGS. 11A and 11B illustrate a webpage 1100 of user interface 210, which demonstrates clustering of data elements in virtual map frame 420, according to an embodiment. Specifically, as a user zooms out of the virtual map in virtual map frame 420, data elements depicted in virtual map frame 420 are clustered together and represented as a circle with the number of data elements, represented by the cluster, visually represented in the middle of the circle. In addition, each circle may have a radius that corresponds to the number of data elements represented in the cluster. For example, the radius of the circle representing each cluster may increase proportionally to the number of data elements represented by the cluster. Thus, a circle representing one hundred data elements would have a larger radius than a circle representing ten data elements.

While FIGS. 11A and 11B illustrate data elements representing activities, it should be understood that, additionally or alternatively, the illustrated clustering may be performed for other types of data elements depicted in virtual map frame 420, such as assets, workplans, events, etc. In addition, while each cluster is implemented as a circle with the number of data elements represented by the cluster visually provided in the middle of the circle and having a radius proportional to the number of data elements represented by the cluster, it should be understood that the clusters may be implemented in a different manner (e.g., by different shapes, without numbers, without proportional radii, etc.).

FIG. 11A depicts various clusters 1110A and 1110B, as well as a single data element 1110C. A cluster may be formed whenever two or more data elements are within a predetermined distance from each other in virtual map frame 420 (e.g., within a predetermined number of pixels from each other). Thus, clustering will depend on the level of zoom applied to the virtual map in virtual map frame 420. For instance, as a user zooms in, the virtual map scale will increase, resulting in data elements being positioned further apart in virtual map frame 420. As these data elements move beyond the predetermined distance from each other, they may uncluster into individual data elements, such as data element 1110C. Conversely, as a user zooms out, the virtual map scale will decrease, resulting in data elements being positioned closer together in virtual map frame 420. As these data elements move within a predetermined distance from one or more other data element(s), the data elements within the predetermined distance will cluster into clusters, such as clusters 1110A and 1110B.

FIG. 11B depicts webpage 1100 after a user has zoomed out. As illustrated, clusters 1110A and 1110B have combined into cluster 1110D, since clusters 1110A and 1110B would be within a predetermined distance from each other after the zoom-out operation. Individual data element 1110C remains unclustered in FIG. 11B, since, even after the zoom-out operation, data element 1110C remains more than the predetermined distance from any other data element and any of the clusters.

Figure 12A:
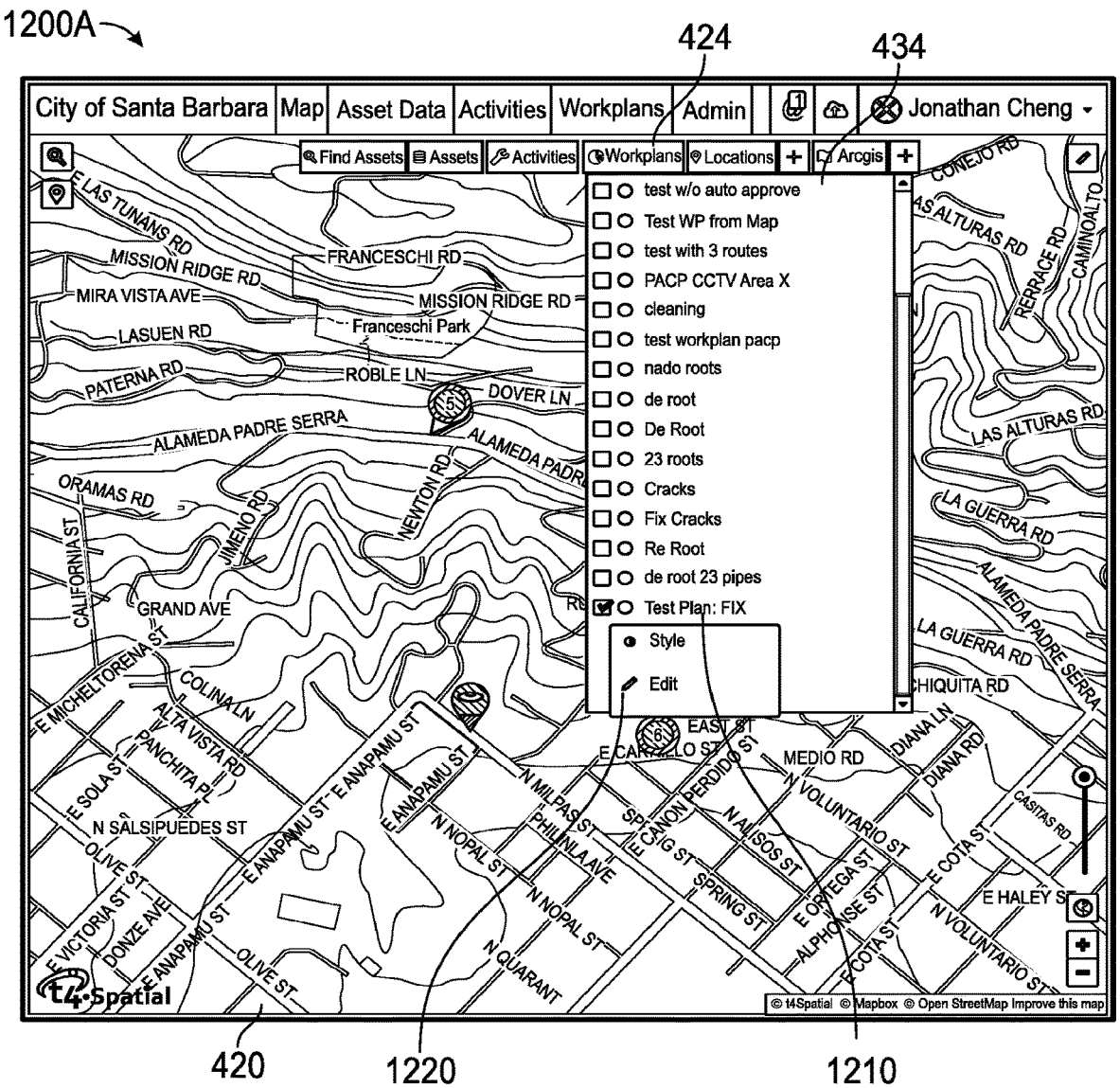

FIG. 12A illustrates a webpage 1200A of user interface 210, which demonstrates editing of a workplan via virtual map frame 420, according to an embodiment. A user may select a setting icon 1210 associated with a particular workplan selected from workplans list 434, which is overlaid on virtual map frame when a user selects workplans input 424. In response, views module 230 may overlay a settings menu 1220 over virtual map frame 420. Settings menu 1220 comprises one or more inputs for changing a style (e.g., color, line weight, line style, etc.) associated with the selected workplan, editing the selected workplan, and/or the like.

Figure 12B:
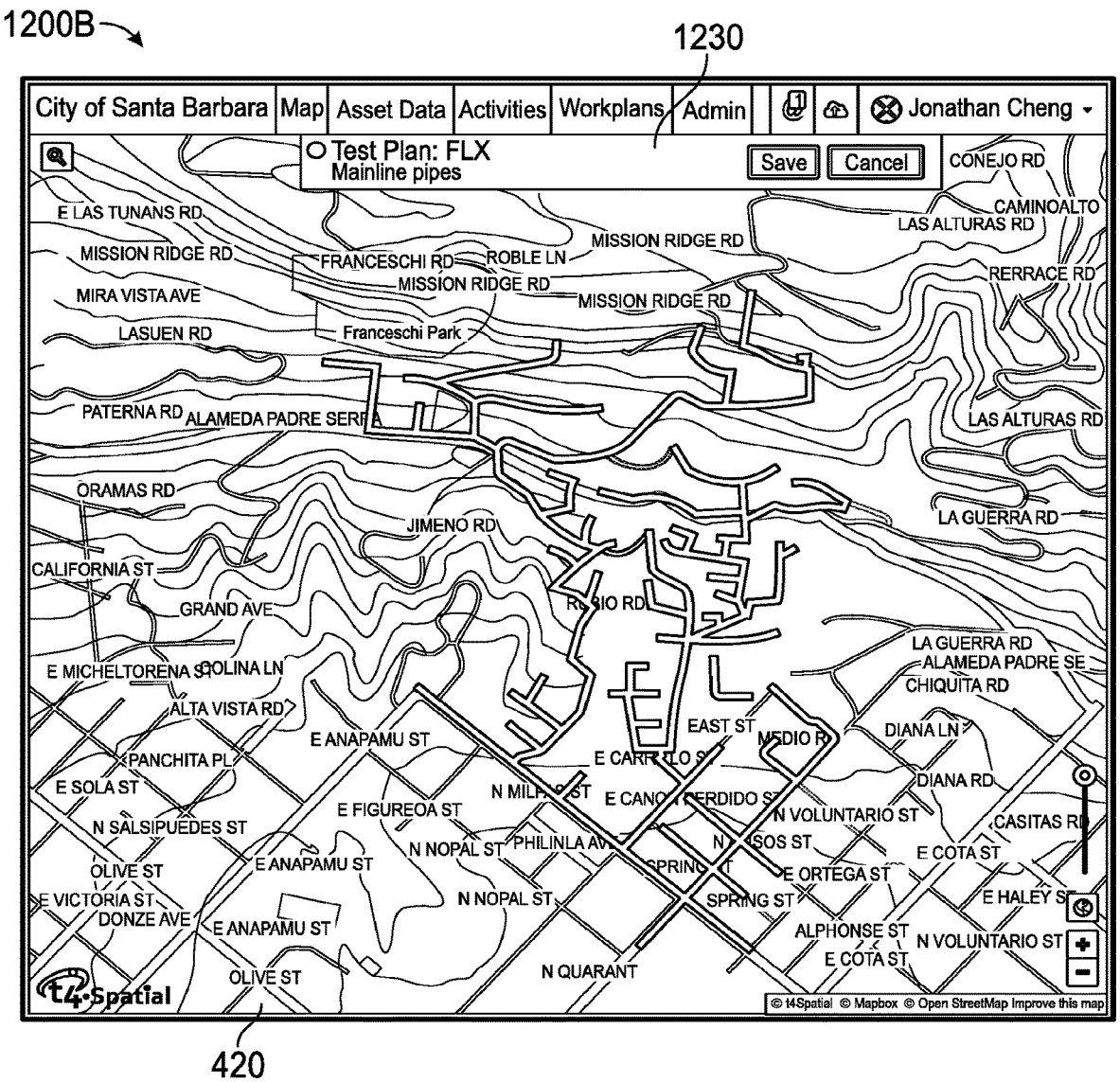

FIG. 12B illustrates a webpage 1200B of user interface 210, which is provided after a user has chosen to edit a workplan via an edit input in settings menu 1220 for that workplan in webpage 1200A, according to an embodiment. In an embodiment, assets associated with that workplan are visually distinguished (e.g., highlighted), as illustrated in FIG. 12B. In addition, assets of the same type(s) as the assets associated with that workplan may also be visually distinguished (e.g., highlighted), even if those assets are not associated with the workplan. The assets of the same type as those assets associated with the workplan, but which are not associated with the workplan, may be visually distinguished from the assets which are associated with the workplan. For example, the unassociated assets of the same type may be highlighted in a different color than the associated assets. In the example illustrated in FIG. 12B, pipes which are associated with the selected workplan are highlighted in a first color, whereas pipes which are not associated with the selected workplan are highlighted in a second color that is different than the first color.

Webpage 1200B in FIG. 12B also comprises a frame 1230 which provides information about the selected workplan (e.g., name, asset type, etc.), and one or more inputs for saving or canceling any changes to the workplan. A user may toggle individual assets, visually distinguished within virtual map frame 420, on or off to thereby add or remove them, respectively, from the workplan. For example, a user may click or touch an asset that is not currently within the workplan (e.g., highlighted in the second color) to add it to the workplan, in which case the selected asset will be associated with the workplan and visually distinguished in the same manner as the other assets associated with the workplan (e.g., highlighted in the first color). In addition, a user may click or touch an asset that is currently within the workplan (e.g., highlighted in the first color) to remove it from the workplan, in which case the selected asset will be unassociated with the workplan and visually distinguished in the same manner as the other assets that are not associated with the workplan (e.g., highlighted in the second color). When the user has finished adding or removing assets to or from the workplan, the user may select the save input in frame 1230 to thereby save the workplan with the user-specified assets. In this manner, a user may quickly and efficiently modify the set of infrastructure assets to be included in any given workplan.

In an embodiment, for one or more, including potentially all, of the lists illustrated and/or described herein (e.g., asset list, activity list, workplans list, etc.), the field in the list may be a user-specifiable setting. For example, each list may be associated with an input which allows a user to set the columns to be included within the list (e.g., for an asset list, the attributes of the asset to be shown in each row). When the user selects the input, views module 230 may overlay a frame for toggling each available column on or off. The user-specified columns may be carried over into any reports based on the list. Thus, for example, the columns specified for the activity list 1030 in webpage 1000A of FIG. 10A may be the same columns that are included in the activities report illustrated in webpage 1000C of FIG. 10C. In addition, the user-specified columns may be saved (e.g., by profile module 221), such that the user-specified columns persist across future sessions for a user unless and until they are modified by the user.

3.6.4. Risk Assessment

In an embodiment, platform 110 supports risk assessment for each infrastructure asset. For an infrastructure asset i, risk assessment may be calculated as a function of the likelihood that infrastructure asset i will fail and the consequence of such a failure. This may be represented, for example, by the equation $R_i = L_i \times C_i$, where R is a risk assessment value, $L_i$ is the likelihood of failure of infrastructure asset i, and $C_i$ is the consequence of failure of infrastructure asset i. However, it should be understood that, in other embodiments, other equations or variations of this equation (e.g., using weighting coefficients for $L_i$ and/or $C_i$) may be used. One notable feature of the example equation is that if the consequence of failure $C_i$ for the infrastructure asset i is very high (e.g., a severe oil spill, gas explosion), then the risk assessment value will be high even if the likelihood of failure $L_i$ is low (e.g., no more than minor faults noted in a recent inspection). Conversely, if the likelihood of failure $L_i$ of the infrastructure asset i is very high (e.g., rupture is imminent), then the risk assessment value will be high even if the consequence of failure $C_i$ is low (e.g., no more than minor potable water spillage).

The likelihood of failure $L_i$ for an infrastructure asset i may be calculated or otherwise determined based on an analysis of the infrastructure asset i. For instance, the likelihood of failure $L_i$ may be a function of rating(s) associated with the infrastructure asset i, the number or severity of fault(s) associated with the infrastructure asset i, condition(s) associated with the infrastructure asset i, and/or other attributes associated with the infrastructure asset i. As an example, as discussed elsewhere herein, each infrastructure asset may be associated with an overall rating. The likelihood of failure $L_i$ may be calculated based on this overall rating, such as a multiple of this overall rating, an inverse of this overall rating, etc. Alternatively, each infrastructure asset may be associated with a plurality of ratings (e.g., a structural rating, an operations and management rating, an overall rating, etc.), and the likelihood of failure $L_i$ may be a function (e.g., weighted average) of these plurality of ratings.

The consequence of failure $C_i$ for an infrastructure asset i may also be calculated or otherwise determined based on an analysis of the infrastructure asset i. For instance, the consequence of failure $C_i$ may be calculated based on the type of the infrastructure asset i, the size, diameter, or length of the infrastructure asset i, the location of the infrastructure asset i (e.g., whether in an urban or rural area, proximity to other infrastructure assets, the type and/or condition of proximate infrastructure assets and/or environmental features, etc.), and/or other attributes (e.g., flow metrics) of the infrastructure asset i. As an example, an oil pipeline may receive a higher consequence of failure $C_i$ than a potable water line, since a rupture in an oil pipeline may cause more severe environmental damage than a rupture to a potable water line. As another example, an oil pipeline near a water system (e.g., lake, river, etc.) may have a higher consequence of failure $C_i$ than an oil pipeline not near a water system. As yet another example, an oil pipeline that has a larger diameter or higher flow metrics may have a higher consequence of failure $C_i$ than an oil pipeline with a smaller diameter or lower flow metrics.

Risk assessment and/or events for an infrastructure asset may drive activities to be performed against infrastructure assets. For instance, the risk assessments for a group of infrastructure assets may be used to decide which activities to perform on which infrastructure assets and in which order or according to what priority. As an example, the risk assessments may be calculated, as described above, to determine a risk assessment value for each of a plurality of infrastructure assets of a given type (e.g., pipe segments, roads, bridges, gas lines, potable water lines, etc.). Those infrastructure assets having high risk assessment values (e.g., above a first, highest threshold) may be added to a workplan including an emergency or high-priority repair activity, for example, in the manner described elsewhere herein. Those infrastructure assets having medium risk assessment values (e.g., above a second threshold that is lower than the first) may be added to a workplan including a medium-priority repair or inspection activity. Those infrastructure assets having low risk assessment values (e.g., below the second threshold) may not be added to any workplan or a workplan with a low-priority repair or inspection activity. It should be understood that this is simply one example to illustrate the general principle that workplans and activities for infrastructure assets may be prioritized or ordered (e.g., order of repair) based on the calculated risk assessment values.

3.6.5. Activities

In an embodiment, each activity represents an action to be performed against at least one infrastructure asset. As discussed elsewhere herein, different types of infrastructure assets may be assigned or otherwise associated with different types of activities. For example, pipeline infrastructure assets may be associable with one set of activity types, whereas bridge infrastructure assets may be associable with a different set of activity types. However, it should be understood that these sets of activity types may overlap. For instance, both pipeline and bridge infrastructure assets may both be associable with an inspection activity, a repair activity, etc.

Each activity may be represented and stored by application 200 (e.g., in database(s) 114) as an activity data structure comprising one or more fields representing attributes of the activity. For instance, these fields may comprise an activity description, equipment to be used for the activity, personnel to perform the activity, an activity reference, an activity priority, an activity date or data range, a cost, a status, an activity checklist (e.g., tasks to be performed to complete the activity), an identification or specification of a follow-up activity, an identifier of a National Association of Sewer Service Companies (NASSCO) inspection type (e.g., Pipe Assessment Certification Program (PACP), Manhole Assessment Certification Program (MACP), Lateral Assessment Certification Program (LACP)) or other industry-standard activity type, etc. The fields may differ and/or overlap for different types of activities. For example, a data structure for an inspection activity may comprise different fields than a data structure for a repair activity.

In an embodiment, application 200 may provide an asset-lookup tool for identifying an infrastructure asset to which an unassociated activity should be associated. For example, an inspection video or other medium may be received (e.g., via client application 132) with insufficient data to uniquely match a particular infrastructure asset (e.g., no asset identifier or an incomplete asset identifier). In this case, the asset-lookup tool (e.g., a function of integration module 223 and/or assets module 240), may attempt to find a closest match to an infrastructure asset using information associated with the medium. For instance, if the medium is associated with a geolocation (e.g., GPS coordinates, a street address, etc.), the asset-lookup tool may determine an infrastructure asset with an associated geolocation that matches the geolocation associated with the medium or which is closest to the geolocation associated with the medium. If the medium is associated with a particular asset type (e.g., a pipe inspection would be associated with a pipe), the asset-lookup may only consider infrastructure assets of that particular asset type. Additionally or alternatively, if the medium is associated with an asset identifier that does not match the asset identifier of any infrastructure asset within application 200, the asset-lookup tool may identify an asset identifier within application 200 that is closest to the asset identifier associated with the medium (e.g., to detect transposed digits and/or other typographical errors that may be produced by manually-input data, e.g., the so-called "fat fingers" problem). It should be understood that one or more of these techniques may be combined. For example, the asset-lookup tool may identify the asset type, asset identifier, and/or geolocation associated with the received medium, and identify an infrastructure asset that has the identified asset type, is located within a certain radius and/or is closest to the identified geolocation, and/or most closely matches the identified asset identifier.

If no matching infrastructure asset can be identified, the medium may be flagged for manual assignment to an infrastructure asset (e.g., by an operator or other user). For example, an administrator interface (e.g., provided by administration module 220), may comprise an input that, when selected by a user, directs the user to a user interface comprising a list of all activities that have not been assigned to a particular infrastructure asset. This user interface may comprise one or more inputs for viewing details about each activity, searching the assets in the asset catalog based on known information (e.g., based on one or more attributes or properties known about the asset, such as a diameter, length, material, etc.; a street name which is known to represent a location of the asset; a partial identifier for the asset; and/or the like), and assign a found asset to each activity. The searching function may be similar or identical to the searching function with respect to the filter input(s) 610 and/or 615, described with respect to webpage 600 and/or 1000. In this manner, the asset-lookup tool performs quality control to ensure that activities and infrastructure assets are properly associated.

In an embodiment, a client application 132 may be provided on a mobile user system 130 that enables a worker in the field to interact with application 200. Client application 132 may be a browser application, which requests and receives webpages of user interface 210 from server application 112. Alternatively, client application 132 may a thicker application that generates and renders its own user interfaces 210 on a display of the mobile user system 130, executes one or more modules or portions of the modules in application 200, and communicates with server application 112 in the background.

A worker in the field may utilize client application 132 while preparing for and/or performing the activity associated with a particular infrastructure asset. For example, client application 132 may access the data structure for a given activity and provide requirements of the activity to the worker in user interface 210 (e.g., equipment requirements while the worker is preparing for the activity, a checklist of the necessary steps for completing the activity while the worker is performing the activity, etc.).

As another example, client application 132 may route workers between different infrastructure assets. Specifically, application 200 may comprise or be interfaced with a navigational module or application which provides navigational instructions (e.g., via user interface 210) to guide the user to each of a plurality of infrastructure assets with which an activity is associated. For example, if a worker is planning to perform an activity or a plurality of activities on a plurality of infrastructure assets, the worker may interact with user interface 210 to identify the activities and/or infrastructure assets. In addition, the worker may specify the order in which the activities are to be performed and/or the infrastructure assets are to be visited during. Alternatively, application 200 may automatically choose the activities to be performed by the worker that day, for example, based on the date(s) assigned to each activity, the personnel assigned to each activity, the equipment assigned to each activity, the priority of the activity, the risk assessment value determined for the infrastructure asset associated with the activity, the relative locations of the infrastructure assets associated with the activities, etc. In this case, the navigational module may automatically determine the order in which the activities are to be performed and/or the infrastructure assets are to be visited by the worker. In doing so, the navigational module may calculate the most efficient order for the activities to be performed and/or infrastructure assets to be visited based on, for example, the most efficient route (e.g., least travel distance, most fuel-efficient travel distance, least travel time, e.g., using traffic data, fewest left turns, etc.), the priorities associated with the activities, the risk assessment values determined for the infrastructure assets associated with the activities, etc. Thus, client application 132 may efficiently guide the user from infrastructure asset to infrastructure asset, based on the chosen activities and in the determined order, using visual and/or audio cues. It should be understood that client application 132 may use a GPS receiver integral or interfaced with the mobile user system 130 to determine the worker's current location during navigation.

In an embodiment, client application 132 may similarly identify and/or guide a worker in the field to nearby infrastructure assets, for example, using a current GPS location of the worker's mobile user system 130 (e.g., within a user-defined or system-defined radius of the current GPS location). As an example, user interface 210 may display a virtual map on the worker's mobile user system 130 with visual representations of infrastructure assets overlaid on the virtual map and with the virtual map centered (e.g., automatically and/or in response to a user selecting current location input 405) on the current location of mobile user system 130 (e.g., as determined by a GPS receiver in mobile user system 130). In this manner, the worker can visualize nearby infrastructure assets (e.g., infrastructure assets within a predefined or user-specified radius of the worker's current location). Alternatively, user interface 210 may display a list on the worker's mobile user system 130 that identifies each nearby infrastructure asset. The worker may also select one or more of the nearby infrastructure assets, and client application 132 may provide the user with asset details for the selected infrastructure asset(s) and/or guide the user to the selected infrastructure asset(s), in the same or similar manner as discussed above. Additionally, user interface 210 may provide augmented reality views to a worker. For example, a camera integral to or interfaced with the worker's mobile user system 130 may capture a current through-image of the worker's surroundings (e.g., by the worker holding the mobile user system 130 up to capture a current through-image of his or her surroundings), user interface 210 may provide the current through-image on the display along with representations of nearby infrastructure assets (e.g., infrastructure assets within 10 feet, 50 feet, etc.) overlaid on the current through image at the geolocations associated with those infrastructure assets.

In addition, the worker may collect and/or input data regarding the infrastructure asset using client application 132 while performing the activity. For example, the worker may capture or otherwise acquire a photograph, a video (e.g., an inspection video using a CCTV camera), and/or other types of media, using client application 132 (e.g., via user interface 210) or another module or feature of the mobile user system 130 (e.g., using a camera integral to or interfaced with the mobile user system 130, transferring captured media to the mobile user system 130 from another system, etc.). The worker may then utilize user interface 210 to upload the acquired media to server application 112, which may store the uploaded media in association with the particular activity and/or infrastructure asset. Similarly, the worker may utilize user interface 210 to upload other data (e.g., data manually input by the worker, data obtained automatically or manually from one or more sensors outputting data related to a visited infrastructure asset, etc.) to server application 112, which may store the data in association with the particular activity and/or infrastructure asset.

Furthermore, user interface 210 may also allow the worker to attach a follow-up workplan or activity to the infrastructure asset and/or application 200 (e.g., workplans module 260 and/or activities module 250) may automatically attach a follow-up workplan or activity. Additionally, as discussed elsewhere herein, the worker may add notes to an activity. In some cases, these notes may embody observations about the infrastructure asset, and may automatically or manually drive additional activities (e.g., follow-up activities). Thus, an activity for an infrastructure asset may drive remediation, assessment, recommendations, and/or repair against an infrastructure asset.

In an embodiment, activities module 250 and/or workplans module 260 may interface with a third-party computerized maintenance management system (CMMS) via API 270 and/or an API of the CMMS. The CMMS may manage maintenance operations for the organization associated with a given account. Thus, maintenance-related activity and/or workplan data may be automatically, semi-automatically (e.g., in response to a user confirmation), and/or manually (e.g., in response to a user operation) fed into an existing CMMS for an organization, and/or maintenance-related activity data and/or workplan data may be automatically, semi-automatically, and/or manually fed into activities module 250 and/or workplans module 260. Alternatively, application 200 may itself act as a CMMS for the organization.

3.6.6. Events

In an embodiment, an event represents an unplanned occurrence to an infrastructure asset, such as a sensor reading above a threshold (e.g., a seismic sensor indicating an earthquake), an overflow (e.g., sanitary sewer overflow (SSO)), valve station failure, mainline pipe breakage, pump and booster systems failure, etc. Some types of events (e.g., an SSO) must be recorded by law. Application 200 may comprise one or more modules, such as events module 255, capable of detecting an event that affects one or more infrastructure assets. For example, events module 255 may receive event data representing the event via user input through user interface 210. Alternatively or additionally, events module 255 may automatically detect an event to an infrastructure asset based on sensor readings received for that infrastructure asset (e.g., sensor readings from a smart manhole cover, for example, which measures the distance of sewage water level from the bottom of the manhole cover). As an example, if application 200 receives a sensor output that is above or below (depending on what the sensor output represents) a predefined threshold, events module 255 may determine that a particular event related to that sensor output has been detected (e.g., if the output of a seismic sensor attached to a road or bridge is above a predefined threshold representing a severe earthquake). Application 200 may also comprise one or more modules, such as events module 255, that, when an event is detected, generate a data structure representing the event, and associate the event data structure with the infrastructure asset(s) to which the event pertains. Events module 255 may also warn or otherwise notify one or more users and/or automatically generate an activity (e.g., an inspection) for the infrastructure asset(s).

Events (e.g., sensor readings) that are input (e.g., imported as an ArcGIS layer) into application 200 may be associated with specific infrastructure assets. These sensor readings may then be provided as attributes of the associated infrastructure asset wherever details of the infrastructure asset are displayed (e.g., in asset detail frame 440, in webpage 500 depicted in FIGS. 5A and 5B, etc.).

In addition, user interface 210 of application 200 may provide one or more inputs, similar to those described elsewhere herein for assets, activities, and workplans, to select a set of one or more events as a layer to be overlaid on the virtual map in virtual map frame 420. For example, ArcGIS inputs 426A and 426B are one manner in which events, that are represented in an ArcGIS layer, may be overlaid in virtual map frame 420. However, it should be understood that ArcGIS layers need not comprise only data representing events, but may comprise any type of data, and particularly data corresponding to geolocation(s) which can be mapped onto the virtual map in virtual map frame 420.

3.6.7. Remediation/Assessment/Repair

Remediation, assessment, and/or repair refer to the completion of an activity generated for an infrastructure asset. However, while most activities will represent either a type of remediation, assessment (e.g., inspection), or repair, it should be understood that activities that do not represent a remediation, assessment, or repair are still within the scope of this application.

As discussed above, the workplans and activities generated by application 200 drive the remediation, assessment, and repair of infrastructure assets. For example, the workplans and/or activities, generated by application 200, may be transmitted by application 200 over network(s) 120 to one or more CMMS's (e.g., Oracle™, IBM™, SAP™ Cityworks™, Infor™, Lucity™, Accela™, etc.), which may manage workers in the field. Alternatively, application 200 may itself be used as a CMMS to manage the workers. In this case, application 200 may be used to analyze, prioritize, and manage the work flows for an organization. For example, as discussed elsewhere herein, user interface 210 of application 200 may comprise user interfaces (e.g., webpages) that may be displayed on user system(s) 130 to guide employees and contractors of the organization through the work flows, including the workplans and activities (e.g., providing activity checklists, prioritizing activities and workplans, assigning activities to workers in an efficient manner, efficiently routing workers between activities and infrastructure assets, etc.).

In addition, application 200 may receive results (e.g., inspection results) of activities and workplans, either directly or via a CMMS. Thus, users may evaluate the inspection results via user interface 210 of application 200, for example, by viewing a detail of an activity that has been performed (e.g., webpage 900 in FIGS. 9A-9E).

Remediation, assessment, recommendations, and/or repair for an infrastructure asset may drive additional activities (e.g., follow-up activities) and/or workplans for the infrastructure asset for prevention and mitigation.

3.6.8. Prevention/Mitigation

By enabling users to visualize the ratings and other attributes of infrastructure assets, filter infrastructure assets based on their ratings and other attributes, generate and/or drive workplans and activities according to priorities based on those ratings and other attributes (e.g., based on risk assessment values), application 200 enables the prevention and mitigation of detrimental events to the managed infrastructure assets (e.g., failures of an infrastructure asset). For example, rather than waiting for such an event to occur and then responding reactively, a user can interact with user interface 210 to identify those infrastructure assets with a high risk assessment value (e.g., a high likelihood of failure and/or a high consequence of failure) and proactively address that risk by generating workplans and/or activities for those high-risk infrastructure assets. Such proactive management of infrastructure assets, along with the unified, cloud-based SaaS described in certain embodiments herein, is highly likely to reduce capital and operating expenditures for an organization over time.

3.6.9. Documentation

Platform 110 documents the entire operations and management cycle for infrastructure assets. For instance, the attributes (e.g., sensor readings) and assessments (e.g., ratings) of infrastructure assets and all the events, activities, follow-up activities, and workplans involving an infrastructure asset are recorded over time (e.g., in database(s) 114 by application 200). Thus, the history of each infrastructure asset—including, for example, the attributes, ratings, activities, and events for the infrastructure asset at any given time or over a period of time—may be viewed, queried, analyzed, etc. This level of documentation can prove an organization's regulatory compliance, and may drive auditing and performance measurement.

3.6.10. Auditing/Performance Measurement

Advantageously, auditing of a municipality's infrastructure(s) may be facilitated by the extensive documentation performed by platform 110. Such auditing may be required by federal agencies (e.g., the Environmental Protection Agency (EPA)) and state agencies (e.g., California State Water Resources Control Board), which, for example, may require best practices for any entity that owns wastewater assets. Such auditing may require modeling (e.g., hydraulic flow modeling) of various infrastructure assets, including combinations of different infrastructure asset types. Conventionally, data related to different infrastructures managed by municipalities are silo'ed using different protocols, file structures, etc. This makes it very difficult to perform modeling or other studies across multiple infrastructures. Advantageously, the disclosed system allows all of the data for different infrastructures to be integrated into a unified interface, facilitating modeling and other studies across multiple infrastructures. Furthermore, this modeling may take into account attributes (e.g., sensor readings, conditions, inspections, etc.) of infrastructure assets across different infrastructures and across time.

In an embodiment, analytics may be performed for any combination of activity or activities and type(s) of infrastructure asset to provide one or more performance measurements for the managed infrastructure(s). For example, analytics may be performed for inspections of pipelines, cleaning of pipelines, repair of pipelines, inspections of manholes, cleaning of manholes, repair of manholes, inspections of roads and bridges, cleaning of roads and bridges, repair of roads and bridges, etc.

Auditing and performance measurement may drive risk assessment.

3.6.11. Continual Geospatial Adjustment

As discussed elsewhere herein, each infrastructure asset represented by application 200 (e.g., by assets module 240) may be represented in a data structure comprising fields, including a location (e.g., latitude, longitude, and elevation). Initially, the location for any given infrastructure asset may be inaccurate. This may be due to the various sources of error discussed elsewhere herein or to other potential sources of error.

As data for various infrastructure assets is received by application 200, this data may comprise updated location information. For example, a worker performing an activity at an infrastructure asset may acquire a location reading (e.g., GPS reading) of the infrastructure asset's location. For example, the worker may utilize client application 132, executing on a mobile user system 130, while performing the activity. When the worker is near (e.g., standing over) the particular infrastructure asset, client application 132 may automatically (without user intervention), semi-automatically (in response to a user operation), or manually (in response to a user operation) obtain GPS coordinates from a GPS receiver integral or interface with the mobile user system 130. When client application 132 uploads the activity data for the performed activity to server application 112, the activity data may include the obtained GPS coordinates. Server application 112 may receive these GPS coordinates and update the location field(s) stored in the data structure for the infrastructure asset with the received GPS coordinates (e.g., assuming that the received GPS coordinates are different than the previously-stored GPS coordinates for the data structure).

As an example, assets module 240 may receive the new GPS coordinates obtained during the activity along with an asset identifier for the infrastructure asset on which the activity was performed, retrieve a data structure for the infrastructure asset based on the received asset identifier, compare received GPS coordinates to the GPS coordinates stored in the location field(s) (e.g., latitude, longitude, and elevation fields) of the retrieved data structure, if the received GPS coordinates are different than the stored GPS coordinates, store the received GPS coordinates in the location field(s), and, if the received GPS coordinates are the same as the stored GPS coordinates, do not store the received GPS coordinates in the location field(s) (or store the received GPS coordinates in the location field(s) anyway). It should be understood that, when comparing the received GPS coordinates to the stored GPS coordinates, assets module 240 may perform a "sanity check" to prevent against additional error being injected into the infrastructure asset's location. For instance, if the distance between the received GPS coordinates and stored GPS coordinates is greater than a predefined threshold, asset module 240 may flag the update for user intervention or perform some other action that does not involve automatically updating the GPS coordinates.

In this manner, the location field(s) for each infrastructure asset are continually updated, for example, each time an activity is performed on the infrastructure asset. As a result, the locations for each infrastructure asset become more and more accurate over time, enabling better visualization and management of infrastructure assets as a whole.

3.6.12. Extensibility

In an embodiment, types of asset infrastructures can be easily added to or removed from application 200. For instance, assets module 240 may comprise discrete models for each type of infrastructure asset. These asset models may be removed and/or new asset models added to assets module 240 via user interface 210 and/or API 270 of application 200. Each model of an asset type may define the fields (e.g., representing attributes) for infrastructure assets of that asset type, activities that may be performed for that asset type, and/or events that may occur for that asset type. In addition, each asset model may define a visual representation for the asset type (e.g., dot, line, etc.). Furthermore, each asset model may define a method of determining a location of each infrastructure asset of that asset type (e.g., using latitude and longitude fields stored for each infrastructure asset, using start and end latitude and longitude fields stored for other infrastructure assets that brace each infrastructure asset, using an algorithm to calculate the location of the infrastructure asset, etc.), for example, for the purposes of positioning the visual representation on a virtual map and/or conveying the location to a user and/or worker in the field. It should be understood that each of these asset models for the different asset types may be derived from a common class.

In an embodiment, types of activities can also be easily added to or removed from application 200. For instance, activities module 250 may comprise discrete models for each type of activity. These activity models may be removed and/or new activities models added to activities module 250 via user interface 210 and/or API 270 of application 200. Each model of an activity type may define the fields for that activity type, as well as the asset type(s) to which the activity may be associated. It should be understood that each of these activity models for the different activity types may be derived from a common class.

In an embodiment, types of events can also be easily added to or removed from application 200. For instance, events module 255 may comprise discrete models for each type of event. These event models may be removed and/or new event models added to events module 255 via user interface 210 and/or API 270 of application 200. Each model of an event type may define the fields for that event type, and, if appropriate, the asset type(s) to which the event may be associated. It should be understood that each of these event models for the different event types may be derived from a common class.

In an embodiment, one or more asset types (e.g., models representing infrastructure assets of one or more types), activities (e.g., models representing activities for the infrastructure assets of the one or more types), and/or events (e.g., models representing events) may be incorporated into application (e.g., assets module 240, activities module 250, and events module 255, respectively) as packages for different infrastructure domains. For example, a package for a sewer domain may comprise a model for manholes, a model for pipes, models for each of the activities that may be associated with manholes (e.g., visual inspection, MACP inspection, cleaning), models for each of the activities that may be associated with pipes (e.g., visual inspection, video inspection, PACP inspection, acoustic inspection, flushing, jetting, cleaning, root removal, hydraulic flow monitoring, spot repair, grouting, CIPP lining, replacement), and models for events that may affect sewer assets (e.g., SSOs). As another example, a package for a street domain may comprise a model for roads, a model for bridges, a model for traffic lights, a model for street signs, a model for sidewalks, and the like, as well as models for each of the activities that may be associated with each of these asset types (e.g., cleaning, repair, inspection, etc.) and each of the events that may be associated with each of these asset types (e.g., seismographic readings). Such packages may be added, edited, and/or removed from application 200 using one or more inputs of user interface 210 and/or API 270.

In an embodiment, the asset models, activity models, and/or packages of asset and activity models may be added or removed at an account level, such that multiple accounts may have different sets of infrastructure domains. Thus, a client of an operator of platform 110 may select only the set of infrastructure domains (e.g., represented by a package of asset and activity models) which are relevant to its particular needs.

In an embodiment, platform 110 provides the enriched GIS (e.g., continually updating geolocations to more closely match the ground truth for any type of asset), the work flow (e.g., creation, approval, completion, etc. of workplans for any type of activity and/or asset), the analysis (e.g., ratings, risk assessment, etc.), and the cloud (e.g., SaaS) functions disclosed herein. These functions may remain the same regardless of how the platform is used, and across distinct platforms. Advantageously, one or more infrastructure domains may be plugged into the platform, to accommodate the specific needs of a municipality (e.g., represented as an account with the platform), set of municipalities, or other users. Examples of infrastructure domains include, without limitation, waste water, potable water, natural gas, oil and gas, electrical distribution, sidewalks, street lamps, trees and planters, roads, bridges, canals, buildings, property boundaries, easements, environmental attributes, etc. Each infrastructure domain may comprise a set of assets, a set of operations and management activities, and a set of standards and compliance parameters. Each of these sets of assets, operations and management activities, and standards and compliance parameters, representing a single infrastructure domain, may be implemented as one or more plug-in modules (e.g., individual modules for each, or a single combined module) which may imported into an application 200 executing on a platform 110. Thus, a municipality which needs waste water, potable water, and road infrastructures may simply import the plug-in module(s) for those infrastructure domains, without having to manage any of the other infrastructure domains.

In embodiments, application 200 may interface and communicate, either uni-directionally or bi-directionally, with external system(s) 140 via API 270 or one or more APIs provided by external system(s) 140. External system(s) 140 may comprise third-party CMMS, third-party asset management systems, GIS systems, and the like. In this manner, application 200 may provide extensibility to external system(s) 140 and/or itself be extended by external system(s) 140.

The above description of the disclosed embodiments is provided to enable any person skilled in the art to make or use them. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present application. It is further understood that the scope of the present application fully encompasses other embodiments that may become obvious to those skilled in the art and that the scope of the present invention is accordingly not limited.

What is claimed is:

1. A system comprising:
   at least one hardware processor;
   a memory; and
   one or more software modules that, when executed by the at least one hardware processor,
      import one or more infrastructure domains, wherein each of the one or more infrastructure domains comprises representations of one or more infrastructure asset types that are available in the infrastructure domain, one or more activity types related to the one or more infrastructure asset types, and standards and compliance parameters related to the one or more infrastructure asset types,
      import a plurality of representations of infrastructure assets of one or more of the one or more asset types, wherein each of the plurality of representations of infrastructure assets comprises location information including at least Global Positioning System (GPS) coordinates, the location information representing a geolocation of the represented infrastructure asset, and,
      for each of one or more of the plurality of representations of infrastructure assets:
         calculate a likelihood of failure based on at least one rating generated for the representation of the infrastructure asset;
         determine a consequence of failure for an infrastructure asset represented by the representation of the infrastructure asset; and
         calculate a risk assessment score based on the likelihood of failure and the consequence of failure; and
         wherein at least one of the plurality of representations of infrastructure assets comprises a representation of a first manhole, a representation of a second manhole, and a representation of a pipe between the first manhole and the second manhole,
      parse inspection data associated with the representation of the pipe, wherein the inspection data comprises one or more observations, wherein each of the one or more observations comprises metadata including a description and a distance between the location where the observed description was made and the first manhole and,
      generate a user interface comprising
         a visual representation of the pipe extending between a visual representation of the first manhole and a visual representation of the second manhole, and,
         for each of the one or more observations, the description in the observation associated with a position on the visual representation of the pipe, wherein the position on the visual representation of the pipe is at a distance from the visual representation of the first manhole, and wherein the distance from the visual representation of the first manhole is proportional to the distance between the location where the observed description was made and the first manhole,
      continually receive updated location information for one or more infrastructure assets and, based on the received updated location information, update the location information of one or more of the plurality of representations of infrastructure assets, corresponding to the one or more infrastructure assets,
      generate the at least one rating for each of the plurality of representations of infrastructure assets based on the standards and compliance parameters,
      generate a virtual map,
      receive a selection of one or more of the one or more asset types,
      overlay a visual representation of each of one or more of the plurality of representations of infrastructure assets of the selected one or more asset types on the virtual map at a location corresponding to the location information of that representation of an infrastructure asset, wherein overlaying the visual representation comprises
         overlaying at least a first visual representation of a first one of the plurality of representations of infrastructure assets of a first asset type in a first color, and
         overlaying at least a second visual representation of a second one of the plurality of representations of infrastructure assets of a second asset type, that is different than the first asset type, in a second color that is different than the first color,
      import one or more geographic information system (GIS) layers, wherein each of the one or more GIS layers comprises GIS data associated with location information, wherein the GIS data comprise a plurality of representations of geographical events, and wherein the geographical events comprise a past sanitary sewer overflow (SSO) event,
      receive a selection of one or more of the imported one or more GIS layers,
      overlay one or more visual representations of the GIS data, including a visual representation of the past SSO event, from the selected one or more GIS layers, on the virtual map at a location corresponding to the location information associated with that GIS data, such that the visual representation of the past SSO event is simultaneously visible with the first visual representation of the first one of the plurality of representations of infrastructure assets of the first type and the second visual representation of the second one of the plurality of representations of infrastructure assets of the second type,
      generate one or more workplans comprising one or more activities, of the one or more activity types, to be performed on one or more infrastructure assets,
      receive a save operation from a user to save a view of the virtual map, in response to the save operation, save a view of the virtual map, wherein the view comprises a position on the virtual map, an identification of each of the selected one or more asset types, an identification of each of the selected one or more GIS layers, and a zoom level of the virtual map, and, subsequently, receive a retrieve operation from a user to retrieve the saved view, and, in response to the retrieve operation, retrieve and display the saved view of the virtual map according to the position, at the zoom level, and including a visual representation of each of one or more of the plurality of infrastructure assets of the selected one or more asset types and a visual representation of each of the GIS data in the selected one or more GIS layers.

2. The system of claim 1, wherein importing the plurality of representations of infrastructure assets comprises:

receiving a source identifier, identifying a source, from a user;

receiving a plurality of source representations of infrastructure assets from the source;

normalizing the plurality of source representations of infrastructure assets into the plurality of representations of infrastructure assets stored in the memory.

3. The system of claim 2, wherein the source identifier is a uniform resource identifier (URI), wherein the source is a web feature service (WFS), and wherein the plurality of source representations of infrastructure assets are received from the WFS over at least one network.

4. The system of claim 1, wherein the one or more software modules:

receive a selection of one or more of the visual representations of representations of infrastructure assets from a user;

receive a workplan operation from the user, wherein the workplan operation comprises one or more inputs for generating a workplan for the representations of infrastructure assets associated with the selected one or more visual representations; and, in response to the workplan operation, generate the workplan.

5. The system of claim 4, wherein receiving a selection of one or more of the visual representations comprises receiving three or more line-drawing inputs from the user, wherein the three or more line-drawing inputs define a polygon on the virtual map, and wherein the selected one or more visual representations consist of all visual representations located within the polygon.

6. The system of claim 1, wherein the one or more software modules further:

receive a selection operation on one of the visual representations of one of the one or more representations of infrastructure assets; and, in response to the selection operation, overlay data associated with that one representation of an infrastructure asset.

7. The system of claim 6, wherein the overlaid data associated with the one representation of an infrastructure asset comprise:

one or more attributes of the represented infrastructure asset;

the location information of the representation of the infrastructure asset;

a street view of a location represented in the location information of the representation of the infrastructure asset; and a list of activities associated with the representation of the infrastructure asset.

8. The system of claim 1, wherein the visual representations of each of one or more of the plurality of representations of infrastructure assets comprise a plurality of visual representations, and wherein the one or more software modules:

receive a zoom operation from a user on the virtual map;

when the zoom operation comprises zooming out on the virtual map and two or more of the plurality of visual representations of infrastructure assets would be within a predetermined distance from each other after the zoom operation, cluster the two or more visual representations of infrastructure assets by replacing the two or more visual representations of infrastructure assets with a visual representation of a cluster; and, when the zoom operation comprises zooming in on the virtual map and two or more of the plurality of visual representations of infrastructure assets within a cluster would be beyond a predetermined distance from each other after the zoom operation, uncluster the two or more visual representations of infrastructure assets by replacing a visual representation of a cluster with the two or more visual representations.

9. The system of claim 8, wherein each visual representation of a cluster comprises a circle with a radius proportional to a number of infrastructure assets represented by the cluster, and an indication within the circle of the number of infrastructure assets represented by the cluster.

10. The system of claim 1, wherein the one or more software modules further overlay a visual representation of each of one or more activities, of the one or more activity types, associated with one of the plurality of representations of infrastructure assets on the virtual map at a location corresponding to the location information of that representation of an infrastructure asset.

11. The system of claim 1, wherein generating one or more workplans comprises generating a first workplan by:

receiving one or more filter criteria from a user;

matching a plurality of representations of infrastructure assets or activities based on the filter criteria;

generating a first user interface comprising the matched plurality of representations of infrastructure assets or activities in a first order;

receiving one or more inputs from a user that indicate a change to the first order;

in response to the received one or more inputs, reordering the matched plurality of representations of infrastructure assets or activities into a second order;

receiving a save operation from the user;

in response to the save operation, saving the matched plurality of representations of infrastructure assets or activities in the second order as a saved filter; and, subsequent to saving the matched plurality of representations of infrastructure assets or activities in the second order as the saved filter, receiving a retrieve operation from a user for retrieving the saved filter, and, in response to the retrieve operation, generating a second user interface comprising the matched plurality of representations of infrastructure assets or activities in the second order.

12. The system of claim 11, wherein the one or more software modules further:

receive a workplan operation from a user via the second user interface, wherein the workplan operation comprises one or more inputs for generating a workplan for the plurality of representations of infrastructure assets or activities in the saved filter; and, in response to the workplan operation, generate the workplan, for the plurality of representations of infrastructure assets or activities in the saved filter, wherein the workplan comprises a plurality of representations of activities corresponding to the plurality of representations of infrastructure assets or activities in the saved filter and ordered according to the second order.

13. The system of claim 1, wherein the one or more software modules further:

receive one or more modifications to one or more of the plurality of representations of infrastructure assets or to one or more representations of activities associated with one or more of the plurality of representations of infrastructure assets, over at least one network, according to representational state transfer (REST); and, in response to receiving the one or more modifications, modifying the one or more representations of infrastructure assets or activities.

14. The system of claim 1, wherein the one or more software modules further:

generate one or more user interfaces comprising one or more inputs for receiving a message, to be associated with one of the plurality of representations of infrastructure assets or one of the one or more workplans, from a user;

in response to receiving the message from the user, associating the message with the one representation of an infrastructure asset or the one workplan.

15. The system of claim 1, wherein the one or more software modules:

receive a representation of an activity representing an activity to be performed on an infrastructure asset;

when the representation of the activity comprises an asset identifier that matches an asset identifier in one of the plurality of representations of infrastructure assets, store the representation of the activity in association with that one representation of an infrastructure asset;

when the representation of the activity does not comprise an asset identifier that matches an asset identifier in one of the plurality of representations of infrastructure assets, store the representation of the activity as an unassociated activity; and generate a user interface comprising a list of all unassociated activities, wherein the user interface provides one or more inputs for searching the plurality of representations of infrastructure assets based on one or more of an attribute and a location of an infrastructure asset, and assigning one of the plurality of representations of infrastructure assets matched in the search to one or more of the unassociated activities.

16. The system of claim 1, wherein the one or more software modules:

generate a user interface comprising one or more inputs for specifying a recommended activity to be performed on an infrastructure asset represented in the plurality of representations of infrastructure assets;

receive information for the recommended activity from a user via the user interface;

generate a representation of the recommended activity with a status indicating that the recommended activity is recommended;

store the generated representation of the recommended activity in the memory; and, subsequently, receive an approval or rejection of the recommended activity, when an approval is received, change the status of the representation of the recommended activity to indicate that the recommended activity has been approved, and, when a rejection is received, change the status of the representation of the recommended activity to indicate that the recommended activity has been rejected.

17. The system of claim 1, wherein the one or more software modules:

receive an output of at least one sensor over at least one network, wherein the output of the at least one sensor comprises a measurement of an attribute of an infrastructure asset;

identify one of the plurality of representations of infrastructure assets that represents the infrastructure asset for which an attribute was measured by the at least one sensor; and associate the measurement of the attribute of the infrastructure asset with the identified representation of an infrastructure asset.

18. The system of claim 1, wherein the one or more software modules further:

receive a selection of a workplan comprising at least one activity associated with a first set of one or more of the plurality of representations of infrastructure assets;

determine a second set of one or more of the plurality of representations of infrastructure assets that are of the same asset type as the first set and are within a vicinity of the first set;

receive at least one selection of one of the visual representations;

when the at least one selection is of a visual representation of a representation of an infrastructure asset in the first set, disassociate that representation of an infrastructure asset from the selected workplan; and, when the at least one selection is of a visual representation of a representation of an infrastructure asset in the second set, associate that representation of an infrastructure asset with the selected workplan.

19. A method comprising using at least one hardware processor to:

import one or more infrastructure domains, wherein each of the one or more infrastructure domains comprises representations of one or more infrastructure asset types that are available in the infrastructure domain, one or more activity types related to the one or more infrastructure asset types, and standards and compliance parameters related to the one or more infrastructure asset types;

import a plurality of representations of infrastructure assets of one or more of the one or more asset types, wherein each of the plurality of representations of infrastructure assets comprises location information including at least Global Positioning System (GPS) coordinates, the location information representing a geolocation of the represented infrastructure asset, and, for each of one or more of the plurality of representations of infrastructure assets:

calculate a likelihood of failure based on at least one rating generated for the representation of the infrastructure asset;

determine a consequence of failure for an infrastructure asset represented by the representation of the infrastructure asset; and calculate a risk assessment score based on the likelihood of failure and the consequence of failure; and wherein at least one of the plurality of representations of infrastructure assets comprises a representation of a first manhole, a representation of a second manhole, and a representation of a pipe between the first manhole and the second manhole, parse inspection data associated with the representation of the pipe, wherein the inspection data comprises one or more observations, wherein each of the one or more observations comprises metadata including a description and a distance between the location where the observed description was made and the first manhole and, generate a user interface comprising
 a visual representation of the pipe extending between a visual representation of the first manhole and a visual representation of the second manhole, and,
 for each of the one or more observations, the description in the observation associated with a position on the visual representation of the pipe, wherein the position on the visual representation of the pipe is at a distance from the visual representation of the first manhole, and wherein the distance from the visual representation of the first manhole is proportional to the distance between the location where the observed description was made and the first manhole, continually receive updated location information for one or more infrastructure assets and, based on the received updated location information, update the location information of one or more of the plurality of representations of infrastructure assets, corresponding to the one or more infrastructure assets;

generate the at least one rating for one or more of the plurality of representations of infrastructure assets based on the standards and compliance parameters;

generate a virtual map;

receive a selection of one or more of the one or more asset types;

overlay a visual representation of each of one or more of the plurality of representations of infrastructure assets of the selected one or more asset types on the virtual map at a location corresponding to the location information of that representation of an infrastructure asset, wherein overlaying the visual representation comprises overlaying at least a first visual representation of a first one of the plurality of representations of infrastructure assets of a first asset type in a first color, and overlaying at least a second visual representation of a second one of the plurality of representations of infrastructure assets of a second asset type, that is different than the first asset type, in a second color that is different than the first color;

import one or more geographic information system (GIS) layers, wherein each of the one or more GIS layers comprises GIS data associated with location information, wherein the GIS data comprise a plurality of representations of geographical events, and wherein the geographical events comprise a past sanitary sewer overflow (SSO) event;

receive a selection of one or more of the imported one or more GIS layers;

overlay one or more visual representations of the GIS data, including a visual representation of the past SSO event, from the selected one or more GIS layers, on the virtual map at a location corresponding to the location information associated with that GIS data, such that the visual representation of the past SSO event is simultaneously visible with the first visual representation of the first one of the plurality of representations of infrastructure assets of the first type and the second visual representation of the second one of the plurality of representations of infrastructure assets of the second type;

generate one or more workplans comprising one or more activities, of the one or more activity types, to be performed on one or more infrastructure assets;

receive a save operation from a user to save a view of the virtual map;

in response to the save operation, save a view of the virtual map, wherein the view comprises a position on the virtual map, an identification of each of the selected one or more asset types, an identification of each of the selected one or more GIS layers, and a zoom level of the virtual map; and, subsequently, receive a retrieve operation from a user to retrieve the saved view, and, in response to the retrieve operation, retrieve and display the saved view of the virtual map according to the position, at the zoom level, and including a visual representation of each of one or more of the plurality of infrastructure assets of the selected one or more asset types and a visual representation of each of the GIS data in the selected one or more GIS layers.

20. A non-transitory computer-readable medium having instructions stored thereon, wherein the instructions, when executed by a processor, cause the processor to:

import one or more infrastructure domains, wherein each of the one or more infrastructure domains comprises representations of one or more infrastructure asset types that are available in the infrastructure domain, one or more activity types related to the one or more infrastructure asset types, and standards and compliance parameters related to the one or more infrastructure asset types;

import a plurality of representations of infrastructure assets of one or more of the one or more asset types, wherein each of the plurality of representations of infrastructure assets comprises location information including at least Global Positioning System (GPS) coordinates, the location information representing a geolocation of the represented infrastructure asset, and, for each of one or more of the plurality of representations of infrastructure assets:
 calculate a likelihood of failure based on at least one rating generated for the representation of the infrastructure asset;
 determine a consequence of failure for an infrastructure asset represented by the representation of the infrastructure asset; and
 calculate a risk assessment score based on the likelihood of failure and the consequence of failure; and wherein at least one of the plurality of representations of infrastructure assets comprises a representation of a first manhole, a representation of a second manhole, and a representation of a pipe between the first manhole and the second manhole, parse inspection data associated with the representation of the pipe, wherein the inspection data comprises one or more observations, wherein each of the one or more observations comprises metadata including a description and a distance between the location where the observed description was made and the first manhole and, generate a user interface comprising
- a visual representation of the pipe extending between a visual representation of the first manhole and a visual representation of the second manhole, and,
- for each of the one or more observations, the description in the observation associated with a position on the visual representation of the pipe, wherein the position on the visual representation of the pipe is at a distance from the visual representation of the first manhole, and wherein the distance from the visual representation of the first manhole is proportional to the distance between the location where the observed description was made and the first manhole, continually receive updated location information for one or more infrastructure assets and, based on the received updated location information, update the location information of one or more of the plurality of representations of infrastructure assets, corresponding to the one or more infrastructure assets;

generate the at least one rating for one or more of the plurality of representations of infrastructure assets based on the standards and compliance parameters;

generate a virtual map;

receive a selection of one or more of the one or more asset types;

overlay a visual representation of each of one or more of the plurality of representations of infrastructure assets of the selected one or more asset types on the virtual map at a location corresponding to the location information of that representation of an infrastructure asset, wherein overlaying the visual representation comprises
- overlaying at least a first visual representation of a first one of the plurality of representations of infrastructure assets of a first asset type in a first color, and
- overlaying at least a second visual representation of a second one of the plurality of representations of infrastructure assets of a second asset type, that is different than the first asset type, in a second color that is different than the first color;

import one or more geographic information system (GIS) layers, wherein each of the one or more GIS layers comprises GIS data associated with location information, wherein the GIS data comprise a plurality of representations of geographical events, and wherein the geographical events comprise a past sanitary sewer overflow (SSO) event;

receive a selection of one or more of the imported one or more GIS layers;

overlay one or more visual representations of the GIS data, including a visual representation of the past SSO event, from the selected one or more GIS layers, on the virtual map at a location corresponding to the location information associated with that GIS data, such that the visual representation of the past SSO event is simultaneously visible with the first visual representation of the first one of the plurality of representations of infrastructure assets of the first type and the second visual representation of the second one of the plurality of representations of infrastructure assets of the second type;

generate one or more workplans comprising one or more activities, of the one or more activity types, to be performed on one or more infrastructure assets;

receive a save operation from a user to save a view of the virtual map;

in response to the save operation, save a view of the virtual map, wherein the view comprises a position on the virtual map, an identification of each of the selected one or more asset types, an identification of each of the selected one or more GIS layers, and a zoom level of the virtual map; and, subsequently,
- receive a retrieve operation from a user to retrieve the saved view, and,
- in response to the retrieve operation, retrieve and display the saved view of the virtual map according to the position, at the zoom level, and including a visual representation of each of one or more of the plurality of infrastructure assets of the selected one or more asset types and a visual representation of each of the GIS data in the selected one or more GIS layers.

* * * * *